US012812115B2

(12) United States Patent
Yamato et al.

(10) Patent No.: US 12,812,115 B2
(45) **Date of Patent: *Nov. 24, 2026**

(54) IMAGE PROCESSING APPARATUS AND METHOD

(71) Applicant: Sony Group Corporation, Tokyo (JP)

(72) Inventors: Atsushi Yamato, Kanagawa (JP); Takeshi Tsukuba, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 183 days.

This patent is subject to a terminal disclaimer.

(21) Appl. No.: 18/784,695

(22) Filed: Jul. 25, 2024

(65) Prior Publication Data

US 2024/0380888 A1 Nov. 14, 2024

Related U.S. Application Data

(63) Continuation of application No. 17/424,184, filed as application No. PCT/JP2020/004559 on Feb. 6, 2020, now Pat. No. 12,081,761.

(Continued)

(51) Int. Cl.

*H04N 19/13* (2014.01)
*H04N 19/149* (2014.01)

(Continued)

(52) U.S. Cl.

CPC ........... *H04N 19/13* (2014.11); *H04N 19/149* (2014.11); *H04N 19/176* (2014.11); *H04N 19/70* (2014.11)

(58) Field of Classification Search

None

See application file for complete search history.

(56) References Cited

U.S. PATENT DOCUMENTS

| | | | | |
|---|---|---|---|---|
| 12,081,761 B2 * | 9/2024 | Yamato | ................ | H04N 19/176 |
| 2020/0186814 A1 * | 6/2020 | Karczewicz | ........... | H04N 19/13 |

(Continued)

FOREIGN PATENT DOCUMENTS

| | | |
|---|---|---|
| CN | 104838659 A | 8/2015 |
| JP | 2005218124 A | 8/2005 |

(Continued)

OTHER PUBLICATIONS

Muhammed Coban et al., "CE7-related: TU level limits on context-coded bins for coefficient coding", Joint Video Experts Team (JVET) of ITU-T SG 16 WP 3 and ISO/IEC JTC 1/SC 29/WG 11, JVET-N0106, 14th Meeting, Mar. 2019, pp. 1-3, Geneva, CH.

(Continued)

*Primary Examiner* — Kaveh Abrishamkar

(74) *Attorney, Agent, or Firm* — XSENSUS LLP

(57) ABSTRACT

An upper limit value of the number of bins allocated to a processing target subblock by distributing the number of bins among nonzero subblocks is set, a syntax element value regarding the processing target subblock is derived by using coefficient data derived from image data so that the number of bins does not exceed the upper limit value, and the syntax element value derived is encoded and coded data is generated. The present disclosure can be applied, for example, to an image processing apparatus, an image encode apparatus, an image decode apparatus, a transmitting apparatus, a receiving apparatus, a transmitting/receiving apparatus, an information processing apparatus, an imaging apparatus, a reproducing apparatus, an electronic device, an image processing method, an information processing method, and the like.

20 Claims, 63 Drawing Sheets

Related U.S. Application Data

(60) Provisional application No. 62/802,477, filed on Feb. 7, 2019.

(51) Int. Cl.
*H04N 19/176* (2014.01)
*H04N 19/70* (2014.01)

(56) References Cited

U.S. PATENT DOCUMENTS

| | | | | |
|---|---|---|---|---|
| 2020/0236403 | A1* | 7/2020 | Choi | H04N 19/647 |
| 2020/0244995 | A1* | 7/2020 | Hsiang | H04N 19/13 |
| 2020/0260080 | A1* | 8/2020 | Choi | H04N 19/136 |
| 2021/0243443 | A1* | 8/2021 | Choi | H04N 19/124 |
| 2021/0274185 | A1* | 9/2021 | Yoo | H04N 19/13 |
| 2022/0132132 | A1* | 4/2022 | Choi | H04N 19/176 |

FOREIGN PATENT DOCUMENTS

| | | | |
|---|---|---|---|
| WO | WO-2015100514 | A1 | 7/2015 |
| WO | WO-2018159526 | A1 | 9/2018 |

OTHER PUBLICATIONS

Shan Liu et al. "CE7-related: Reduced maximum number of context-coded bins for transform coefficient coding", Joint Video Experts Team (JVET) of ITU-T SG 16 WP 3 and ISO/IEC JTC 1/SC 29 /WG 11 , JVET-M0491-v2 , Jan. 9-18, 2019, pp. 1-4, 13th Meeting: Marrakech, MA.pp. 1-3.

Tzu-Der Chuang, et al. CE7 (Tests 7.1, 7.2, 7.3, and 7.4): Constraints on context-coded bins for coefficient coding, Joint Video Experts Team (JVET) of ITU-T SG 16 WP 3 and ISO/IEC JTC 1/SC 29/WG 11 , JVET-M0173-v1, Jan. 2019, pp. 1-12, 13th Meeting: Marrakech, MA.

Tzu-Der Chuang, et al., CE7-related: Constraints on context-coded bins for coefficient coding, Joint Video Experts Team (JVET) of ITU-T SG 16 WP 3 and ISO/IEC JTC 1/SC 29/WG 11 , JVET-L0145-v4 , Oct. 2018, pp. 1-19, 12th Meeting: Macao, CN.

Tzu-Der Chuang, et al., CE7-related: TB-level constraints on context-coded bins for coefficient coding, Joint Video Experts Team (JVET) of ITU-T SG 16 WP 3 and ISO/IEC JTC 1/SC 29/WG 11 , JVET-N0091-v2 , Mar. 2019, pp. 1-5, 14th Meeting: Geneva, CH.

T-D Chuang et al:° C. E7-related: Constraints on context-coded bins for coefficient coding, 12. JVET Meeting; Oct. 3, 2018-Oct. 12, 2018; Macao; (The Joint Video Exploration Team of 1S0/IEC JTC1/SC29/WG11 and ITU-T SG 16) No. JVET-L0145 Oct. 8, 2018(Oct. 8, 2018) XP030251675.

T-D Chuang et al:° C. E7-related : Constraints on context-coded bins for coefficient coding, 12. JVET Meeting: Oct. 3, 2018-Oct. 12, 2018; Macao; (The Joint Video Exploration Team of 1S0/IEC JTC1/SC29/WG11 and ITU-T SG.16) ,, No. JVET.L0145 Oct. 8, 2018 (Oct. 8, 2018) XP030251680.

T-D Chuang et al:° C. E7-related: Constraints on context-coded bins for coefficient coding, 12. JVET Meeting; Oct. 3, 2018-Oct. 12, 2018; Macao; (The Joint Videoexploration Team of 1S0/IEC JTC1/SC29/WG11 and ITU-T SG.16),,No. JVET-L0145. Oct. 8, 2018 (Oct. 8, 2018) XP030251679.

Vivienne Sze et al: "High Throughput CABAC Entropy Coding in HEVC", IEEE Transactions on Circuits and Systems for Videotechnology, IEEE, USA,vol. 22, No. 12, Dec. 1, 2012 (Dec. 1, 2012), pp. 1778-1791,XP011487151,ISSN: 1051-8215, DOI: 10.1109/TCSVT.2012.2221526.

International Search Report and Written Opinion mailed on Apr. 28, 2020, received for PCT Application PCT/JP2020/004559, Filed on Feb. 6, 2020, 7 pages including English Translation.

Chuang et al., "CE7 (Tests 7.1, 7.2, 7.3, and 7.4): Constraints on Context-Coded bins for Coefficient Coding", Joint Video Experts Team (JVET) of ITU-T SG 16 WP 3 and ISO/IEC JTC 1/SC 29/WG 11, JVET-M0173-v1, Jan. 9-18, 2019, pp. 1-13.

Chuang et al., "CE7-Related: TB-level Constraints on Context-Coded Bins for Coefficient Coding", Joint Video Experts Team (JVET) of ITU-T SG 16 WP 3 and ISO/IEC JTC 1/SC 29/WG 11, JVET-N0091-v2, Mar. 19-27, 2019, pp. 1-6.

Zhao et al., "CE8-Related: Modified Limitation on Context Coded Bins for CE8-4.4a and CE8-5.1a", Joint Video Experts Team (JVET) of ITU-T SG 16 WP 3 and ISO/IEC JTC 1/SC 29/WG 11, JVET-N0366-v3, Mar. 19-27, 2019, pp. 1-4.

"Advanced Video Coding for Generic Audiovisual Services", Series H: Audiovisual and Multimedia Systems, Infrastructure of Audiovisual Services—Coding of Moving Video, ITU-T, H.264, Apr. 2017, pp. 1-787.

"High Efficiency Video Coding", Series H: Audiovisual and Multimedia Systems, Infrastructure of Audiovisual Services—Coding of Moving Video, ITU-T, H.265, Dec. 2016, pp. 1-643.

Chen et al., "Algorithm Description of Joint Exploration Test Model 7 (JEM 7)", Joint Video Exploration Team (JVET) of ITU-T SG 16 WP 3 and ISO/IEC JTC 1/SC 29/WG 11, JVET-G1001-v1, Jul. 13-21, 2017, pp. 1-44.

Bross et al., "Versatile Video Coding (Draft 3)", Joint Video Exploration Team (JVET) of ITU-T SG 16 WP 3 and ISO/IEC JTC 1/SC 29/WG 11, JVETL 1001-v9, Oct. 3-12, 2018, pp. 1-225.

Chen et al., "Algorithm Description for Versatile Video Coding and Test Model 3 (VTM 3)", Joint Video Exploration Team (JVET) of ITU-T SG 16 WP 3 and ISO/IEC JTC 1/SC 29/WG 11, JVET-L1002-v1, Oct. 3-12, 2018, pp. 1-48.

Boyce et al., "Two Tier Test Model", Joint Video Exploration Team (JVET) of ITU-T SG 16 WP 3 and ISO/IEC JTC 1/SC 29/WG 11, JVET-J0093-¥1. Apr. 10-20, 2018, pp. 1-2.

Yoo et al., "Non-CE7 : Residual Rearrangement for Transform Skipped Blocks", Joint Video Exploration Team (JVET) of ITU-T SG 16 WP 3 and ISO/IEC JTC 1/SC 29/WG 11, JVET-M0278_v2, Jan. 9-18, 2019, pp. 1-4.

Bross et al., "Non-CEB: Unified Transform Type Signalling and Residual Coding for Transform Skip", Joint Video Exploration Team (JVET) of ITU-T SG 16 WP 3 and ISO/IEC JTC 1/SC 29/WG 11, JVET-M0464-v4, Jan. 9-18, 2019, pp. 1-13.

Zhao et al., "CE6: Sub-Block Transform for Inter Blocks (CE6.4.1)", Joint Video Exploration Team (JVET) of ITU-T SG 16 WP 3 and ISO/IEC JTC 1/SC 29/WG 11, JVET-M0140-v3, Jan. 9-18, 2019, pp. 1-18.

De-Luxán-Hernández et al., "CE3: Intra Sub-Partitions Coding Mode (Tests 1.1.1 and 1.1.2)", Joint Video Exploration Team (JVET) of ITU-T SG 16 WP 3 and ISO/IEC JTC 1/SC 29/WG 11, JVET-M0102-v5, Jan. 9-18, 2019, pp. 1-9.

Bross et al., "Versatile Video Coding (Draft 4)", Joint Video Exploration Team (JVET) of ITU-T SG 16 WP 3 and ISO/IEC JTC 1/SC 29/WG 11, JVET-M1001-v1, Jan. 9-18, 2019, pp. 1-233.

* cited by examiner

FIG. 2

| | |
|---|---|
| #1 | NUMBER OF bins OF zero subblock IS PASSED TO nonzero subblock |
| | coded_sub_block_flag IS PUT OUT OF EXISTING loop TO BE INDEPENDENT<br>(FIRST coded_sub_block_flag IN TU IS PARSED)<br>NUMBER OF coded_sub_block_flag=0 (zero subblock) IS COUNTED<br>NUMBER OF coded_sub_block_flag=0 x NUMBER OF CONTEXT-CODED bins OF subblock IS PASSED (ADDED) TO nonzero subblock<br>MANAGEMENT OF NUMBER OF CONTEXT-CODED bins IS CLOSED IN TU (PREDETERMINED UNIT) |
| | ENCODING EFFICIENCY IS IMPROVED BECAUSE NUMBER OF EXTRA CONTEXT-CODED bins OF ZERO SUBBLOCK CAN BE USED AS NUMBER OF CONTEXT-CODED bins OF NONZERO SUBBLOCK |

FIG. 8

| residual_coding( x0, y0, log2TbWidth, log2TbHeight, cIdx ) { | Descriptor |
|---|---|
| if( transform_skip_enabled_flag && ( cIdx ! = 0 \| \| tu_mts_flag[ x0 ][ y0 ] = = 0 ) && ( log2TbWidth <= 2 ) && ( log2TbHeight <= 2 ) ) | |
| transform_skip_flag[ x0 ][ y0 ][ cIdx ] | ae(v) |
| if( log2TbWidth > 0 ) | |
| last_sig_coeff_x_prefix | ae(v) |
| if( log2TbHeight > 0 ) | |
| last_sig_coeff_y_prefix | ae(v) |
| if( last_sig_coeff_x_prefix > 3 ) | |
| last_sig_coeff_x_suffix | ae(v) |
| if( last_sig_coeff_y_prefix > 3 ) | |
| last_sig_coeff_y_suffix | ae(v) |
| log2SbW = ( Min( log2TbWidth, log2TbHeight ) < 2 ? 1 : 2 ) | |
| log2SbH = log2SbW | |
| if ( log2TbWidth < 2 && cIdx = = 0 ) { | |
| log2SbW = log2TbWidth | |
| log2SbH = 4 − log2SbW | |
| } else if ( log2TbHeight < 2 && cIdx = = 0 ) { | |
| log2SbH = log2TbHeight | |
| log2SbW = 4 − log2SbH | |
| } | |
| numSbCoeff = 1 << ( log2SbW + log2SbH ) | |
| lastScanPos = numSbCoeff | |
| lastSubBlock = ( 1 << ( log2TbWidth + log2TbHeight − ( log2SbW + log2SbH ) ) ) − 1 | |
| do { | |
| if( lastScanPos = = 0 ) { | |
| lastScanPos = numSbCoeff | |
| lastSubBlock− − | |
| } | |
| lastScanPos− − | |
| xS = DiagScanOrder[ log2TbWidth − log2SbW ][ log2TbHeight − log2SbH ] [ lastSubBlock ][ 0 ] | |
| yS = DiagScanOrder[ log2TbWidth − log2SbW ][ log2TbHeight − log2SbH ] [ lastSubBlock ][ 1 ] | |
| xC = ( xS << log2SbW ) + DiagScanOrder[ log2SbW ][ log2SbH ][ lastScanPos ][ 0 ] | |
| yC = ( yS << log2SbH ) + DiagScanOrder[ log2SbW ][ log2SbH ][ lastScanPos ][ 1 ] | |
| } while( ( xC != LastSignificantCoeffX ) \| \| ( yC != LastSignificantCoeffY ) ) | |
| numSigCoeff = 0 | |
| QState = 0 | |

FIG. 9

| | |
|---|---|
| | |
| /* DECODE/ENCODE SUBBLOCK COEFFICIENT FLAG GROUP FIRST */ | |
| for( i = lastSubBlock; i >= 0; i − − ) { | |
| startQStateSb = QState | |
| xS = DiagScanOrder[ log2TbWidth − log2SbW ][ log2TbHeight − log2SbH ] [ lastSubBlock ][ 0 ] | |
| yS = DiagScanOrder[ log2TbWidth − log2SbW ][ log2TbHeight − log2SbH ] [ lastSubBlock ][ 1 ] | |
| inferSbDcSigCoeffFlag = 0 | |
| if( ( i < lastSubBlock ) && ( i > 0 ) ) { | |
| coded_sub_block_flag[ xS ][ yS ] | ae(v) |
| inferSbDcSigCoeffFlag = 1 | |
| } // End of if( ( i < lastSubBlock ) && ( i > 0 ) ) | |
| | |
| /* COUNT NUMBER OF NONZERO SUBBLOCKS */ | |
| numNonZeroSbk += coded_sub_block_flag[ xS ][ yS ] | |
| | |
| } | |
| | |
| /* SET TEMPORARY UPPER LIMIT VALUE OF NUMBER OF CONTEXT-CODED BINS OF ONE SUBBLOCK */ | |
| remBinPass1Tmp = ( (log2SbW + log2SbH ) < 4 ? TH1 : TH2 ) | |
| /* SET NUMBER OF EXTRA CONTEXT-CODED BINS remBinPass1InZeroSbk OF ENTIRE ZERO SUBBLOCKS ON BASIS OF NUMBER OF ZERO SUBBLOCKS numZeroSbk */ | |
| remBinPass1InZeroSbk = numZeroSbk * remBinPass1Tmp | |
| /* SET AVERAGE NUMBER OF EXTRA CONTEXT-CODED BINS remBinPass1Extra THAT CAN BE ADDITIONALLY ALLOCATED TO ONE NONZERO SUBBLOCK<br>NOTE THAT LOOK-UP TABLE MAY BE REFERENCED TO AVOID DIVISION<br>*/ | |
| remBinPass1Extra = numZeroSbk==0 ? 0 : remBinPass1InZeroSbk // numZeroSbk | |
| | |
| for( i = lastSubBlock; i >= 0; i − − ) { | |
| startQStateSb = QState | |
| xS = DiagScanOrder[ log2TbWidth − log2SbW ][ log2TbHeight − log2SbH ] [ lastSubBlock ][ 0 ] | |
| yS = DiagScanOrder[ log2TbWidth − log2SbW ][ log2TbHeight − log2SbH ] [ lastSubBlock ][ 1 ] | |
| SET UPPER LIMIT VALUE remBinsPass1 OF NUMBER OF CONTEXT-CODED BINS REGARDING PROCESSING TARGET SUBBLOCK (subSetId=i) ON BASIS OF TEMPORARY UPPER LIMIT VALUE remBinsPass1Tmp AND AVERAGE NUMBER OF EXTRA CONTEXT-CODED BINS THAT CAN BE ADDITIONALLY USED FROM ZERO SUBBLOCK */ | |
| remBinsPass1 = remBinsPass1Tmp + remBinsPass1Extra | |
| | |

FIG. 10

| | |
|---|---|
| firstPosMode0 = ( i == lastSubBlock ? lastScanPos − 1 : numSbCoeff − 1 ) | |
| firstPosMode1 = −1 | |
| firstPosMode2 = −1 | |
| for( n = ( i == firstPosMode0; n >= 0 && remBinsPass1 >= TH3; n− − ) { | |
| xC = ( xS << log2SbW ) + DiagScanOrder[ log2SbW ][ log2SbH ][ n ][ 0 ] | |
| yC = ( yS << log2SbH ) + DiagScanOrder[ log2SbW ][ log2SbH ][ n ][ 1 ] | |
| if( coded_sub_block_flag[ xS ][ yS ] && ( n > 0 \|\| !inferSbDcSigCoeffFlag ) ) { | |
| sig_coeff_flag[ xC ][ yC ] | ae(v) |
| remBinsPass1− − | |
| if( sig_coeff_flag[ xC ][ yC ] ) | |
| inferSbDcSigCoeffFlag = 0 | |
| } // End of if( coded_sub_block_flag[ xS ][ yS ] &&( n > 0\| !inferSbDcSigCoeffFlag ) ) | |
| if( sig_coeff_flag[ xC ][ yC ] ) { | |
| numSigCoeff++ | |
| abs_level_gt1_flag[ n ] | ae(v) |
| remBinsPass1− − | |
| if( abs_level_gt1_flag[ n ] ) { | |
| par_level_flag[ n ] | ae(v) |
| remBinsPass1− − | |
| abs_level_gt3_flag[ n ] | ae(v) |
| remBinsPass1− − | |
| } | |
| if( lastSigScanPosSb == −1 ) | |
| lastSigScanPosSb = n | |
| firstSigScanPosSb = n | |
| } // End of if( sig_coeff_flag[ xC ][ yC ] ) | |
| AbsLevelPass1[ xC ][ yC ] = sig_coeff_flag[ xC ][ yC ] + par_level_flag[ n ] + abs_level_gt1_flag[ n ] + 2 * abs_level_gt3_flag[ n ] | |
| if( dep_quant_enabled_flag ) | |
| QState = QStateTransTable[ QState ][ AbsLevelPass1[ xC ][ yC ] & 1 ] | |
| if( remBinsPass1 < TH3 ) | |
| firstPosMode2 = n − 1 | |
| } // End of for( n = ( i == firstPosMode0; n >= 0 && remBinsPass1 >= TH3; n− − ) | |
| for( n = numSbCoeff − 1; n >= firstPosMode2; n− − ) { | |
| xC = ( xS << log2SbW ) + DiagScanOrder[ log2SbW ][ log2SbH ][ n ][ 0 ] | |
| yC = ( yS << log2SbH ) + DiagScanOrder[ log2SbW ][ log2SbH ][ n ][ 1 ] | |
| if( abs_level_gt3_flag[ n ] ) | |
| abs_remainder[ n ] | ae(v) |
| AbsLevel[ xC ][ yC ] = AbsLevelPass1[ xC ][ yC ] + 2 * abs_remainder[ n ] ) | |
| } // End of for( n = numSbCoeff − 1; n >= firstPosMode2; n− − ) | |
| for( n = firstPosMode2; n >= 0; n− − ) { | |
| xC = ( xS << log2SbW ) + DiagScanOrder[ log2SbW ][ log2SbH ][ n ][ 0 ] | |
| yC = ( yS << log2SbH ) + DiagScanOrder[ log2SbW ][ log2SbH ][ n ][ 1 ] | |

FIG. 11

| | | |
|---|---|---|
| dec_abs_level[ n ] | ae(v) | |
| if(AbsLevel[ xC ][ yC ] > 0 ) | | |
| firstSigScanPosSb = n | | |
| if( dep_quant_enabled_flag ) | | |
| QState = QStateTransTable[ QState ][ AbsLevel[ xC ][ yC ] & 1 ] | | |
| } // End of for( n = firstPosMode2; n >= 0, n − − ) | | |
| if( dep_quant_enabled_flag \|\| !sign_data_hiding_enabled_flag ) | | |
| signHidden = 0 | | |
| Else | | |
| signHidden = ( lastSigScanPosSb − firstSigScanPosSb > 3 ? 1 : 0 ) | | |
| for( n = numSbCoeff − 1; n >= 0; n − − ) { | | |
| xC = ( xS << log2SbW ) + DiagScanOrder[ log2SbW ][ log2SbH ][ n ][ 0 ] | | |
| yC = ( yS << log2SbH ) + DiagScanOrder[ log2SbW ][ log2SbH ][ n ][ 1 ] | | |
| if( sig_coeff_flag[ xC ][ yC ] && ( !signHidden \|\| ( n != firstSigScanPosSb ) ) ) | | |
| coeff_sign_flag[ n ] | ae(v) | |
| } // for( n = numSbCoeff − 1, n >= 0; n − − ) | | |
| if( dep_quant_enabled_flag ) { | | |
| QState = startQStateSb | | |
| for( n = numSbCoeff − 1; n >= 0; n − − ) { | | |
| xC = ( xS << log2SbW ) + DiagScanOrder[ log2SbW ][ log2SbH ][ n ][ 0 ] | | |
| yC = ( yS << log2SbH ) + DiagScanOrder[ log2SbW ][ log2SbH ][ n ][ 1 ] | | |
| if( sig_coeff_flag[ xC ][ yC ] ) | | |
| TransCoeffLevel[ x0 ][ y0 ][ cIdx ][ xC ][ yC ] = ( 2 * AbsLevel[ xC ][ yC ] − ( QState > 1 ? 1 : 0 ) ) * ( 1 − 2 * coeff_sign_flag[ n ] ) | | |
| QState = QStateTransTable[ QState ][ par_level_flag[ n ] ] | | |
| } else { | | |
| sumAbsLevel = 0 | | |
| for( n = numSbCoeff − 1, n >= 0; n − − ) { | | |
| xC = ( xS << log2SbW ) + DiagScanOrder[ log2SbW ][ log2SbH ][ n ][ 0 ] | | |
| yC = ( yS << log2SbH ) + DiagScanOrder[ log2SbW ][ log2SbH ][ n ][ 1 ] | | |
| if( sig_coeff_flag[ xC ][ yC ] ) { | | |
| TransCoeffLevel[ x0 ][ y0 ][ cIdx ][ xC ][ yC ] = AbsLevel[ xC ][ yC ] * ( 1 − 2 * coeff_sign_flag[ n ] ) | | |
| if( signHidden ) { | | |
| sumAbsLevel += AbsLevel[ xC ][ yC ] | | |
| if( ( n = = firstSigScanPosSb ) && ( sumAbsLevel % 2 ) = = 1 ) ) | | |
| TransCoeffLevel[ x0 ][ y0 ][ cIdx ][ xC ][ yC ] = −TransCoeffLevel[ x0 ][ y0 ][ cIdx ][ xC ][ yC ] | | |
| } // End of if( signHidden ) | | |
| } // End of if( sig_coeff_flag[ xC ][ yC ] ) | | |
| } // End of for( n = numSbCoeff − 1, n >= 0; n − − ) | | |
| } // End of if( dep_quant_enabled_flag ) | | |
| | | |
| } // End of for( i = lastSubBlock; i >= 0; i − − ) /* LOOP IN UNITS OF SUBBLOCK */ | | |
| } | | |

FIG. 18

| | |
|---|---|
| #2 | MAXIMUM bin IS SHARED IN nonzero subblock |
| | coded_sub_block_flag IS PUT OUT OF EXISTING loop TO BE INDEPENDENT<br>(FIRST coded_sub_block_flag IN TU IS PARSED)<br>NUMBER OF coded_sub_block_flag = 1 (nonzero subblock) IS COUNTED<br>NUMBER OF coded_sub_block_flag = 1 x NUMBER OF CONTEXT-CODED bins OF subblock IS SHARED IN nonzero subblock<br>MANAGEMENT OF NUMBER OF CONTEXT-CODED bins IS CLOSED IN TU (PREDETERMINED UNIT) |
| | ENCODING EFFICIENCY IS IMPROVED BECAUSE NUMBER OF EXTRA CONTEXT-CODED bins OF NONZERO SUBBLOCK CAN BE USED AS NUMBER OF CONTEXT-CODED bins OF ANOTHER NONZERO SUBBLOCK |

FIG. 21

| residual_coding( x0, y0, log2TbWidth, log2TbHeight, cIdx ) { | Descriptor |
|---|---|
| if( transform_skip_enabled_flag && ( cIdx != 0 \|\| tu_mts_flag[ x0 ][ y0 ] = = 0 ) && ( log2TbWidth <= 2 ) && ( log2TbHeight <= 2 ) ) | |
| transform_skip_flag[ x0 ][ y0 ][ cIdx ] | ae(v) |
| if( log2TbWidth > 0 ) | |
| last_sig_coeff_x_prefix | ae(v) |
| if( log2TbHeight > 0 ) | |
| last_sig_coeff_y_prefix | ae(v) |
| if( last_sig_coeff_x_prefix > 3 ) | |
| last_sig_coeff_x_suffix | ae(v) |
| if( last_sig_coeff_y_prefix > 3 ) | |
| last_sig_coeff_y_suffix | ae(v) |
| log2SbW = ( Min( log2TbWidth, log2TbHeight ) < 2 ? 1 : 2 ) | |
| log2SbH = log2SbW | |
| if ( log2TbWidth < 2 && cIdx = = 0 ) { | |
| log2SbW = log2TbWidth | |
| log2SbH = 4 − log2SbW | |
| } else if ( log2TbHeight < 2 && cIdx = = 0 ) { | |
| log2SbH = log2TbHeight | |
| log2SbW = 4 − log2SbH | |
| } | |
| numSbCoeff = 1 << ( log2SbW + log2SbH ) | |
| lastScanPos = numSbCoeff | |
| lastSubBlock = ( 1 << ( log2TbWidth + log2TbHeight − ( log2SbW + log2SbH ) ) ) − 1 | |
| do { | |
| if( lastScanPos = = 0 ) { | |
| lastScanPos = numSbCoeff | |
| lastSubBlock − − | |
| } | |
| lastScanPos − − | |
| xS = DiagScanOrder[ log2TbWidth − log2SbW ][ log2TbHeight − log2SbH ] [ lastSubBlock ][ 0 ] | |
| yS = DiagScanOrder[ log2TbWidth − log2SbW ][ log2TbHeight − log2SbH ] [ lastSubBlock ][ 1 ] | |
| xC = ( xS << log2SbW ) + DiagScanOrder[ log2SbW ][ log2SbH ][ lastScanPos ][ 0 ] | |
| yC = ( yS << log2SbH ) + DiagScanOrder[ log2SbW ][ log2SbH ][ lastScanPos ][ 1 ] | |
| } while( ( xC != LastSignificantCoeffX ) \|\| ( yC != LastSignificantCoeffY ) ) | |
| numSigCoeff = 0 | |
| QState = 0 | |

FIG. 22

| | |
|---|---|
| /* DECODE/ENCODE SUBBLOCK COEFFICIENT FLAG GROUP FIRST */ | |
| for( i = lastSubBlock; i >= 0; i− − ) { | |
| startQStateSb = QState | |
| xS = DiagScanOrder[ log2TbWidth − log2SbW ][ log2TbHeight − log2SbH ] [ lastSubBlock ][ 0 ] | |
| yS = DiagScanOrder[ log2TbWidth − log2SbW ][ log2TbHeight − log2SbH ] [ lastSubBlock ][ 1 ] | |
| inferSbDcSigCoeffFlag = 0 | |
| if( ( i < lastSubBlock ) && ( i > 0 ) ) { | |
| coded_sub_block_flag[ xS ][ yS ] | ae(v) |
| inferSbDcSigCoeffFlag = 1 | |
| } // End of if( ( i < lastSubBlock ) && ( i > 0 ) ) | |
| | |
| /* COUNT NUMBER OF NONZERO SUBBLOCKS */ | |
| numNonZeroSbk += coded_sub_block_flag[ xS ][ yS ] | |
| | |
| } | |
| | |
| /* SET TEMPORARY UPPER LIMIT VALUE OF NUMBER OF CONTEXT-CODED BINS OF ONE SUBBLOCK */ | |
| remBinPass1Tmp = ( ( log2SbW + log2SbH ) < 4 ? TH1 : TH2 ) | |
| /* SET NUMBER OF EXTRA CONTEXT-CODED BINS remBinPass1 THAT CAN BE USED IN ENTIRE NONZERO SUBBLOCKS ON BASIS OF NUMBER OF NONZERO SUBBLOCKS numNonZeroSbk */ | |
| remBinPass1 = numNonZeroSbk * remBinPass1Tmp | |

FIG. 23

| | | |
|---|---|---|
| | | |
| for( i = lastSubBlock; i >= 0; i − − ) { | | |
| startQStateSb = QState | | |
| xS = DiagScanOrder[ log2TbWidth − log2SbW ][ log2TbHeight − log2SbH ] [ lastSubBlock ][ 0 ] | | |
| yS = DiagScanOrder[ log2TbWidth − log2SbW ][ log2TbHeight − log2SbH ] [ lastSubBlock ][ 1 ] | | |
| | | |
| firstPosMode0 = ( i = = lastSubBlock ? lastScanPos − 1 : numSbCoeff − 1 ) | | |
| firstPosMode1 = −1 | | |
| firstPosMode2 = −1 | | |
| for( n = ( i = = firstPosMode0; n >= 0 && remBinsPass1 >= TH3; n− − ) { | | |
| xC = ( xS << log2SbW ) + DiagScanOrder[ log2SbW ][ log2SbH ][ n ][ 0 ] | | |
| yC = ( yS << log2SbH ) + DiagScanOrder[ log2SbW ][ log2SbH ][ n ][ 1 ] | | |
| if( coded_sub_block_flag[ xS ][ yS ] && ( n > 0 \| \| !inferSbDcSigCoeffFlag ) ) { | | |
| sig_coeff_flag[ xC ][ yC ] | ae(v) | |
| remBinsPass1 − − | | |
| if( sig_coeff_flag[ xC ][ yC ] ) | | |
| inferSbDcSigCoeffFlag = 0 | | |
| } // End of if( coded_sub_block_flag[ xS ][ yS ] && ( n > 0 \|\| !inferSbDcSigCoeffFlag ) ) | | |
| if( sig_coeff_flag[ xC ][ yC ] ) { | | |
| numSigCoeff++ | | |
| abs_level_gt1_flag[ n ] | ae(v) | |
| remBinsPass1 − − | | |
| if( abs_level_gt1_flag[ n ] ) { | | |
| par_level_flag[ n ] | ae(v) | |
| remBinsPass1 − − | | |
| abs_level_gt3_flag[ n ] | ae(v) | |
| remBinsPass1 − − | | |
| } | | |
| if( lastSigScanPosSb = = −1 ) | | |
| lastSigScanPosSb = n | | |
| firstSigScanPosSb = n | | |
| } // End of if( sig_coeff_flag[ xC ][ yC ] ) | | |
| AbsLevelPass1[ xC ][ yC ] = sig_coeff_flag[ xC ][ yC ] + par_level_flag[ n ] + abs_level_gt1_flag[ n ] + 2 * abs_level_gt3_flag[ n ] | | |
| if( dep_quant_enabled_flag ) | | |
| QState = QStateTransTable[ QState ][ AbsLevelPass1[ xC ][ yC ] & 1 ] | | |
| if( remBinsPass1 < TH3 ) | | |
| firstPosMode2 = n − 1 | | |
| } // End of for( n = ( i = = firstPosMode0; n >= 0 && remBinsPass1 >= TH3; n− − ) | | |
| for( n = numSbCoeff − 1; n >= firstPosMode2; n− − ) { | | |
| xC = ( xS << log2SbW ) + DiagScanOrder[ log2SbW ][ log2SbH ][ n ][ 0 ] | | |
| yC = ( yS << log2SbH ) + DiagScanOrder[ log2SbW ][ log2SbH ][ n ][ 1 ] | | |
| if( abs_level_gt3_flag[ n ] ) | | |
| abs_remainder[ n ] | ae(v) | |
| AbsLevel[ xC ][ yC ] = AbsLevelPass1[ xC ][ yC ] + 2 * abs_remainder[ n ] ) | | |
| } // End of for( n = numSbCoeff − 1; n >= firstPosMode2; n− − ) | | |

FIG. 24

| | | |
|---|---|---|
| for( n = firstPosMode2; n >= 0; n − − ) { | | |
| xC = ( xS << log2SbW ) + DiagScanOrder[ log2SbW ][ log2SbH ][ n ][ 0 ] | | |
| yC = ( yS << log2SbH ) + DiagScanOrder[ log2SbW ][ log2SbH ][ n ][ 1 ] | | |
| dec_abs_level[ n ] | ae(v) | |
| if(AbsLevel[ xC ][ yC ] > 0 ) | | |
| firstSigScanPosSb = n | | |
| if( dep_quant_enabled_flag ) | | |
| QState = QStateTransTable[ QState ][ AbsLevel[ xC ][ yC ] & 1 ] | | |
| } // End of for( n = firstPosMode2; n >= 0; n − − ) | | |
| if( dep_quant_enabled_flag \|\| !sign_data_hiding_enabled_flag ) | | |
| signHidden = 0 | | |
| Else | | |
| signHidden = ( lastSigScanPosSb − firstSigScanPosSb > 3 ? 1 : 0 ) | | |
| for( n = numSbCoeff − 1; n >= 0; n − − ) { | | |
| xC = ( xS << log2SbW ) + DiagScanOrder[ log2SbW ][ log2SbH ][ n ][ 0 ] | | |
| yC = ( yS << log2SbH ) + DiagScanOrder[ log2SbW ][ log2SbH ][ n ][ 1 ] | | |
| if( sig_coeff_flag[ xC ][ yC ] && ( !signHidden \|\| ( n != firstSigScanPosSb ) ) ) | | |
| coeff_sign_flag[ n ] | ae(v) | |
| } // for( n = numSbCoeff − 1; n >= 0; n − − ) | | |
| if( dep_quant_enabled_flag ) { | | |
| QState = startQStateSb | | |
| for( n = numSbCoeff − 1; n >= 0; n − − ) { | | |
| xC = ( xS << log2SbW ) + DiagScanOrder[ log2SbW ][ log2SbH ][ n ][ 0 ] | | |
| yC = ( yS << log2SbH ) + DiagScanOrder[ log2SbW ][ log2SbH ][ n ][ 1 ] | | |
| if( sig_coeff_flag[ xC ][ yC ] ) | | |
| TransCoeffLevel[ x0 ][ y0 ][ cIdx ][ xC ][ yC ] = ( 2 * AbsLevel[ xC ][ yC ] − ( QState > 1 ? 1 : 0 ) ) * ( 1 − 2 * coeff_sign_flag[ n ] ) | | |
| QState = QStateTransTable[ QState ][ par_level_flag[ n ] ] | | |
| } else { | | |
| sumAbsLevel = 0 | | |
| for( n = numSbCoeff − 1; n >= 0; n − − ) { | | |
| xC = ( xS << log2SbW ) + DiagScanOrder[ log2SbW ][ log2SbH ][ n ][ 0 ] | | |
| yC = ( yS << log2SbH ) + DiagScanOrder[ log2SbW ][ log2SbH ][ n ][ 1 ] | | |
| if( sig_coeff_flag[ xC ][ yC ] ) { | | |
| TransCoeffLevel[ x0 ][ y0 ][ cIdx ][ xC ][ yC ] = AbsLevel[ xC ][ yC ] * ( 1 − 2 * coeff_sign_flag[ n ] ) | | |
| if( signHidden ) { | | |
| sumAbsLevel += AbsLevel[ xC ][ yC ] | | |
| if( ( n = = firstSigScanPosSb ) && ( sumAbsLevel % 2 ) = = 1 ) ) | | |
| TransCoeffLevel[ x0 ][ y0 ][ cIdx ][ xC ][ yC ] = −TransCoeffLevel[ x0 ][ y0 ][ cIdx ][ xC ][ yC ] | | |
| } // End of if( signHidden ) | | |
| } // End of if( sig_coeff_flag[ xC ][ yC ] ) | | |
| } // End of for( n = numSbCoeff − 1; n >= 0; n − − ) | | |
| } // End of if( dep_quant_enabled_flag ) | | |
| | | |
| } // End of for( i = lastSubBlock; i >= 0; i − − ) /* LOOP IN UNITS OF SUBBLOCK */ | | |
| } | | |

FIG. 26

| | |
|---|---|
| #3 | EXTRA bin IN nonzero subblock IS USED IN ANOTHER nonzero subblock |
| | IN CASE WHERE THERE IS subblock IN WHICH MAXIMUM AMOUNT OF NUMBER OF CONTEXT-CODED bins PER subblock IS NOT REACHED, REMAINING NUMBER OF CONTEXT-CODED bins IS POOLED AND USED FOR NEXT AND SUBSEQUENT subblocks |
| | APPLICABLE TO syntax IN WHICH coded_sub_block_flag IS NOT PUT OUT OF EXISTING loop ENCODING EFFICIENCY IS IMPROVED BECAUSE NUMBER OF EXTRA CONTEXT-CODED bins OF NON SUBBLOCK CAN BE USED AS NUMBER OF CONTEXT-CODED bins OF ANOTHER NONZERO SUBBLOCK |

FIG. 29

<table>
<tr><th>residual_coding( x0, y0, log2TbWidth, log2TbHeight, cIdx ) {</th><th>Descriptor</th></tr>
<tr><td>  if( transform_skip_enabled_flag && ( cIdx ! = 0 | | tu_mts_flag[ x0 ][ y0 ] = = 0 ) &&<br>    ( log2TbWidth <= 2 ) && ( log2TbHeight <= 2 ) )</td><td></td></tr>
<tr><td>    transform_skip_flag[ x0 ][ y0 ][ cIdx ]</td><td>ae(v)</td></tr>
<tr><td>  if( log2TbWidth > 0 )</td><td></td></tr>
<tr><td>    last_sig_coeff_x_prefix</td><td>ae(v)</td></tr>
<tr><td>  if( log2TbHeight > 0 )</td><td></td></tr>
<tr><td>    last_sig_coeff_y_prefix</td><td>ae(v)</td></tr>
<tr><td>  if( last_sig_coeff_x_prefix > 3 )</td><td></td></tr>
<tr><td>    last_sig_coeff_x_suffix</td><td>ae(v)</td></tr>
<tr><td>  if( last_sig_coeff_y_prefix > 3 )</td><td></td></tr>
<tr><td>    last_sig_coeff_y_suffix</td><td>ae(v)</td></tr>
<tr><td>  log2SbW = ( Min( log2TbWidth, log2TbHeight ) < 2 ? 1 : 2 )</td><td></td></tr>
<tr><td>  log2SbH = log2SbW</td><td></td></tr>
<tr><td>  if ( log2TbWidth < 2 && cIdx = = 0 ) {</td><td></td></tr>
<tr><td>    log2SbW = log2TbWidth</td><td></td></tr>
<tr><td>    log2SbH = 4 − log2SbW</td><td></td></tr>
<tr><td>  } else if ( log2TbHeight < 2 && cIdx = = 0 ) {</td><td></td></tr>
<tr><td>    log2SbH = log2TbHeight</td><td></td></tr>
<tr><td>    log2SbW = 4 − log2SbH</td><td></td></tr>
<tr><td>  }</td><td></td></tr>
<tr><td>  numSbCoeff = 1 << ( log2SbW + log2SbH )</td><td></td></tr>
<tr><td>  lastScanPos = numSbCoeff</td><td></td></tr>
<tr><td>  lastSubBlock = ( 1 << ( log2TbWidth + log2TbHeight − ( log2SbW + log2SbH ) ) ) − 1</td><td></td></tr>
<tr><td>  do {</td><td></td></tr>
<tr><td>    if( lastScanPos = = 0 ) {</td><td></td></tr>
<tr><td>      lastScanPos = numSbCoeff</td><td></td></tr>
<tr><td>      lastSubBlock− −</td><td></td></tr>
<tr><td>    }</td><td></td></tr>
<tr><td>    lastScanPos− −</td><td></td></tr>
<tr><td>    xS = DiagScanOrder[ log2TbWidth − log2SbW ][ log2TbHeight − log2SbH ]<br>          [ lastSubBlock ][ 0 ]</td><td></td></tr>
<tr><td>    yS = DiagScanOrder[ log2TbWidth − log2SbW ][ log2TbHeight − log2SbH ]<br>          [ lastSubBlock ][ 1 ]</td><td></td></tr>
<tr><td>    xC = ( xS << log2SbW ) + DiagScanOrder[ log2SbW ][ log2SbH ][ lastScanPos ][ 0 ]</td><td></td></tr>
<tr><td>    yC = ( yS << log2SbH ) + DiagScanOrder[ log2SbW ][ log2SbH ][ lastScanPos ][ 1 ]</td><td></td></tr>
<tr><td>  } while( ( xC != LastSignificantCoeffX ) | | ( yC != LastSignificantCoeffY ) )</td><td></td></tr>
<tr><td>  numSigCoeff = 0</td><td></td></tr>
<tr><td>  QState = 0</td><td></td></tr>
</table>

FIG. 30

| | |
|---|---|
| /* INITIALIZE NUMBER OF EXTRA CONTEXT-CODED BINS (remBinPass1Next) THAT CAN BE USED IN NEXT SUBBLOCK */ | |
| remBinPass1Next = 0 | |
| for( i = lastSubBlock; i >= 0; i − − ) { | |
| startQStateSb = QState | |
| xS = DiagScanOrder[ log2TbWidth − log2SbW ][ log2TbHeight − log2SbH ] [ lastSubBlock ][ 0 ] | |
| yS = DiagScanOrder[ log2TbWidth − log2SbW ][ log2TbHeight − log2SbH ] [ lastSubBlock ][ 1 ] | |
| inferSbDcSigCoeffFlag = 0 | |
| if( ( i < lastSubBlock ) && ( i > 0 ) ) { | |
| coded_sub_block_flag[ xS ][ yS ] | ae(v) |
| inferSbDcSigCoeffFlag = 1 | |
| } // End of if( ( i < lastSubBlock ) && ( i > 0 ) ) | |
| firstSigScanPosSb = numSbCoeff | |
| lastSigScanPosSb = − 1 | |
| /* SET TEMPORARY UPPER LIMIT VALUE OF NUMBER OF CONTEXT-CODED BINS REGARDING PROCESSING TARGET SUBBLOCK (subSetId = i) */ | |
| remBinPass1Tmp = ( ( log2SbW + log2SbH ) < 4 ? TH1 : TH2 ) | |
| /* SET UPPER LIMIT VALUE OF NUMBER OF CONTEXT-CODED BINS REGARDING PROCESSING TARGET SUBBLOCK (subSetId = i) FROM TEMPORARY NUMBER OF EXTRA CONTEXT BINS remBinPass1Tmp AND NUMBER OF EXTRA CONTEXT BINS OF IMMEDIATELY PRECEDING SUBBLOCK */ | |
| remBinsPass1 = remBinPass1Tmp + remBinPassNext | |
| | |
| | |
| firstPosMode0 = ( i = = lastSubBlock ? lastScanPos − 1 : numSbCoeff − 1 ) | |
| firstPosMode1 = − 1 | |
| firstPosMode2 = − 1 | |
| for( n = ( i = = firstPosMode0; n >= 0 && remBinsPass1 >= TH3; n − − ) { | |
| xC = ( xS << log2SbW ) + DiagScanOrder[ log2SbW ][ log2SbH ][ n ][ 0 ] | |
| yC = ( yS << log2SbH ) + DiagScanOrder[ log2SbW ][ log2SbH ][ n ][ 1 ] | |
| if( coded_sub_block_flag[ xS ][ yS ] && ( n > 0 \| \| !inferSbDcSigCoeffFlag ) ) { | |
| sig_coeff_flag[ xC ][ yC ] | ae(v) |
| remBinsPass1 − − | |
| if( sig_coeff_flag[ xC ][ yC ] ) | |
| inferSbDcSigCoeffFlag = 0 | |
| } // End of if( coded_sub_block_flag[ xS ][ yS ] &&( n > 0\| !inferSbDcSigCoeffFlag ) ) | |

FIG. 31

| | |
|---|---|
| if( sig_coeff_flag[ xC ][ yC ] ) { | |
| numSigCoeff++ | |
| abs_level_gt1_flag[ n ] | ae(v) |
| remBinsPass1− − | |
| if( abs_level_gt1_flag[ n ] ) { | |
| par_level_flag[ n ] | ae(v) |
| remBinsPass1− − | |
| abs_level_gt3_flag[ n ] | ae(v) |
| remBinsPass1− − | |
| } | |
| if( lastSigScanPosSb = = −1 ) | |
| lastSigScanPosSb = n | |
| firstSigScanPosSb = n | |
| } // End of if( sig_coeff_flag[ xC ][ yC ] ) | |
| AbsLevelPass1[ xC ][ yC ] = sig_coeff_flag[ xC ][ yC ] + par_level_flag[ n ] + abs_level_gt1_flag[ n ] + 2 * abs_level_gt3_flag[ n ] | |
| if( dep_quant_enabled_flag ) | |
| QState = QStateTransTable[ QState ][ AbsLevelPass1[ xC ][ yC ] & 1 ] | |
| if( remBinsPass1 < TH3 ) | |
| firstPosMode2 = n − 1 | |
| } // End of for( n = ( i = = firstPosMode0; n >= 0 && remBinsPass1 >= TH3; n− − ) | |
| /* SET NUMBER OF REMAINING CONTEXT-CODED BINS remBinPass1 IN FIRST LOOP OF CURRENT PROCESSING SUBBLOCK TO NUMBER OF EXTRA CONTEXT-CODED BINS remBinPass1Next THAT CAN BE USED IN NEXT SUBBLOCK | |
| remBinPass1Next = remBinPass1 | |
| for( n = numSbCoeff − 1; n >= firstPosMode2; n− − ) { | |
| xC = ( xS << log2SbW ) + DiagScanOrder[ log2SbW ][ log2SbH ][ n ][ 0 ] | |
| yC = ( yS << log2SbH ) + DiagScanOrder[ log2SbW ][ log2SbH ][ n ][ 1 ] | |
| if( abs_level_gt3_flag[ n ] ) | |
| abs_remainder[ n ] | ae(v) |
| AbsLevel[ xC ][ yC ] = AbsLevelPass1[ xC ][ yC ] + 2 * abs_remainder[ n ] ) | |
| } // End of for( n = numSbCoeff − 1; n >= firstPosMode2; n− − ) | |
| for( n = firstPosMode2; n >= 0; n− − ) { | |
| xC = ( xS << log2SbW ) + DiagScanOrder[ log2SbW ][ log2SbH ][ n ][ 0 ] | |
| yC = ( yS << log2SbH ) + DiagScanOrder[ log2SbW ][ log2SbH ][ n ][ 1 ] | |
| dec_abs_level[ n ] | ae(v) |
| if(AbsLevel[ xC ][ yC ] > 0 ) | |
| firstSigScanPosSb = n | |
| if( dep_quant_enabled_flag ) | |
| QState = QStateTransTable[ QState ][ AbsLevel[ xC ][ yC ] & 1 ] | |
| } // End of for( n = firstPosMode2; n >= 0; n− − ) | |

FIG. 32

| | | |
|---|---|---|
| if( dep_quant_enabled_flag \| \| !sign_data_hiding_enabled_flag ) | | |
| signHidden = 0 | | |
| Else | | |
| signHidden = ( lastSigScanPosSb − firstSigScanPosSb > 3 ? 1 : 0 ) | | |
| for( n = numSbCoeff − 1; n >= 0; n− − ) { | | |
| xC = ( xS << log2SbW ) + DiagScanOrder[ log2SbW ][ log2SbH ][ n ][ 0 ] | | |
| yC = ( yS << log2SbH ) + DiagScanOrder[ log2SbW ][ log2SbH ][ n ][ 1 ] | | |
| if( sig_coeff_flag[ xC ][ yC ] &&<br>( !signHidden \| \| ( n != firstSigScanPosSb ) ) ) | | |
| coeff_sign_flag[ n ] | ae(v) | |
| } // for( n = numSbCoeff − 1; n >= 0; n− − ) | | |
| if( dep_quant_enabled_flag ) { | | |
| QState = startQStateSb | | |
| for( n = numSbCoeff − 1; n >= 0; n− − ) { | | |
| xC = ( xS << log2SbW ) + DiagScanOrder[ log2SbW ][ log2SbH ][ n ][ 0 ] | | |
| yC = ( yS << log2SbH ) + DiagScanOrder[ log2SbW ][ log2SbH ][ n ][ 1 ] | | |
| if( sig_coeff_flag[ xC ][ yC ] ) | | |
| TransCoeffLevel[ x0 ][ y0 ][ cIdx ][ xC ][ yC ] =<br>( 2 * AbsLevel[ xC ][ yC ] − ( QState > 1 ? 1 : 0 ) ) *<br>( 1 − 2 * coeff_sign_flag[ n ] ) | | |
| QState = QStateTransTable[ QState ][ par_level_flag[ n ] ] | | |
| } else { | | |
| sumAbsLevel = 0 | | |
| for( n = numSbCoeff − 1; n >= 0; n− − ) { | | |
| xC = ( xS << log2SbW ) + DiagScanOrder[ log2SbW ][ log2SbH ][ n ][ 0 ] | | |
| yC = ( yS << log2SbH ) + DiagScanOrder[ log2SbW ][ log2SbH ][ n ][ 1 ] | | |
| if( sig_coeff_flag[ xC ][ yC ] ) { | | |
| TransCoeffLevel[ x0 ][ y0 ][ cIdx ][ xC ][ yC ] =<br>AbsLevel[ xC ][ yC ] * ( 1 − 2 * coeff_sign_flag[ n ] ) | | |
| if( signHidden ) { | | |
| sumAbsLevel += AbsLevel[ xC ][ yC ] | | |
| if( ( n = = firstSigScanPosSb ) && ( sumAbsLevel % 2 ) = = 1 ) ) | | |
| TransCoeffLevel[ x0 ][ y0 ][ cIdx ][ xC ][ yC ] =<br>−TransCoeffLevel[ x0 ][ y0 ][ cIdx ][ xC ][ yC ] | | |
| } // End of if( signHidden ) | | |
| } // End of if( sig_coeff_flag[ xC ][ yC ] ) | | |
| } // End of for( n = numSbCoeff − 1; n >= 0; n− − ) | | |
| } // End of if( dep_quant_enabled_flag ) | | |
| | | |
| } // End of for( i = lastSubBlock; i >= 0; i− − ) /* LOOP IN UNITS OF SUBBLOCK */ | | |
| } | | |

FIG. 34

| | |
|---|---|
| #4 | COMPOSITE OF #1, #2, AND #3 |
| | coded_sub_block_flag IS PUT OUT OF EXISTING loop TO BE INDEPENDENT<br>(FIRST coded_sub_block_flag IN TU IS PARSED)<br>NUMBER OF coded_sub_block_flag = 0 (zero subblock) IS COUNTED<br>NUMBER OF coded_sub_block_flag = 0 x NUMBER OF CONTEXT-CODED bins OF subblock IS PASSED (ADDED) TO nonzero subblock<br>MANAGEMENT OF NUMBER OF CONTEXT-CODED bins IS CLOSED IN TU (PREDETERMINED UNIT) |
| | ADVANTAGE OF #1, #2, AND #3<br>ENCODING EFFICIENCY IS IMPROVED |

FIG. 38

<table>
<tr><td>residual_coding( x0, y0, log2TbWidth, log2TbHeight, cIdx ) {</td><td>Descriptor</td></tr>
<tr><td>if( transform_skip_enabled_flag && ( cIdx ! = 0 | | tu_mts_flag[ x0 ][ y0 ] = = 0 ) &&<br>( log2TbWidth <= 2 ) && ( log2TbHeight <= 2 ) )</td><td></td></tr>
<tr><td>transform_skip_flag[ x0 ][ y0 ][ cIdx ]</td><td>ae(v)</td></tr>
<tr><td>if( log2TbWidth > 0 )</td><td></td></tr>
<tr><td>last_sig_coeff_x_prefix</td><td>ae(v)</td></tr>
<tr><td>if( log2TbHeight > 0 )</td><td></td></tr>
<tr><td>last_sig_coeff_y_prefix</td><td>ae(v)</td></tr>
<tr><td>if( last_sig_coeff_x_prefix > 3 )</td><td></td></tr>
<tr><td>last_sig_coeff_x_suffix</td><td>ae(v)</td></tr>
<tr><td>if( last_sig_coeff_y_prefix > 3 )</td><td></td></tr>
<tr><td>last_sig_coeff_y_suffix</td><td>ae(v)</td></tr>
<tr><td>log2SbW = ( Min( log2TbWidth, log2TbHeight ) < 2 ? 1 : 2 )</td><td></td></tr>
<tr><td>log2SbH = log2SbW</td><td></td></tr>
<tr><td>if ( log2TbWidth < 2 && cIdx = = 0 ) {</td><td></td></tr>
<tr><td>log2SbW = log2TbWidth</td><td></td></tr>
<tr><td>log2SbH = 4 − log2SbW</td><td></td></tr>
<tr><td>} else if ( log2TbHeight < 2 && cIdx = = 0 ) {</td><td></td></tr>
<tr><td>log2SbH = log2TbHeight</td><td></td></tr>
<tr><td>log2SbW = 4 − log2SbH</td><td></td></tr>
<tr><td>}</td><td></td></tr>
<tr><td>numSbCoeff = 1 << ( log2SbW + log2SbH )</td><td></td></tr>
<tr><td>lastScanPos = numSbCoeff</td><td></td></tr>
<tr><td>lastSubBlock = ( 1 << ( log2TbWidth + log2TbHeight − ( log2SbW + log2SbH ) ) ) − 1</td><td></td></tr>
<tr><td>do {</td><td></td></tr>
<tr><td>if( lastScanPos = = 0 ) {</td><td></td></tr>
<tr><td>lastScanPos = numSbCoeff</td><td></td></tr>
<tr><td>lastSubBlock − −</td><td></td></tr>
<tr><td>}</td><td></td></tr>
<tr><td>lastScanPos − −</td><td></td></tr>
<tr><td>xS = DiagScanOrder[ log2TbWidth − log2SbW ][ log2TbHeight − log2SbH ]<br>[ lastSubBlock ][ 0 ]</td><td></td></tr>
<tr><td>yS = DiagScanOrder[ log2TbWidth − log2SbW ][ log2TbHeight − log2SbH ]<br>[ lastSubBlock ][ 1 ]</td><td></td></tr>
<tr><td>xC = ( xS << log2SbW ) + DiagScanOrder[ log2SbW ][ log2SbH ][ lastScanPos ][ 0 ]</td><td></td></tr>
<tr><td>yC = ( yS << log2SbH ) + DiagScanOrder[ log2SbW ][ log2SbH ][ lastScanPos ][ 1 ]</td><td></td></tr>
<tr><td>} while( ( xC != LastSignificantCoeffX ) | | ( yC != LastSignificantCoeffY ) )</td><td></td></tr>
<tr><td>numSigCoeff = 0</td><td></td></tr>
<tr><td>QState = 0</td><td></td></tr>
<tr><td></td><td></td></tr>
</table>

FIG. 39

| | |
|---|---|
| /* DECODE/ENCODE SUBBLOCK COEFFICIENT FLAG GROUP FIRST */ | |
| for( i = lastSubBlock; i >= 0; i− − ) { | |
| startQStateSb = QState | |
| xS = DiagScanOrder[ log2TbWidth − log2SbW ][ log2TbHeight − log2SbH ] [ lastSubBlock ][ 0 ] | |
| yS = DiagScanOrder[ log2TbWidth − log2SbW ][ log2TbHeight − log2SbH ] [ lastSubBlock ][ 1 ] | |
| inferSbDcSigCoeffFlag = 0 | |
| if( ( i < lastSubBlock ) && ( i > 0 ) ) { | |
| coded_sub_block_flag[ xS ][ yS ] | ae(v) |
| inferSbDcSigCoeffFlag = 1 | |
| } // End of if( ( i < lastSubBlock ) && ( i > 0 ) ) | |
| | |
| /* COUNT NUMBER OF NONZERO SUBBLOCKS */ | |
| numNonZeroSbk += coded_sub_block_flag[ xS ][ yS ] | |
| | |
| } | |
| | |
| /* SET TEMPORARY UPPER LIMIT VALUE OF NUMBER OF CONTEXT-CODED BINS OF ONE SUBBLOCK */ | |
| remBinPass1Tmp = ( ( log2SbW + log2SbH ) < 4 ? TH1 : TH2 ) | |
| /* SET NUMBER OF EXTRA CONTEXT-CODED BINS remBinPass1InZeroSbk OF ENTIRE ZERO SUBBLOCKS ON BASIS OF NUMBER OF ZERO SUBBLOCKS numZeroSbk */ | |
| remBinPass1InZeroSbk = numZeroSbk * remBinPass1Tmp | |
| /* SET AVERAGE NUMBER OF EXTRA CONTEXT-CODED BINS remBinPass1Extra THAT CAN BE ADDITIONALLY ALLOCATED TO ONE NONZERO SUBBLOCK<br>NOTE THAT LOOK-UP TABLE MAY BE REFERENCED TO AVOID DIVISION */ | |
| remBinPass1Extra = numZeroSbk==0 ? 0 : remBinPass1InZeroSbk / numZeroSbk | |
| | |
| /* INITIALIZE NUMBER OF EXTRA CONTEXT-CODED BINS (remBinPass1Next) THAT CAN BE USED IN NEXT SUBBLOCK */ | |
| remBinPass1Next = 0 | |

FIG. 40

| | | |
|---|---|---|
| for( i = lastSubBlock; i >= 0; i − − ) { | | |
| startQStateSb = QState | | |
| xS = DiagScanOrder[ log2TbWidth − log2SbW ][ log2TbHeight − log2SbH ] [ lastSubBlock ][ 0 ] | | |
| yS = DiagScanOrder[ log2TbWidth − log2SbW ][ log2TbHeight − log2SbH ] [ lastSubBlock ][ 1 ] | | |
| /* SET UPPER LIMIT VALUE remBinsPass1 OF NUMBER OF CONTEXT-CODED BINS REGARDING PROCESSING TARGET SUBBLOCK (subSetId = i) ON BASIS OF TEMPORARY UPPER LIMIT VALUE remBinsPass1Tmp, AVERAGE NUMBER OF EXTRA CONTEXT-CODED BINS THAT CAN BE ADDITIONALLY USED FROM ZERO SUBBLOCK, AND NUMBER OF EXTRA CONTEXT-CODED BINS remBinsPassNext OF PREVIOUS SUBBLOCK */ | | |
| remBinsPass1 = remBinsPass1Tmp + remBinsPass1Extra + remBinsPass1Next | | |
| | | |
| firstPosMode0 = ( i = = lastSubBlock ? lastScanPos − 1 : numSbCoeff − 1 ) | | |
| firstPosMode1 = −1 | | |
| firstPosMode2 = −1 | | |
| for( n = ( i = = firstPosMode0; n >= 0 && remBinsPass1 >= TH3; n − − ) { | | |
| xC = ( xS << log2SbW ) + DiagScanOrder[ log2SbW ][ log2SbH ][ n ][ 0 ] | | |
| yC = ( yS << log2SbH ) + DiagScanOrder[ log2SbW ][ log2SbH ][ n ][ 1 ] | | |
| if( coded_sub_block_flag[ xS ][ yS ] && ( n > 0 \|\| !inferSbDcSigCoeffFlag ) ) { | | |
| sig_coeff_flag[ xC ][ yC ] | ae(v) | |
| remBinsPass1 − − | | |
| if( sig_coeff_flag[ xC ][ yC ] ) | | |
| inferSbDcSigCoeffFlag = 0 | | |
| } // End of if( coded_sub_block_flag[ xS ][ yS ] &&( n > 0 \|\| !inferSbDcSigCoeffFlag ) ) | | |
| if( sig_coeff_flag[ xC ][ yC ] ) { | | |
| numSigCoeff++ | | |
| abs_level_gt1_flag[ n ] | ae(v) | |
| remBinsPass1 − − | | |
| if( abs_level_gt1_flag[ n ] ) { | | |
| par_level_flag[ n ] | ae(v) | |
| remBinsPass1 − − | | |
| abs_level_gt3_flag[ n ] | ae(v) | |
| remBinsPass1 − − | | |
| } | | |
| if( lastSigScanPosSb = = −1 ) | | |
| lastSigScanPosSb = n | | |
| firstSigScanPosSb = n | | |
| } // End of if( sig_coeff_flag[ xC ][ yC ] ) | | |
| AbsLevelPass1[ xC ][ yC ] = sig_coeff_flag[ xC ][ yC ] + par_level_flag[ n ] + abs_level_gt1_flag[ n ] + 2 * abs_level_gt3_flag[ n ] | | |
| if( dep_quant_enabled_flag ) | | |
| QState = QStateTransTable[ QState ][ AbsLevelPass1[ xC ][ yC ] & 1 ] | | |
| if( remBinsPass1 < TH3 ) | | |
| firstPosMode2 = n − 1 | | |
| } // End of for( n = ( i = = firstPosMode0; n >= 0 && remBinsPass1 >= TH3; n − − ) | | |
| /* SET NUMBER OF REMAINING CONTEXT-CODED BINS remBinPass1 IN FIRST LOOP OF CURRENT PROCESSING SUBBLOCK TO NUMBER OF EXTRA CONTEXT-CODED BINS remBinPass1Next THAT CAN BE USED IN NEXT SUBBLOCK */ | | |
| remBinPass1Next = remBinPass1 | | |
| for( n = numSbCoeff − 1; n >= firstPosMode2; n − − ) { | | |
| xC = ( xS << log2SbW ) + DiagScanOrder[ log2SbW ][ log2SbH ][ n ][ 0 ] | | |
| yC = ( yS << log2SbH ) + DiagScanOrder[ log2SbW ][ log2SbH ][ n ][ 1 ] | | |
| if( abs_level_gt3_flag[ n ] ) | | |
| abs_remainder[ n ] | ae(v) | |
| AbsLevel[ xC ][ yC ] = AbsLevelPass1[ xC ][ yC ] + 2 * abs_remainder[ n ] ) | | |
| } // End of for( n = numSbCoeff − 1; n >= firstPosMode2; n − − ) | | |
| for( n = firstPosMode2; n >= 0; n − − ) { | | |
| xC = ( xS << log2SbW ) + DiagScanOrder[ log2SbW ][ log2SbH ][ n ][ 0 ] | | |
| yC = ( yS << log2SbH ) + DiagScanOrder[ log2SbW ][ log2SbH ][ n ][ 1 ] | | |
| dec_abs_level[ n ] | ae(v) | |
| if(AbsLevel[ xC ][ yC ] > 0 ) | | |
| firstSigScanPosSb = n | | |
| if( dep_quant_enabled_flag ) | | |
| QState = QStateTransTable[ QState ][ AbsLevel[ xC ][ yC ] & 1 ] | | |
| } // End of for( n = firstPosMode2; n >= 0; n − − ) | | |

FIG. 41

| | | |
|---|---|---|
| if( dep_quant_enabled_flag \|\| !sign_data_hiding_enabled_flag ) | | |
| signHidden = 0 | | |
| Else | | |
| signHidden = ( lastSigScanPosSb − firstSigScanPosSb > 3 ? 1 : 0 ) | | |
| for( n = numSbCoeff − 1; n >= 0; n− − ) { | | |
| xC = ( xS << log2SbW ) + DiagScanOrder[ log2SbW ][ log2SbH ][ n ][ 0 ] | | |
| yC = ( yS << log2SbH ) + DiagScanOrder[ log2SbW ][ log2SbH ][ n ][ 1 ] | | |
| if( sig_coeff_flag[ xC ][ yC ] && ( !signHidden \|\| ( n != firstSigScanPosSb ) ) ) | | |
| coeff_sign_flag[ n ] | ae(v) | |
| } // for( n = numSbCoeff − 1; n >= 0; n− − ) | | |
| if( dep_quant_enabled_flag ) { | | |
| QState = startQStateSb | | |
| for( n = numSbCoeff − 1; n >= 0; n− − ) { | | |
| xC = ( xS << log2SbW ) + DiagScanOrder[ log2SbW ][ log2SbH ][ n ][ 0 ] | | |
| yC = ( yS << log2SbH ) + DiagScanOrder[ log2SbW ][ log2SbH ][ n ][ 1 ] | | |
| if( sig_coeff_flag[ xC ][ yC ] ) | | |
| TransCoeffLevel[ x0 ][ y0 ][ cIdx ][ xC ][ yC ] = ( 2 * AbsLevel[ xC ][ yC ] − ( QState > 1 ? 1 : 0 ) ) * ( 1 − 2 * coeff_sign_flag[ n ] ) | | |
| QState = QStateTransTable[ QState ][ par_level_flag[ n ] ] | | |
| } else { | | |
| sumAbsLevel = 0 | | |
| for( n = numSbCoeff − 1; n >= 0; n− − ) { | | |
| xC = ( xS << log2SbW ) + DiagScanOrder[ log2SbW ][ log2SbH ][ n ][ 0 ] | | |
| yC = ( yS << log2SbH ) + DiagScanOrder[ log2SbW ][ log2SbH ][ n ][ 1 ] | | |
| if( sig_coeff_flag[ xC ][ yC ] ) { | | |
| TransCoeffLevel[ x0 ][ y0 ][ cIdx ][ xC ][ yC ] = AbsLevel[ xC ][ yC ] * ( 1 − 2 * coeff_sign_flag[ n ] ) | | |
| if( signHidden ) { | | |
| sumAbsLevel += AbsLevel[ xC ][ yC ] | | |
| if( ( n = = firstSigScanPosSb ) && ( sumAbsLevel % 2 ) = = 1 ) ) | | |
| TransCoeffLevel[ x0 ][ y0 ][ cIdx ][ xC ][ yC ] = − TransCoeffLevel[ x0 ][ y0 ][ cIdx ][ xC ][ yC ] | | |
| } // End of if( signHidden ) | | |
| } // End of if( sig_coeff_flag[ xC ][ yC ] ) | | |
| } // End of for( n = numSbCoeff − 1; n >= 0; n− − ) | | |
| } // End of if( dep_quant_enabled_flag ) | | |
| | | |
| } // End of for( i = lastSubBlock; i >= 0; i− − ) /* LOOP IN UNITS OF SUBBLOCK */ | | |
| } | | |

FIG. 44

| | |
|---|---|
| #5 | APPLICATION OF #1 |
| | #1 +PRIORITY FOR ALLOCATING NUMBER OF REMAINING CONTEXT-CODED bins IS CHANGED ACCORDING TO POSITION OF subblock<br>FOR EXAMPLE, IN CASE OF LOW-RANGE subblock, LARGER NUMBER OF REMAINING CONTEXT-CODED bins IS ALLOCATED, AND IN CASE OF HIGH-RANGE subblock, LESS NUMBER OF RESIDUAL CONTEXT-CODED bins IS ALLOCATED |
| | ENCODING EFFICIENCY IS IMPROVED |

FIG. 46

| | |
|---|---|
| #6 | UNIT FOR MANAGING NUMBER OF CONTEXT-CODED bins IS EXTENDED TO SIZE (CU, VPDU, CTU) LARGER THAN TU |
| | UNIT FOR MANAGING NUMBER OF CONTEXT-CODED bins IS EXTENDED TO SIZE (CU, VPDU, CTU) LARGER THAN TU |
| | NUMBER OF CONTEXT-CODED bins CAN BE ALLOCATED WITH HIGHER DEGREE OF FREEDOM<br>ENCODING EFFICIENCY IS IMPROVED<br>IMAGE QUALITY IS IMPROVED |

FIG. 48

| | |
|---|---|
| #7 | UPPER LIMIT OF MAXIMUM VALUE OF NUMBER OF CONTEXT-CODED bins IN syntax STRUCTURE IS ELIMINATED |
| | UPPER LIMIT OF MAXIMUM VALUE IN syntax STRUCTURE IS ELIMINATED<br>AMOUNT OF bins GENERATED IS LIMITED (BY Level RESTRICTION OR CONDITIONAL EXPRESSION)<br>AMOUNT OF GENERATION IS LIMITED IN TU UNIT, CU UNIT, VPDU UNIT, CTU UNIT, PIC UNIT INSTEAD OF SubBlock UNIT |
| | MANY COEFFICIENTS CAN BE EXPRESSED BY flags WHEN LOCAL COEFFICIENT DATA IS GENERATED, AND ENCODING EFFICIENCY (IMAGE QUALITY) IS IMPROVED |

*FIG. 51*

<table>
<tr><td>residual_coding( x0, y0, log2TbWidth, log2TbHeight, cIdx ) {</td><td>Descriptor</td></tr>
<tr><td>if( ( tu_mts_idx[ x0 ][ y0 ] > 0 | |<br>( cu_sbt_flag && log2TbWidth < 6 && log2TbHeight < 6 ) )<br>&& cIdx = = 0 && log2TbWidth > 4 )</td><td></td></tr>
<tr><td>log2ZoTbWidth = 4</td><td></td></tr>
<tr><td>else</td><td></td></tr>
<tr><td>log2ZoTbWidth = Min( log2TbWidth, 5 )</td><td></td></tr>
<tr><td>MaxCcbs = 2 * ( 1 << log2TbWidth ) * ( 1<< log2TbHeight )</td><td></td></tr>
<tr><td>if( tu_mts_idx[ x0 ][ y0 ] > 0 | |<br>( cu_sbt_flag && log2TbWidth < 6 && log2TbHeight < 6 ) )<br>&& cIdx = = 0 && log2TbHeight > 4 )</td><td></td></tr>
<tr><td>log2ZoTbHeight = 4</td><td></td></tr>
<tr><td>else</td><td></td></tr>
<tr><td>log2ZoTbHeight = Min( log2TbHeight, 5 )</td><td></td></tr>
<tr><td>if( log2TbWidth > 0 )</td><td></td></tr>
<tr><td>last_sig_coeff_x_prefix</td><td>ae(v)</td></tr>
<tr><td>if( log2TbHeight > 0 )</td><td></td></tr>
<tr><td>last_sig_coeff_y_prefix</td><td>ae(v)</td></tr>
<tr><td>if( last_sig_coeff_x_prefix > 3 )</td><td></td></tr>
<tr><td>last_sig_coeff_x_suffix</td><td>ae(v)</td></tr>
<tr><td>if( last_sig_coeff_y_prefix > 3 )</td><td></td></tr>
<tr><td>last_sig_coeff_y_suffix</td><td>ae(v)</td></tr>
<tr><td>log2TbWidth = log2ZoTbWidth</td><td></td></tr>
<tr><td>log2TbHeight = log2ZoTbHeight</td><td></td></tr>
<tr><td>remBinsPass1 = ( ( 1 << ( log2TbWidth + log2TbHeight ) ) * 7 ) >> 2</td><td></td></tr>
<tr><td>log2SbW = ( Min( log2TbWidth, log2TbHeight ) < 2 ? 1 : 2 )</td><td></td></tr>
<tr><td>log2SbH = log2SbW</td><td></td></tr>
<tr><td>if( log2TbWidth + log2TbHeight > 3 ) {</td><td></td></tr>
<tr><td>if( log2TbWidth < 2 ) {</td><td></td></tr>
<tr><td>log2SbW = log2TbWidth</td><td></td></tr>
<tr><td>log2SbH = 4 − log2SbW</td><td></td></tr>
<tr><td>} else if( log2TbHeight < 2 ) {</td><td></td></tr>
<tr><td>log2SbH = log2TbHeight</td><td></td></tr>
<tr><td>log2SbW = 4 − log2SbH</td><td></td></tr>
<tr><td>}</td><td></td></tr>
<tr><td>}</td><td></td></tr>
<tr><td>numSbCoeff = 1 << ( log2SbW + log2SbH )</td><td></td></tr>
<tr><td>lastScanPos = numSbCoeff</td><td></td></tr>
<tr><td>lastSubBlock = ( 1 << ( log2TbWidth + log2TbHeight − ( log2SbW + log2SbH ) ) ) − 1</td><td></td></tr>
<tr><td>do {</td><td></td></tr>
<tr><td>if( lastScanPos = = 0 ) {</td><td></td></tr>
<tr><td>lastScanPos = numSbCoeff</td><td></td></tr>
<tr><td>lastSubBlock− −</td><td></td></tr>
<tr><td>}</td><td></td></tr>
<tr><td>lastScanPos− −</td><td></td></tr>
<tr><td>xS = DiagScanOrder[ log2TbWidth − log2SbW ][ log2TbHeight − log2SbH ]<br>[ lastSubBlock ][ 0 ]</td><td></td></tr>
<tr><td>yS = DiagScanOrder[ log2TbWidth − log2SbW ][ log2TbHeight − log2SbH ]<br>[ lastSubBlock ][ 1 ]</td><td></td></tr>
<tr><td>xC = ( xS << log2SbW ) + DiagScanOrder[ log2SbW ][ log2SbH ][ lastScanPos ][ 0 ]</td><td></td></tr>
<tr><td>yC = ( yS << log2SbH ) + DiagScanOrder[ log2SbW ][ log2SbH ][ lastScanPos ][ 1 ]</td><td></td></tr>
<tr><td>} while( ( xC != LastSignificantCoeffX ) | | ( yC != LastSignificantCoeffY ) )</td><td></td></tr>
<tr><td>if( lastSubBlock = = 0 && log2TbWidth >= 2 && log2TbHeight >= 2 &&<br>!transform_skip_flag[ x0 ][ y0 ] && lastScanPos > 0 )</td><td></td></tr>
<tr><td>LfnstDcOnly = 0</td><td></td></tr>
<tr><td>if( ( lastSubBlock > 0 && log2TbWidth >= 2 && log2TbHeight >= 2 ) | |<br>( lastScanPos > 7 && ( log2TbWidth = = 2 | | log2TbWidth = = 3 ) &&<br>log2TbWidth = = log2TbHeight ) )</td><td></td></tr>
<tr><td>LfnstZeroOutSigCoeffFlag = 0</td><td></td></tr>
<tr><td>QState = 0</td><td></td></tr>
</table>

FIG. 52

<table>
<tr><td>for( i = lastSubBlock; i >= 0; i − − ) {</td><td></td><td></td></tr>
<tr><td>startQStateSb = QState</td><td></td><td></td></tr>
<tr><td>xS = DiagScanOrder[ log2TbWidth − log2SbW ][ log2TbHeight − log2SbH ]<br>[ i ][ 0 ]</td><td></td><td></td></tr>
<tr><td>yS = DiagScanOrder[ log2TbWidth − log2SbW ][ log2TbHeight − log2SbH ]<br>[ i ][ 1 ]</td><td></td><td></td></tr>
<tr><td>inferSbDcSigCoeffFlag = 0</td><td></td><td></td></tr>
<tr><td>if( ( i < lastSubBlock ) && ( i > 0 ) ) {</td><td></td><td></td></tr>
<tr><td>coded_sub_block_flag[ xS ][ yS ]</td><td>ae(v)</td><td></td></tr>
<tr><td>inferSbDcSigCoeffFlag = 1</td><td></td><td></td></tr>
<tr><td>}</td><td></td><td></td></tr>
<tr><td>firstSigScanPosSb = numSbCoeff</td><td></td><td></td></tr>
<tr><td>lastSigScanPosSb = −1</td><td></td><td></td></tr>
<tr><td>firstPosMode0 = ( i = = lastSubBlock ? lastScanPos : numSbCoeff − 1 )</td><td></td><td></td></tr>
<tr><td>firstPosMode1 = −1</td><td></td><td></td></tr>
<tr><td>for( n = firstPosMode0; n >= 0 && remBinsPass1 >= 4; n − − ) {</td><td></td><td></td></tr>
<tr><td>xC = ( xS << log2SbW ) + DiagScanOrder[ log2SbW ][ log2SbH ][ n ][ 0 ]</td><td></td><td></td></tr>
<tr><td>yC = ( yS << log2SbH ) + DiagScanOrder[ log2SbW ][ log2SbH ][ n ][ 1 ]</td><td></td><td></td></tr>
<tr><td>if( coded_sub_block_flag[ xS ][ yS ] && ( n > 0 | | !inferSbDcSigCoeffFlag ) &&<br>( xC != LastSignificantCoeffX | | yC != Last SignificantCoeffY ) ) {</td><td></td><td></td></tr>
<tr><td>sig_coeff_flag[ xC ][ yC ]</td><td>ae(v)</td><td></td></tr>
<tr><td>remBinsPass1 − −</td><td></td><td></td></tr>
<tr><td>if( sig_coeff_flag[ xC ][ yC ] )</td><td></td><td></td></tr>
<tr><td>inferSbDcSigCoeffFlag = 0</td><td></td><td></td></tr>
<tr><td>}</td><td></td><td></td></tr>
<tr><td>if( sig_coeff_flag[ xC ][ yC ] ) {</td><td></td><td></td></tr>
<tr><td>abs_level_gtx_flag[ n ][ 0 ]</td><td>ae(v)</td><td></td></tr>
<tr><td>remBinsPass1 − −</td><td></td><td></td></tr>
<tr><td>if( abs_level_gtx_flag[ n ][ 0 ] ) {</td><td></td><td></td></tr>
<tr><td>par_level_flag[ n ]</td><td>ae(v)</td><td></td></tr>
<tr><td>remBinsPass1 − −</td><td></td><td></td></tr>
<tr><td>abs_level_gtx_flag[ n ][ 1 ]</td><td>ae(v)</td><td></td></tr>
<tr><td>remBinsPass1 − −</td><td></td><td></td></tr>
<tr><td>}</td><td></td><td></td></tr>
<tr><td>if( lastSigScanPosSb = = −1 )</td><td></td><td></td></tr>
<tr><td>lastSigScanPosSb = n</td><td></td><td></td></tr>
<tr><td>firstSigScanPosSb = n</td><td></td><td></td></tr>
<tr><td>}</td><td></td><td></td></tr>
<tr><td>AbsLevelPass1[ xC ][ yC ] = sig_coeff_flag[ xC ][ yC ] + par_level_flag[ n ] +<br>abs_level_gtx_flag[ n ][ 0 ] + 2 * abs_level_gtx_flag[ n ][ 1 ]</td><td></td><td></td></tr>
<tr><td>if( dep_quant_enabled_flag )</td><td></td><td></td></tr>
<tr><td>QState = QStateTransTable[ QState ][ AbsLevelPass1[ xC ][ yC ] & 1 ]</td><td></td><td></td></tr>
<tr><td>if( remBinsPass1 < 4 )</td><td></td><td></td></tr>
<tr><td>firstPosMode1 = n − 1</td><td></td><td></td></tr>
<tr><td>}</td><td></td><td></td></tr>
<tr><td>for( n = numSbCoeff − 1, n >= firstPosMode1; n − − ) {</td><td></td><td></td></tr>
<tr><td>xC = ( xS << log2SbW ) + DiagScanOrder[ log2SbW ][ log2SbH ][ n ][ 0 ]</td><td></td><td></td></tr>
<tr><td>yC = ( yS << log2SbH ) + DiagScanOrder[ log2SbW ][ log2SbH ][ n ][ 1 ]</td><td></td><td></td></tr>
<tr><td>if( abs_level_gtx_flag[ n ][ 1 ] )</td><td></td><td></td></tr>
<tr><td>abs_remainder[ n ]</td><td>ae(v)</td><td></td></tr>
<tr><td>AbsLevel[ xC ][ yC ] = AbsLevelPass1[ xC ][ yC ] +2 * abs_remainder[ n ]</td><td></td><td></td></tr>
<tr><td>}</td><td></td><td></td></tr>
</table>

FIG. 53

<table>
<tr><td>for( n = firstPosMode1; n >= 0; n− − ) {</td><td></td><td></td></tr>
<tr><td>xC = ( xS << log2SbW ) + DiagScanOrder[ log2SbW ][ log2SbH ][ n ][ 0 ]</td><td></td><td></td></tr>
<tr><td>yC = ( yS << log2SbH ) + DiagScanOrder[ log2SbW ][ log2SbH ][ n ][ 1 ]</td><td></td><td></td></tr>
<tr><td>dec_abs_level[ n ]</td><td>ae(v)</td><td></td></tr>
<tr><td>if(AbsLevel[ xC ][ yC ] > 0 )</td><td></td><td></td></tr>
<tr><td>firstSigScanPosSb = n</td><td></td><td></td></tr>
<tr><td>if( dep_quant_enabled_flag )</td><td></td><td></td></tr>
<tr><td>QState = QStateTransTable[ QState ][ AbsLevel[ xC ][ yC ] & 1 ]</td><td></td><td></td></tr>
<tr><td>}</td><td></td><td></td></tr>
<tr><td>if( dep_quant_enabled_flag || !sign_data_hiding_enabled_flag )</td><td></td><td></td></tr>
<tr><td>signHidden = 0</td><td></td><td></td></tr>
<tr><td>else</td><td></td><td></td></tr>
<tr><td>signHidden = ( lastSigScanPosSb − firstSigScanPosSb > 3 ? 1 : 0 )</td><td></td><td></td></tr>
<tr><td>for( n = numSbCoeff − 1; n >= 0; n− − ) {</td><td></td><td></td></tr>
<tr><td>xC = ( xS << log2SbW ) + DiagScanOrder[ log2SbW ][ log2SbH ][ n ][ 0 ]</td><td></td><td></td></tr>
<tr><td>yC = ( yS << log2SbH ) + DiagScanOrder[ log2SbW ][ log2SbH ][ n ][ 1 ]</td><td></td><td></td></tr>
<tr><td>if( ( AbsLevel[ xC ][ yC ] > 0 ) &&<br>( !signHidden || ( n != firstSigScanPosSb ) ) )</td><td></td><td></td></tr>
<tr><td>coeff_sign_flag[ n ]</td><td>ae(v)</td><td></td></tr>
<tr><td>}</td><td></td><td></td></tr>
<tr><td>if( dep_quant_enabled_flag ) {</td><td></td><td></td></tr>
<tr><td>QState = startQStateSb</td><td></td><td></td></tr>
<tr><td>for( n = numSbCoeff − 1; n >= 0; n− − ) {</td><td></td><td></td></tr>
<tr><td>xC = ( xS << log2SbW ) + DiagScanOrder[ log2SbW ][ log2SbH ][ n ][ 0 ]</td><td></td><td></td></tr>
<tr><td>yC = ( yS << log2SbH ) + DiagScanOrder[ log2SbW ][ log2SbH ][ n ][ 1 ]</td><td></td><td></td></tr>
<tr><td>if( AbsLevel[ xC ][ yC ] > 0 )</td><td></td><td></td></tr>
<tr><td>TransCoeffLevel[ x0 ][ y0 ][ cIdx ][ xC ][ yC ] =<br>( 2 * AbsLevel[ xC ][ yC ] − ( QState > 1 ? 1 : 0 ) ) *<br>( 1 − 2 * coeff_sign_flag[ n ] )</td><td></td><td></td></tr>
<tr><td>QState = QStateTransTable[ QState ][ par_level_flag[ n ] ]</td><td></td><td></td></tr>
<tr><td>} else {</td><td></td><td></td></tr>
<tr><td>sumAbsLevel = 0</td><td></td><td></td></tr>
<tr><td>for( n = numSbCoeff − 1; n >= 0; n− − ) {</td><td></td><td></td></tr>
<tr><td>xC = ( xS << log2SbW ) + DiagScanOrder[ log2SbW ][ log2SbH ][ n ][ 0 ]</td><td></td><td></td></tr>
<tr><td>yC = ( yS << log2SbH ) + DiagScanOrder[ log2SbW ][ log2SbH ][ n ][ 1 ]</td><td></td><td></td></tr>
<tr><td>if( AbsLevel[ xC ][ yC ] > 0 ) {</td><td></td><td></td></tr>
<tr><td>TransCoeffLevel[ x0 ][ y0 ][ cIdx ][ xC ][ yC ] =<br>AbsLevel[ xC ][ yC ] * ( 1 − 2 * coeff_sign_flag[ n ] )</td><td></td><td></td></tr>
<tr><td>if( signHidden ) {</td><td></td><td></td></tr>
<tr><td>sumAbsLevel += AbsLevel[ xC ][ yC ]</td><td></td><td></td></tr>
<tr><td>if( ( n = = firstSigScanPosSb ) && ( sumAbsLevel % 2 ) = = 1 ) )</td><td></td><td></td></tr>
<tr><td>TransCoeffLevel[ x0 ][ y0 ][ cIdx ][ xC ][ yC ] =<br>− TransCoeffLevel[ x0 ][ y0 ][ cIdx ][ xC ][ yC ]</td><td></td><td></td></tr>
<tr><td>}</td><td></td><td></td></tr>
<tr><td>}</td><td></td><td></td></tr>
<tr><td>}</td><td></td><td></td></tr>
<tr><td>}</td><td></td><td></td></tr>
<tr><td>}</td><td></td><td></td></tr>
<tr><td>}</td><td></td><td></td></tr>
</table>

FIG. 55

| | |
|---|---|
| #8 | UPPER LIMIT OF MAXIMUM VALUE OF NUMBER OF CONTEXT-CODED bins IN syntax STRUCTURE IS ELIMINATED |
| | UPPER LIMIT OF MAXIMUM VALUE OF NUMBER OF CONTEXT-CODED bins IN syntax STRUCTURE IS ELIMINATED<br>MAXIMUM NUMBER OF flags IS CAUSED TO BE OUTPUT IN subblock (nonzero subblock) NEXT TO zero subblock (EXAMPLE 1)<br>MAXIMUM NUMBER OF flags IS CAUSED TO BE OUTPUT IN SAME NUMBER OF subblocks (nonzero subblocks) IN CASE WHERE zero subblocks ARE CONTINUOUS (EXAMPLE 2) |
| | MANY COEFFICIENTS CAN BE EXPRESSED BY flags WHEN LOCAL COEFFICIENT DATA IS GENERATED, AND ENCODING EFFICIENCY (IMAGE QUALITY) IS IMPROVED |

IMAGE PROCESSING APPARATUS AND METHOD

CROSS-REFERENCE TO RELATED APPLICATIONS

The present application is a continuation of U.S. application Ser. No. 17/424,184, filed Jul. 20, 2021, which is based on PCT filing PCT/JP2020/004559, filed Feb. 6, 2020, which claims priority to U.S. 62/802,477, filed Feb. 7, 2019, the entire contents of each are incorporated herein by reference.

TECHNICAL FIELD

The present disclosure relates to an image processing apparatus and method, and particularly to an image processing apparatus and method capable of suppressing a reduction in encoding efficiency.

BACKGROUND ART

Conventionally, in CABAC for image encoding, the larger the number of context-coded bins when expressing a syntax element value, the better the encoding efficiency and the more a reduction in image quality can be suppressed. However, as the number of context-coded bins increases, the amount of processing increases. Therefore, a method of restricting the number of context-coded bins in units of subblock has been proposed (for example, Non-Patent Document 1).

CITATION LIST

Non-Patent Document

Non-Patent Document 1: T.-D. Chuang, S.-T. Hsiang, Z.-Y. Lin, C.-Y. Chen, Y.-W. Huang, S.-M. Lei (MediaTek), "CE7 (Tests 7.1, 7.2, 7.3, and 7.4): Constraints on context-coded bins for coefficient coding", JVET-M0173, Joint Video Exploration Team (JVET) of ITU-T SG 16 WP 3 and ISO/IEC JTC 1/SC 29/WG 11 13th Meeting: Marrakech, MA, 9-18 Jan. 2019

SUMMARY OF THE INVENTION

Problems to be Solved by the Invention

However, in the case of this method, since the number of context-coded bins is uniformly restricted, the coefficient data cannot be increased or decreased locally according to the characteristics of the image, and there has been a possibility that the encoding efficiency is unnecessarily reduced.

The present disclosure has been made in view of such circumstances and can suppress a reduction in encoding efficiency.

Solutions to Problems

An image processing apparatus of an aspect of the present technology is an image processing apparatus including: a syntax element value derivation unit that sets an upper limit value of the number of bins allocated to a processing target subblock by distributing the number of bins among nonzero subblocks and derives a syntax element value regarding the processing target subblock by using coefficient data derived from image data so that the number of bins does not exceed the upper limit value; and an encode unit that encodes the syntax element value derived and generates coded data.

An image processing method of an aspect of the present technology is an image processing method including: setting an upper limit value of the number of bins allocated to a processing target subblock by distributing the number of bins among nonzero subblocks and deriving a syntax element value regarding the processing target subblock by using coefficient data derived from image data so that the number of bins does not exceed the upper limit value; and encoding the syntax element value derived and generating coded data.

An image processing apparatus of another aspect of the present technology is an image processing apparatus including: a decode unit that decodes coded data and generates a syntax element value; and a coefficient data derivation unit that sets an upper limit value of the number of bins allocated to a processing target subblock by distributing the number of bins among nonzero subblocks and derives coefficient data corresponding to image data regarding the processing target subblock by using the syntax element value generated so that the number of bins does not exceed the upper limit value.

An image processing method of another aspect of the present technology is an image processing method including: decoding coded data and generating a syntax element value; and setting an upper limit value of the number of bins allocated to a processing target subblock by distributing the number of bins among nonzero subblocks and deriving coefficient data corresponding to image data regarding the processing target subblock by using the syntax element value generated so that the number of bins does not exceed the upper limit value.

An image processing apparatus of yet another aspect of the present technology is an image processing apparatus including: a syntax element value derivation unit that sets an upper limit value of the number of bins allocated to a processing target subblock by distributing the number of bins allocated to a zero subblock to a nonzero subblock and derives a syntax element value regarding the processing target subblock by using coefficient data derived from image data so that the number of bins does not exceed the upper limit value; and an encode unit that encodes the syntax element value derived and generates coded data.

An image processing method of yet another aspect of the present technology is an image processing method including: setting an upper limit value of the number of bins allocated to a processing target subblock by distributing the number of bins allocated to a zero subblock to a nonzero subblock and deriving a syntax element value regarding the processing target subblock by using coefficient data derived from image data so that the number of bins does not exceed the upper limit value; and encoding the syntax element value derived and generating coded data.

An image processing apparatus of yet another aspect of the present technology is an image processing apparatus including: a decode unit that decodes coded data and generates a syntax element value; and a coefficient data derivation unit that sets an upper limit value of the number of bins allocated to a processing target subblock by distributing the number of bins allocated to a zero subblock to a nonzero subblock and derives coefficient data corresponding to image data regarding the processing target subblock by using the syntax element value generated so that the number of bins does not exceed the upper limit value.

An image processing method of yet another aspect of the present technology is an image processing method including: decoding coded data and generating a syntax element value; and setting an upper limit value of the number of bins allocated to a processing target subblock by distributing the number of bins allocated to a zero subblock to a nonzero subblock and deriving coefficient data corresponding to image data regarding the processing target subblock by using the syntax element value generated so that the number of bins does not exceed the upper limit value.

In the image processing apparatus and method of an aspect of the present technology, an upper limit value of the number of bins allocated to a processing target subblock by distributing the number of bins among nonzero subblocks is set, a syntax element value is derived regarding the processing target subblock by using coefficient data derived from image data so that the number of bins does not exceed the upper limit value and the syntax element value derived is encoded and coded data is generated.

In the image processing apparatus and method of another aspect of the present technology, coded data is decoded and a syntax element value is generated, and an upper limit value of the number of bins allocated to a processing target subblock by distributing the number of bins among nonzero subblocks is set and coefficient data corresponding to image data is derived regarding the processing target subblock by using the syntax element value generated so that the number of bins does not exceed the upper limit value.

In the image processing apparatus and method of yet another aspect of the present technology, an upper limit value of the number of bins allocated to a processing target subblock by distributing the number of bins allocated to a zero subblock to a nonzero subblock is set, a syntax element value is derived regarding the processing target subblock by using coefficient data derived from image data so that the number of bins does not exceed the upper limit value and the syntax element value derived is encoded and coded data is generated.

In the image processing apparatus and method of yet another aspect of the present technology, coded data is decoded and a syntax element value is generated, and an upper limit value of the number of bins allocated to a processing target subblock by distributing the number of bins allocated to a zero subblock to a nonzero subblock is set and coefficient data corresponding to image data is derived regarding the processing target subblock by using the syntax element value generated so that the number of bins does not exceed the upper limit value.

BRIEF DESCRIPTION OF DRAWINGS

FIG. 2 is a diagram explaining method #1.

FIG. 8 is a diagram showing an example of a syntax.

FIG. 9 is a diagram following FIG. 8 showing an example of a syntax.

FIG. 10 is a diagram following FIG. 9 showing an example of a syntax.

FIG. 11 is a diagram following FIG. 10 showing an example of a syntax.

FIG. 18 is a diagram explaining method #2.

FIG. 21 is a diagram showing an example of a syntax.

FIG. 22 is a diagram following FIG. 21 showing an example of a syntax.

FIG. 23 is a diagram following FIG. 22 showing an example of a syntax.

FIG. 24 is a diagram following FIG. 23 showing an example of a syntax.

FIG. 26 is a diagram explaining method #3.

FIG. 29 is a diagram showing an example of a syntax.

FIG. 30 is a diagram following FIG. 29 showing an example of a syntax.

FIG. 31 is a diagram following FIG. 30 showing an example of a syntax.

FIG. 32 is a diagram following FIG. 31 showing an example of a syntax.

FIG. 34 is a diagram explaining method #4.

FIG. 38 is a diagram showing an example of a syntax.

FIG. 39 is a diagram following FIG. 38 showing an example of a syntax.

FIG. 40 is a diagram following FIG. 39 showing an example of a syntax.

FIG. 41 is a diagram following FIG. 40 showing an example of a syntax.

FIG. 44 is a diagram explaining method #5.

FIG. 46 is a diagram explaining method #6.

FIG. 48 is a diagram explaining method #7.

FIG. 51 is a diagram showing an example of a syntax.

FIG. 52 is a diagram following FIG. 51 showing an example of a syntax.

FIG. 53 is a diagram following FIG. 52 showing an example of a syntax.

FIG. 55 is a diagram explaining method #8.

MODE FOR CARRYING OUT THE INVENTION

Figure 1:
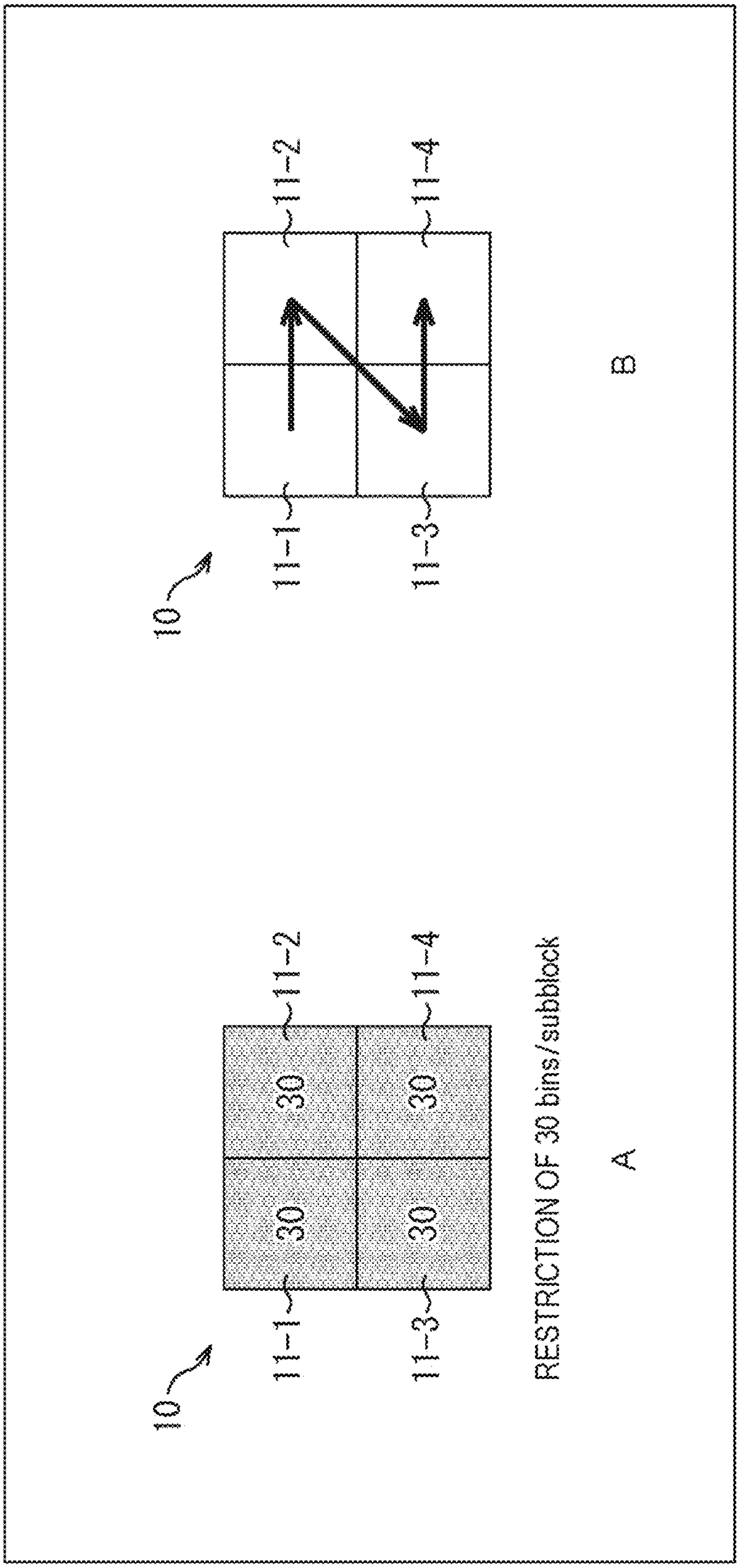
FIG. 1 is a diagram explaining subblocks.

Modes for carrying out the present disclosure (hereinafter, the embodiments) are described below. Note that description will be presented in the following order.

1. CABAC
2. First embodiment (passing the number of bins of zero subblock to nonzero subblock)
3. Second embodiment (sharing maximum bins within nonzero subblock)
4. Third embodiment (using extra bins of nonzero subblock in another nonzero subblock)
5. Fourth embodiment (composite of #1, #2, and #3)
6. Fifth embodiment (application of #1)
7. Sixth embodiment (extending the unit for managing the number of context-coded bins to a size larger than TU (CU, VPDU, CTU, and the like))
8. Seventh embodiment (eliminating the upper limit of the maximum value of the number of context-coded bins in syntax structure)
9. Eighth embodiment (maximizing the number of bins of nonzero subblock next to zero subblock)
10. Ninth embodiment (application to image encode apparatus and image decode apparatus)
11. Appendix

1. CABAC

Documents and the Like that Support Technical Contents and Technical Terms

The scope disclosed in the present technology is not limited to the contents described in the embodiments, but covers the contents described in the following non-patent documents and the like known at the time of filing and the contents of other documents that are referred to in the following non-patent documents.

Non-Patent Document 1: (described above)

Non-Patent Document 2: Recommendation ITU-T H.264 (April 2017) "Advanced video coding for generic audiovisual services", April 2017

Non-Patent Document 3: Recommendation ITU-T H.265 (December 2016) "High efficiency video coding", December 2016

Non-Patent Document 4: J. Chen, E. Alshina, G. J. Sullivan, J.-R. Ohm, J. Boyce, "Algorithm Description of Joint Exploration Test Model (JEM7)", JVET-G1001, Joint Video Exploration Team (JVET) of ITU-T SG 16 WP 3 and ISO/IEC JTC 1/SC 29/WG 11 7th Meeting: Torino, IT, 13-21 Jul. 2017

Non-Patent Document 5: B. Bross, J. Chen, S. Liu, "Versatile Video Coding (Draft 3)," JVET-L1001, Joint Video Experts Team (JVET) of ITU-T SG 16 WP 3 and ISO/IEC JTC 1/SC 29/WG 11 12th Meeting: Macau, CN, 3-12 Oct. 2018

Non-Patent Document 6: J. J. Chen, Y. Ye, S. Kim, "Algorithm description for Versatile Video Coding and Test Model 3 (VTM 3)", JVET-L1002, Joint Video Experts Team (JVET) of ITU-T SG 16 WP 3 and ISO/IEC JTC 1/SC 29/WG 11 12th Meeting: Macau, CN, 3-12 Oct. 2018

Non-Patent Document 7: J. Boyce (Intel), Y. Ye (InterDigital), Y.-W. Huang (Mediatek), M. Karczewicz (Qualcomm), E. Francois (Technicolor), W. Husak (Dolby), J. Ridge (Nokia), A. Abbas (GoPro), "Two tier test model", JVET-J0093, Joint Video Experts Team (JVET) of ITU-T SG 16 WP 3 and ISO/IEC JTC 1/SC 29/WG 11 10th Meeting: San Diego, US, 10-20 Apr. 2018

Non-Patent Document 8: S. Yoo, J. Choi, J. Heo, J. Choi, L. Li, J. Lim, S. Kim (LGE), "Non-CE7:Residual rearrangement for transform skipped blocks", JVET-M0278, Joint Video Experts Team (JVET) of ITU-T SG 16 WP 3 and ISO/IEC JTC 1/SC 29/WG 11 13th Meeting: Marrakech, MA, 9-18 Jan. 2019

Non-Patent Document 9: B. Bross, T. Nguyen, P. Keydel, H. Schwarz, D. Marpe, T. Wiegand (HHI), "Non-CE8: Unified Transform Type Signalling and Residual Coding for Transform Skip", JVET-M0464, Joint Video Experts Team (JVET) of ITU-T SG 16 WP 3 and ISO/IEC JTC 1/SC 29/WG 11 13th Meeting: Marrakech, MA, 9-18 Jan. 2019 Non-Patent Document 10: Y. Zhao, H. Gao, H. Yang, J. Chen (Huawei), "CE6: Sub-block transform for inter blocks (Test 6.4.1)", JVET-M0140, Joint Video Experts Team (JVET) of ITU-T SG 16 WP 3 and ISO/IEC JTC 1/SC 29/WG 11 13th Meeting: Marrakech, MA, 9-18 Jan. 2019

Non-Patent Document 11: S. De-Luxan-Hernandez, V. George, J. Ma, T. Nguyen, H. Schwarz, D. Marpe, T. Wiegand (HHI), "CE3:Intra Sub-Partitions Coding Mode (Tests 1.1.1 and 1.1.2)", JVET-M0102, Joint Video Experts Team (JVET) of ITU-T SG 16 WP 3 and ISO/IEC JTC 1/SC 29/WG 11 13th Meeting: Marrakech, MA, 9-18 Jan. 2019

Non-Patent Document 12: B. Bross, J. Chen, S. Liu, "Versatile Video Coding (Draft 4)," JVET-M1001, Joint Video Experts Team (JVET) of ITU-T SG 16 WP 3 and ISO/IEC JTC 1/SC 29/WG 11 12th Meeting: Macau, CN, 3-12 Oct. 2018

That is, the contents described in the above-mentioned non-patent documents are also the basis for determining the support requirements. For example, even in a case where a Quad-Tree Block Structure and a Quad Tree Plus Binary Tree (QTBT) Block Structure described in the above-mentioned non-patent documents are not directly described in the examples, they are within the scope of the disclosure of the present technology, and the support requirements of the claims are fulfilled. Furthermore, for example, technical terms such as Parsing, Syntax, and Semantics are similarly within the scope of the disclosure of the present technology even in a case where they are not directly described in the examples, and the support requirements of the claims are fulfilled.

Furthermore, in the present specification, a "block" (not a block indicating a processing unit) used in the description as a partial area of an image (picture) or a unit of processing indicates any partial area in the picture unless otherwise specified, and its size, shape, characteristics, and the like are not limited. For example, the "block" includes any partial area (unit of processing) such as Transform Block (TB), Transform Unit (TU), Prediction Block (PB), Prediction Unit (PU), Smallest Coding Unit (SCU), Coding Unit (CU), Largest Coding Unit (LCU), Coding Tree Block (CTB), Coding Tree Unit (CTU), transform block, subblock, macroblock, tile, slice, and the like described in the above-mentioned non-patent documents.

Furthermore, when specifying the size of such block, not only the block size may be directly specified, but also the block size may be indirectly specified. For example, the block size may be specified using identification information that identifies the size. Furthermore, for example, the block size may be specified by the ratio or difference with respect to the size of a reference block (for example, LCU or SCU). For example, in a case where information for specifying a block size is transmitted as a syntax element or the like, the information for indirectly specifying the size as described above may be used as the information. By doing so, the amount of information of the information can be reduced, and the encoding efficiency may be improved. Furthermore, specifying the block size also includes specifying the range of a block size (for example, specifying the range of an allowable block size).

Furthermore, in the present specification, the encoding includes not only the entire processing of converting an image into a bit stream but also a part of the processing. For example, it not only includes processing that includes prediction processing, orthogonal transform, quantization, arithmetic encoding, and the like, but also includes processing that collectively refers to quantization and arithmetic encoding, and processing including prediction processing, quantization, and arithmetic encoding. Similarly, decoding includes not only the entire processing of converting a bit stream into an image, but also a part of the processing. For example, it not only includes processing that includes inverse arithmetic decoding, inverse quantization, inverse orthogonal transform, prediction processing, and the like, but also processing including inverse arithmetic decoding and inverse quantization, processing including inverse arithmetic decoding, inverse quantization, and prediction processing.

<Number of Context-Coded Bins>

Context-based adaptive binary arithmetic code (CABAC), which is used for image encoding such as high efficiency video coding (HEVC), is an encoding method that binarizes the syntax element value that expresses the coefficient data derived from the image data by a predetermined method and performs arithmetic encoding by switching an appearance frequency model (context) for each bit of the binarized bit string. The coefficient data is expressed, for example, by a syntax element such as sig_flag indicating the code of the coefficient, gt1_flag indicating whether or not the absolute value of the coefficient is 1, par_flag indicating whether the coefficient is odd or even, and gt2_flag indicating whether or not the absolute value of the coefficient is 2.

In general, the larger the number of context-coded bins when expressing a syntax element value, the better the encoding efficiency and the more a reduction in image quality can be suppressed. However, as the number of context-coded bins increases, the amount of processing increases. Therefore, for example, in Non-Patent Document 1, a method of restricting the number of context-coded bins in units of subblock has been proposed.

However, in the case of this method, since the number of context-coded bins is uniformly restricted, the coefficient data cannot be increased or decreased locally according to the characteristics of the image, and there has been a possibility that the encoding efficiency is unnecessarily reduced. In other words, there is a risk of reducing the image quality of a decoded image.

<Variable Restriction on the Number of Context-Coded Bins>

Therefore, the restriction on the number of context-coded bins in each subblock is made variable. By doing so, the coefficient data can be increased or decreased locally further according to the characteristics of the image, so that a reduction in encoding efficiency can be suppressed. In other words, the reduction in image quality of the decoded image can be suppressed.

At that time, for example, the number of bins in units of block (picture, slice, CTU, virtual pipeline data Unit (VPDU), CU, Access Unit (AU), TU, or the like) may be similar to a case where there is the fixed number of context-coded bins in each subblock. By doing so, it is possible to suppress a reduction in encoding efficiency while suppressing an increase in amount of processing.

For example, the number of context-coded bins may be distributed among nonzero subblocks in the block, and the upper limit value of the number of context-coded bins allocated to each subblock may be set. Then, for a processing target subblock, the syntax element value may be derived from the coefficient data corresponding to the image data while preventing the number of context-coded bins from exceeding the upper limit value.

Furthermore, for example, for a processing target subblock, the syntax element value may be parsed and the coefficient data corresponding to the image data may be derived while preventing the number of context-coded bins from exceeding the upper limit value.

Moreover, for example, the number of bins allocated to zero subblocks in the block may be distributed among nonzero subblocks, and the upper limit value of the number of context-coded bins allocated to each subblock may be set. Then, for a processing target subblock, the syntax element value may be derived from the coefficient data corresponding to the image data while preventing the number of context-coded bins from exceeding the upper limit value.

Furthermore, for example, for a processing target subblock, the syntax element value may be parsed and the coefficient data corresponding to the image data may be derived while preventing the number of context-coded bins from exceeding the upper limit value.

<Block>

For example, a block 10 as shown in A of FIG. 1 is a processing target block. The block 10 is, for example, an 8×8 pixel TU, including four subblocks (subblock 11-1, subblock 11-2, subblock 11-3, and subblock 11-4). In the following, in a case where it is not necessary to describe each subblock separately from each other, it is referred to as subblocks 11. That is, in the example of A of FIG. 1, the block 10 includes 2×2 subblocks 11. Therefore, each subblock 11 includes 4×4 pixels.

In A of FIG. 1, the numerical value in each subblock 11 indicates the number of context-coded bins generated in the subblock 11. For example, when the number of context-coded bins per subblock 11 is restricted to 30 bins, the number of context-coded bins generated in each subblock 11 is limited to 30 bins or less.

Note that the order of processing each subblock 11 is in the Morton code order (Z-order curve) as shown in B of FIG. 1.

2. FIRST EMBODIMENT

Method #1

For example, as shown in the top row of the table in FIG. 2, the number of context-coded bins in a zero subblock may be passed to a nonzero subblock.

A zero subblock is a subblock whose coefficients are all zero (0). Furthermore, a nonzero subblock is a subblock in which at least one nonzero coefficient exists. That is, the number of context-coded bins allocated to the zero subblock in a case where the upper limit value of the number of context-coded bins is uniformly set for each subblock as in the method described in Non-Patent Document 1 is allocated to the nonzero subblock.

For example, as shown in the second row from the top of the table shown in FIG. 2, a subblock coefficient flag (coded_sub_block_flag) is put out of the existing loop and made independent.

The subblock coefficient flag is a flag indicating whether or not the subblock contains a nonzero coefficient. For example, in a case where coded_sub_block_flag=1, it indicates that the subblock corresponding to the flag is a nonzero subblock, and in a case where coded_sub_block_flag=0, it indicates that the subblock corresponding to the flag is a zero subblock. The processing related to the derivation of the syntax element value is subjected to loop processing for each subblock, but in this method, the processing related to the subblock coefficient flag is performed outside the loop processing. That is, first the subblock coefficient flags for all subblocks in the TU are parsed.

Then, the subblock with coded_sub_block_flag=0, i.e., the zero subblock is counted. Then, the number of zero subblocks×the number of context-coded bins for one subblock is passed (added) into the nonzero subblock. Since the number of context-coded bins is not consumed in the zero subblock, that amount is passed to the nonzero subblock.

Furthermore, management of the number of context-coded bins is closed within the TU (predetermined unit). That is, the number of context-coded bins as described above is distributed for each block.

By doing so, as shown in the third row from the top of the table shown in FIG. 2, the number of extra context-coded bins in the zero subblock can be used as the number of context-coded bins in the nonzero subblock, and a reduction in encoding efficiency can be suppressed. In other words, the reduction in image quality of the decoded image can be suppressed.

Figure 3:
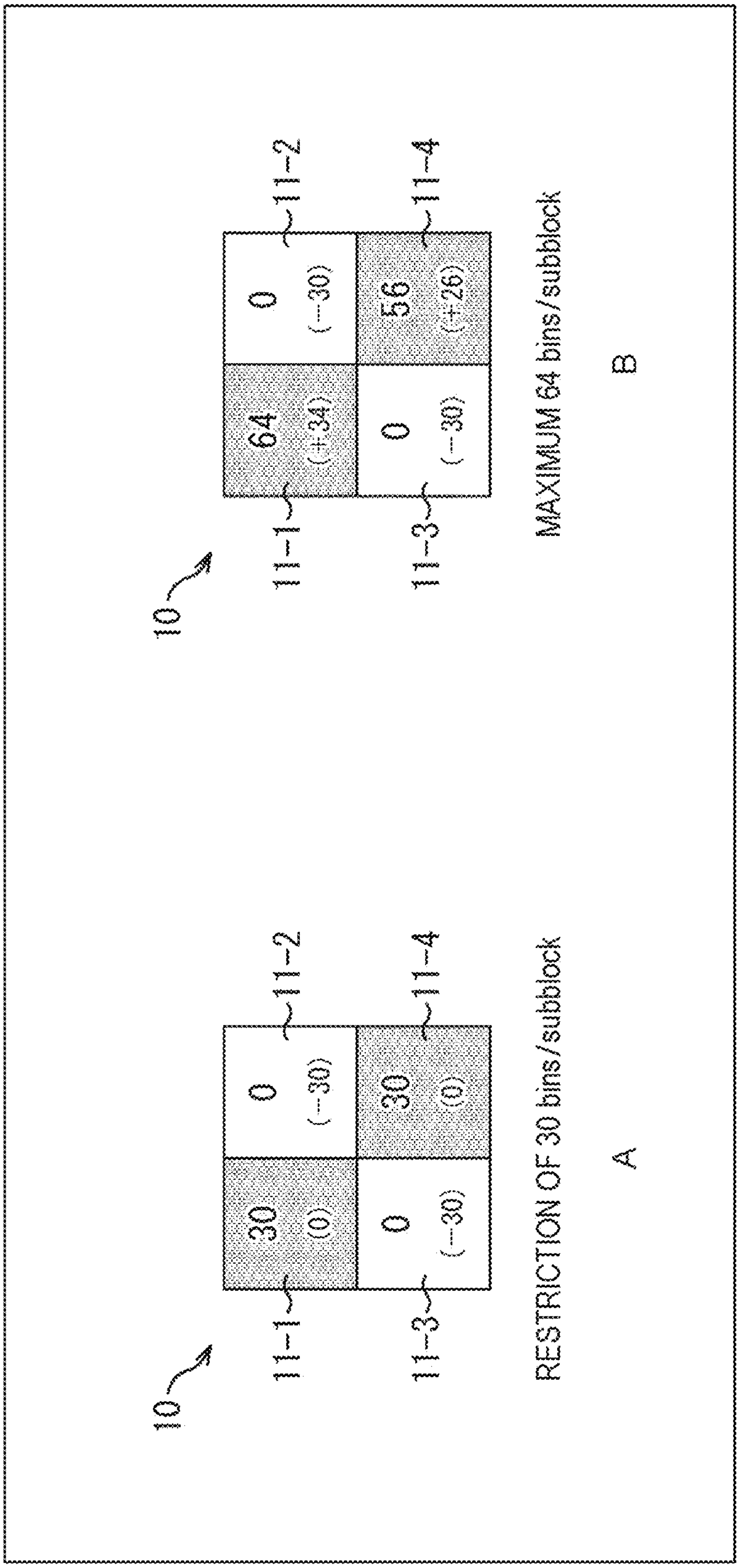
FIG. 3 is a diagram explaining an application example of method #1.

For example, as shown in A of FIG. 3, in a case where a restriction to 30 bins per subblock is set, even when the subblock 11-2 and the subblock 11-3 are zero subblocks, their number of extra context-coded bins cannot be used in the subblock 11-1 or the subblock 11-4, which are nonzero subblocks. That is, the number of context-coded bins in the subblock 11-1 and the subblock 11-4 cannot be greater than 30 bins.

On the other hand, in the case of the method #1, as shown in B of FIG. 3, even when the subblock 11-2 and the subblock 11-3 are zero subblocks, their number of extra context-coded bins can be allocated to the subblock 11-1 or the subblock 11-4, which are nonzero subblocks. That is, in those subblocks, a syntax element value of 30 bins or more can be generated. Therefore, a reduction in encoding efficiency can be suppressed.

<Encode Apparatus>

Figure 4:
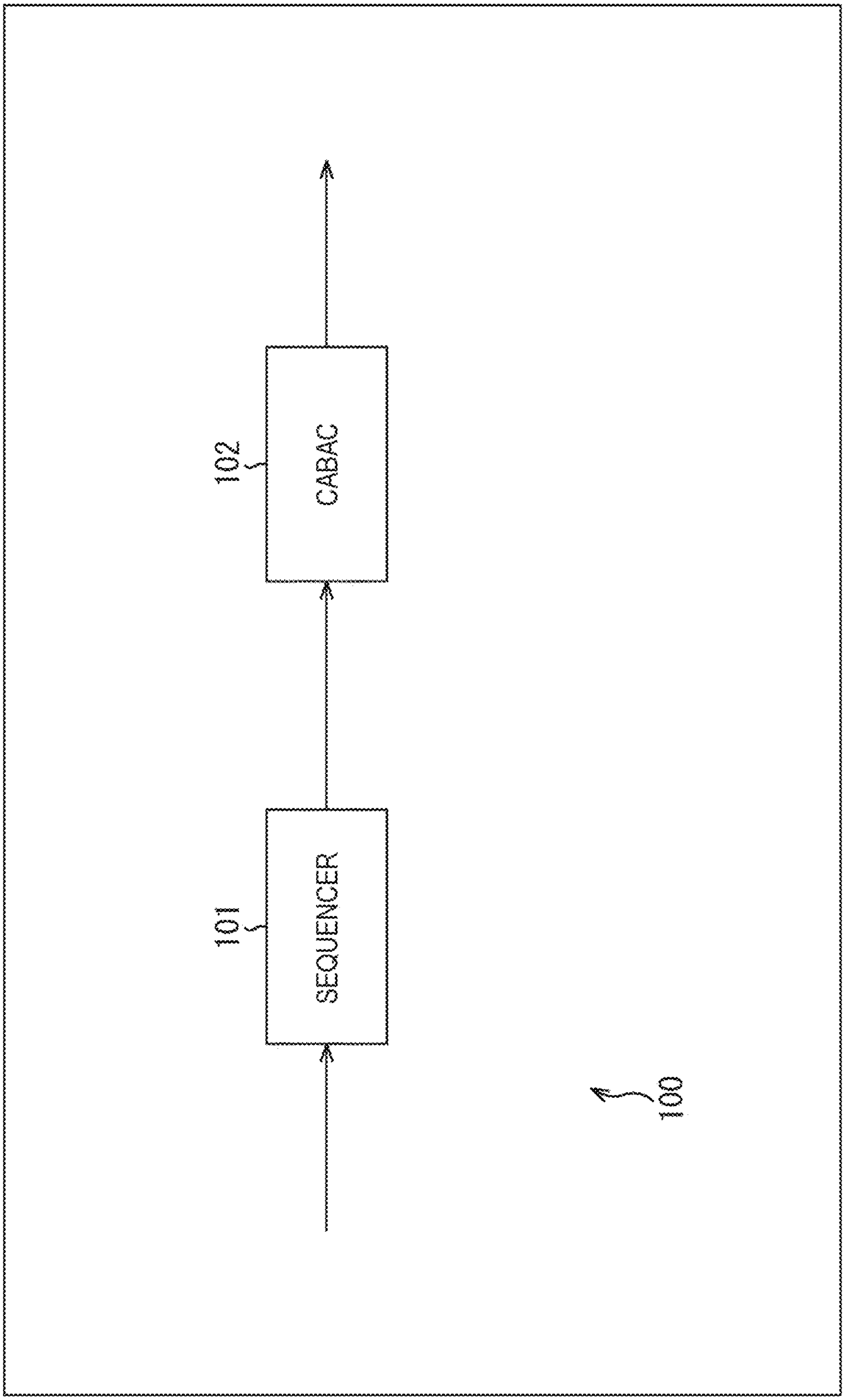
FIG. 4 is a block diagram showing a main configuration example of an encode apparatus.

FIG. 4 is a block diagram showing an example of the configuration of an encode apparatus, which is an aspect of an image processing apparatus to which the present technology is applied. An encode apparatus 100 shown in FIG. 4 is an apparatus that encodes the coefficient data derived from the image data by CABAC and generates the coded data.

Note that FIG. 4 shows the main things such as the processing unit and the data flow, and not all of them are shown in FIG. 4. That is, in the encode apparatus 100, there may be a processing unit that is not shown as a block in FIG. 4, or there may be a processing or data flow that is not shown as an arrow or the like in FIG. 4.

As shown in FIG. 4, the encode apparatus 100 includes a sequencer 101 and a CABAC 102. The sequencer 101 acquires coefficient data and the like derived from the image data. Furthermore, the sequencer 101 appropriately acquires control information such as flag information and the like. The sequencer 101 uses it to derive the syntax element value. Furthermore, the sequencer 101 supplies the derived syntax element value and the like to the CABAC 102. The CABAC 102 acquires the syntax element value and the like supplied from the sequencer 101. The CABAC 102 binarizes the syntax element value by a predetermined method, performs arithmetic encoding by switching the context for each bit of the binarized bit string, and generates the coded data. The CABAC 102 outputs the generated coded data to the outside of the encode apparatus 100.

Note that these processing units (sequencer 101 and CABAC 102) have an arbitrary configuration. For example, each processing unit may include a logic circuit that realizes the above-mentioned processing. Furthermore, each processing unit may include, for example, a central processing unit (CPU), a read only memory (ROM), a random access memory (RAN), and the like, and execute a program using them to realize the above-mentioned processing. Of course, each processing unit may have both configurations, and a part of the above-mentioned processing may be realized by the logic circuit, and the rest may be realized by executing the program. The configurations of the respective processing units may be independent of each other. For example, some processing units may realize a part of the above-mentioned processing by the logic circuit, and some other processing units may execute the program to realize the above-mentioned processing, and yet other processing units may realize the above-mentioned processing by both the logic circuit and execution of the program.

<CABAC>

Figure 5:
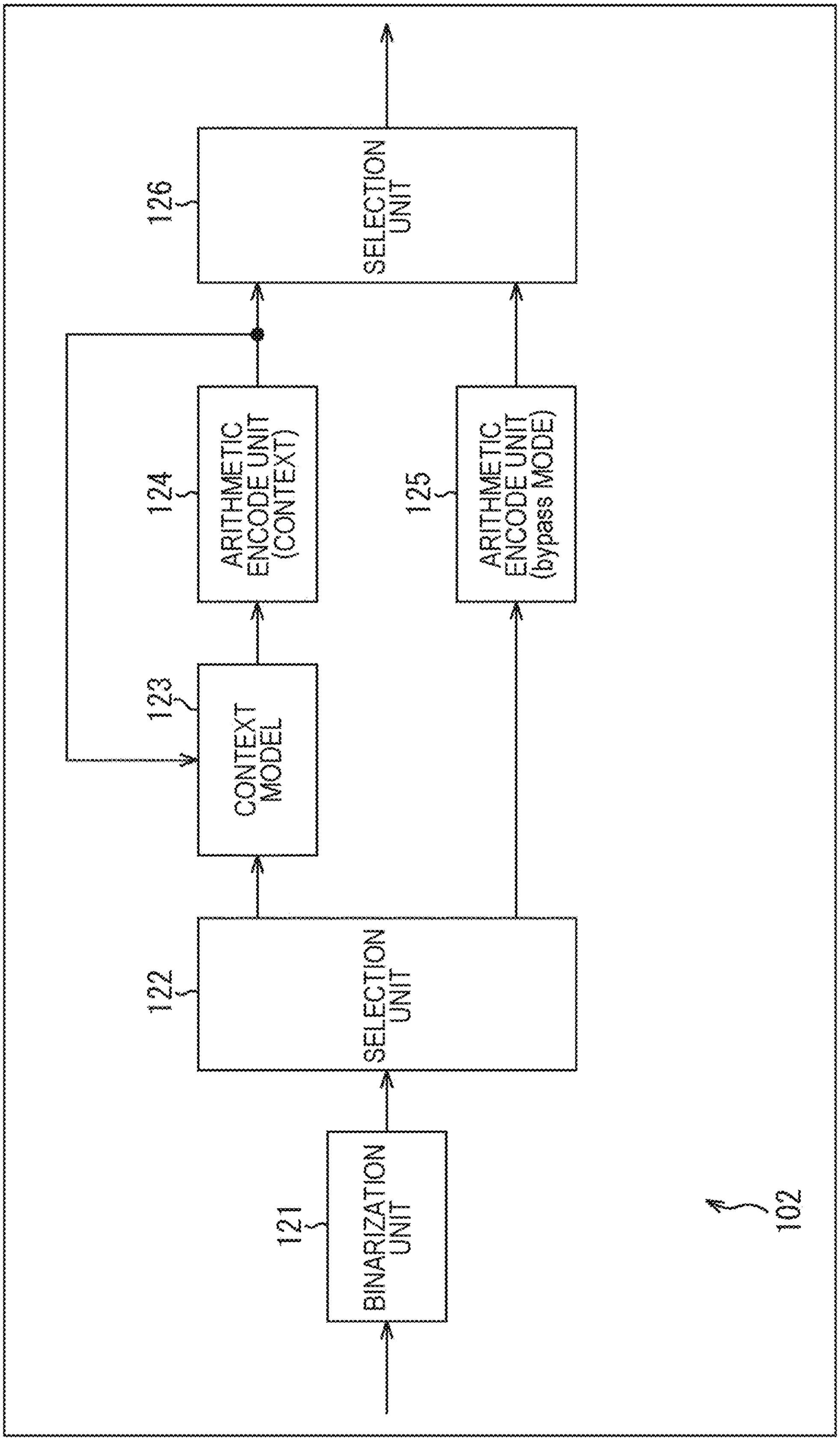
FIG. 5 is a block diagram showing a main configuration example of CABAC.

FIG. 5 is a block diagram showing a main configuration example of the CABAC 102. Note that FIG. 5 shows the main things such as the processing unit and the data flow, and not all of them are shown in FIG. 5. That is, in the CABAC 102, there may be a processing unit that is not shown as a block in FIG. 5, or there may be a processing or data flow that is not shown as an arrow or the like in FIG. 5.

As shown in FIG. 5, the CABAC 102 includes a binarization unit 121, a selection unit 122, a context model 123, an arithmetic encode unit 124, an arithmetic encode unit 125, and a selection unit 126.

The binarization unit 121 acquires the syntax element value supplied from the sequencer 101, performs binarization using a method defined for each syntax element, and generates a binarized bit string. The binarization unit 121 supplies the binarized bit string to the selection unit 122.

The selection unit 122 acquires the binarized bit string supplied from the binarization unit 121 and flag information isBypass. The selection unit 122 selects the supply destination of the binarized bit string on the basis of the value of isBypass. For example, in a case where isBypass=0, the selection unit 122 determines that it is a regular mode and supplies the binarized bit string to the context model 123. Furthermore, in a case where isBypass=1, the selection unit 122 determines that it is a bypass mode and supplies the binarized bit string to the arithmetic encode unit 125.

The context model 123 dynamically switches the context model to be applied according to an encoding target and the surrounding situation. For example, the context model 123 holds a context variable ctx, and when the binarized bit string is acquired from the selection unit 122, the context variable ctx corresponding to each bin position (binIdx) of a bin string defined for each syntax element is read. The context model 123 supplies the binarized bit string and the read context variable ctx to the arithmetic encode unit 124.

When the arithmetic encode unit 124 acquires the binarized bit string and the context variable ctx supplied from the context model 123, it refers to the probability state of the context variable ctx and arithmetically encodes (context encoding) the value of the bin in binIdx of the binarized bit string in CABAC regular mode. The arithmetic encode unit 124 supplies the coded data generated by the context encoding to the selection unit 126. Furthermore, the arithmetic encode unit 124 supplies the context variable ctx after the context encoding processing to the context model 123 and causes the context model 123 to hold the context variable ctx.

The arithmetic encode unit 125 arithmetically encodes (bypass encoding) the binarized bit string supplied from the selection unit 122 in CABAC bypass mode. The arithmetic encode unit 125 supplies the coded data generated by the bypass encoding to the selection unit 126.

The selection unit 126 acquires the flag information isBypass and selects coded data to be output on the basis of the value of the isBypass. For example, in a case where isBypass=0, the selection unit 126 determines that it is the regular mode, acquires the coded data supplied from the arithmetic encode unit 124, and outputs it to the outside of the CABAC 102 (encode apparatus 100). Furthermore, in a case where isBypass=1, the selection unit 126 determines that it is the bypass mode, acquires the coded data supplied from the arithmetic encode unit 125, and outputs it to the outside of the CABAC 102 (encode apparatus 100).

Note that these processing units (binarization unit 121 to selection unit 126) have an arbitrary configuration. For example, each processing unit may include a logic circuit that realizes the above-mentioned processing. Furthermore, each processing unit may include, for example, a CPU, ROM, RAM, and the like, and execute a program using them to realize the above-mentioned processing. Of course, each processing unit may have both configurations, and a part of the above-mentioned processing may be realized by the logic circuit, and the rest may be realized by executing the program. The configurations of the respective processing units may be independent of each other. For example, some processing units may realize a part of the above-mentioned processing by the logic circuit, and some other processing units may execute the program to realize the above-mentioned processing, and yet other processing units may realize the above-mentioned processing by both the logic circuit and execution of the program.

<Flow of Encoding Processing>

Next, an example of the flow of encoding processing executed by the encode apparatus 100 will be described with reference to the flowchart of FIG. 6.

When the encoding processing is started, in step S101, the sequencer 101 of the encode apparatus 100 executes the syntax element value derivation processing and derives the syntax element value from the coefficient data (coefficient data derived from the image data) input to the encode apparatus 100.

In step S102, the CABAC 102 performs CABAC processing, encodes the syntax element value derived in step S101 by CABAC, and generates coded data. The CABAC 102 outputs the generated coded data to the outside of the encode apparatus 100.

When the processing of step S102 ends, the encoding processing ends.

<Flow of the Syntax Element Value Derivation Processing>

Next, an example of the flow of the syntax element value derivation processing executed in step S101 of FIG. 6 will be described with reference to the flowchart of FIG. 7. FIGS. 8 to 11 are diagrams showing an example of the syntax of residual coding. Description will be given in conjunction with these drawings as necessary. Note that in the syntax of FIGS. 8 to 11, threshold values (TH1 to TH4) can have, for example, the values described below.

TH1=6, TH2=28, TH3=2, TH4=4

Of course, the value of each threshold value is arbitrary and is not limited to this example.

When the syntax element value derivation processing is started, the sequencer 101 encodes the subblock coefficient flag (coded_sub_block_flag) in the processing target block in step S121 as shown, for example, in the second to eleventh rows from the top of FIG. 9.

In step S122, the sequencer 101 counts the number of nonzero subblocks (numNonZeroSbk) on the basis of the value of the subblock coefficient flag as shown, for example, in the thirteenth to sixteenth rows from the top of FIG. 9. That is, the sequencer 101 counts the number of subblocks with coded_sub_block_flag=1 for the block to be processed.

In step S123, the sequencer 101 sets a temporary upper limit value (remBinPass1Tmp) for the number of context-coded bins per subblock as shown, for example, in the eighteenth and nineteenth rows from the top of FIG. 9. For example, in the case of FIG. 3, since the subblock includes 4×4 coefficient data and sig_flag, gt1_flag, par_flag, and gt2_flag are derived, the maximum number of context-coded bins per subblock is 64 bins. The sequencer 101 sets this 64 bins to the above-mentioned temporary upper limit value (remBinPass1Tmp). That is, this temporary upper limit value (remBinPass1Tmp) can be set on the basis of the size of the subblock.

In step S124, the sequencer 101 sets the number of extra context-coded bins (remBinPass1InZeroSbk) of the entire zero subblocks on the basis of the number of zero subblocks (numZeroSBk) as shown, for example, in the twentieth and twenty-first rows from the top of FIG. 9. Since the number of subblocks in the processing target block is known from the number of subblock coefficient flags and the like, the number of zero subblocks (numZeroSBk) can be obtained from the number of nonzero subblocks (numNonZeroSbk) counted in step S122. Since the number of bins required for the zero subblock is zero, the temporary upper limit value (remBinPass1Tmp) set in step S123 is the number of extra context-coded bins. Therefore, the number of extra context-coded bins (remBinPass1InZeroSbk) for the entire zero subblocks is derived by the product of the number of zero subblocks (numZeroSBk) and the temporary upper limit value (remBinPass1Tmp).

In step S125, the sequencer 101 sets the average number of extra context-coded bins (remBinPass1Extra) that can be additionally allocated per nonzero subblock as shown, for example, in the twenty-second and twenty-third rows from the top of FIG. 9. This average number of extra context-coded bins (remBinPass1Extra) can be derived by dividing the number of extra context-coded bins (remBinPass1InZeroSbk) of the entire zero subblocks derived in step S124 by the number of zero subblocks (numZeroSBk). Note that in order to avoid division, the average number of extra context-coded bins (remBinPass1Extra) may be derived using a lookup table.

Next, the processing moves to processing for each subblock. That is, the processing moves to the processing in the loop of the for statement for each subblock in the syntax. In step S126, the sequencer 101 selects a processing target subblock (subSetId=i) from the subblocks in the processing target block.

In step S127, the sequencer 101 sets the upper limit value (remBinPass1) of the number of context-coded bins for the processing target subblock as shown, for example, in the twenty-ninth and thirtieth rows from the top of FIG. 9 on the basis of the temporary upper limit value (remBinPass1Tmp) and the average number of extra context-coded bins (remBinPass1Extra) that can be additionally allocated from the zero subblock. In the case of the example of FIG. 9, the upper limit value (remBinPass1) of the number of context-coded bins is derived by adding the temporary upper limit value (remBinPass1Tmp) and the average number of extra context-coded bins (remBinPass1Extra) that can be additionally allocated from the zero subblock.

In step S128, the sequencer 101 derives the value of the syntax element for the processing target subblock so as not to exceed the upper limit value of the number of context-coded bins. This processing corresponds to the syntax shown in FIG. 10 and subsequent drawings.

In step S129, the sequencer 101 determines whether or not all the subblocks have been processed. In a case where it is determined that there is an unprocessed subblock in the processing target block, the processing returns to step S126, and the subsequent processing is repeated. That is, each processing of step S126 to step S129 is executed for each subblock in the processing target block. Then, in step S129, in a case where it is determined that all the subblocks in the processing target block have been processed, the syntax element value derivation processing ends, and the processing returns to FIG. 6.

By executing the processing of each step as described above, the sequencer 101 can make the restriction on the number of context-coded bins of each subblock variable. For example, the number of context-coded bins allocated to zero subblocks in the processing target block can be distributed to nonzero subblocks. Therefore, the number of context-coded bins allocated to the zero subblocks can also be used. Therefore, a reduction in encoding efficiency can be suppressed.

Note that by encoding the subblock coefficient flag (coded_sub_block_flag) before the processing for each subblock, and by counting the number of zero subblocks and the number of nonzero subblocks, the number of extra context-coded bins can be distributed more freely (the restriction on distribution can be reduced).

Furthermore, by closing the management of the number of context-coded bins in the block (for example, TU) as described above, an increase in amount of processing can be suppressed.

<Flow of CABAC Processing>

Figure 12:
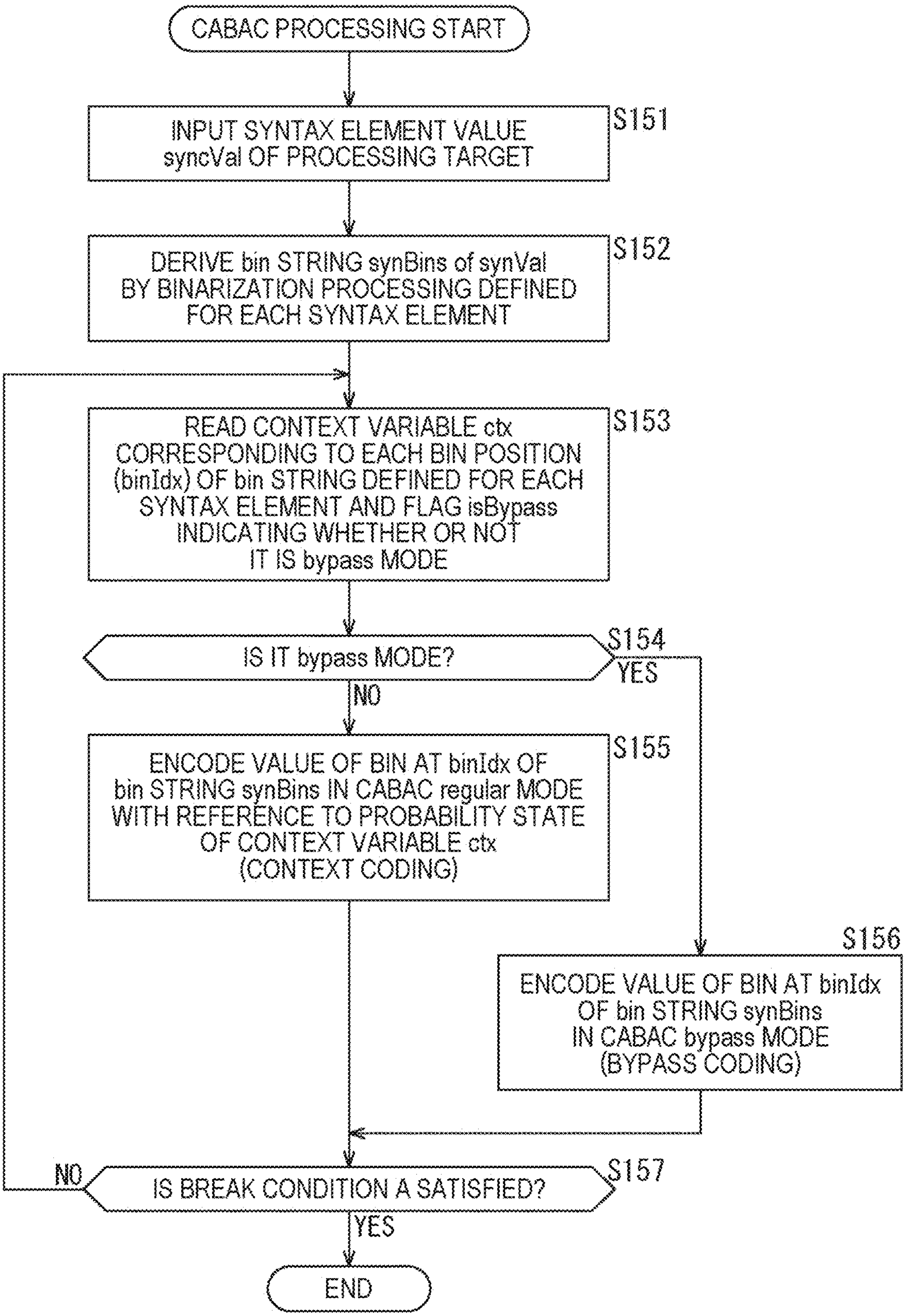
FIG. 12 is a flowchart explaining an example of a flow of CABAC processing.

Next, an example of the flow of CABAC processing executed in step S102 of FIG. 6 will be described with reference to the flowchart of FIG. 12.

When the CABAC processing is started, the binarization unit 121 of the CABAC 102 inputs a syntax element value (syncVal), which is a processing target, in step S151.

In step S152, the binarization unit 121 performs the binarization processing defined for each syntax element, and derives a bin string (synBins) of the syntax element value (syncVal).

In step S153, the selection unit 122 reads the context variable ctx corresponding to each bin position (binIdx) of the bin string defined for each syntax element, and the flag isBypass indicating whether or not it is the bypass mode.

In step S154, the selection unit 122 determines whether or not it is the bypass mode. In a case where isBypass=0 and it is determined that it is the regular mode, the processing proceeds to step S155.

In step S155, the arithmetic encode unit 124 performs context encoding. That is, the arithmetic encode unit 124 encodes the value of the bin at the bin position (binIdx) of the bin string (synBins) in the CABAC regular mode with reference to the probability state of the context variable ctx. When the processing of step S155 ends, the processing proceeds to step S157.

Furthermore, in a case where isBypass=1 and it is determined in step S154 that it is the bypass mode, the processing proceeds to step S156.

In step S156, the arithmetic encode unit 125 performs the bypass encoding. That is, the arithmetic encode unit 125 encodes the value of the bin at the bin position (binIdx) of the bin string (synBins) in the CABAC bypass mode. When the processing of step S156 ends, the processing proceeds to step S157.

In step S157, the selection unit 126 determines whether or not a predetermined break condition A is satisfied. The break condition A is defined on the basis of the value of the bin string from binIdx=0 to binIdx=k (current binIdx position k) and the binarization method for each syntax element.

In a case where it is determined that the break condition A is not satisfied, the processing returns to step S153, and the processing of step S153 and subsequent steps is executed for the next bin position (binIdx). That is, the processing of steps S153 to S157 is executed for each bin position (binIdx).

Figure 6:
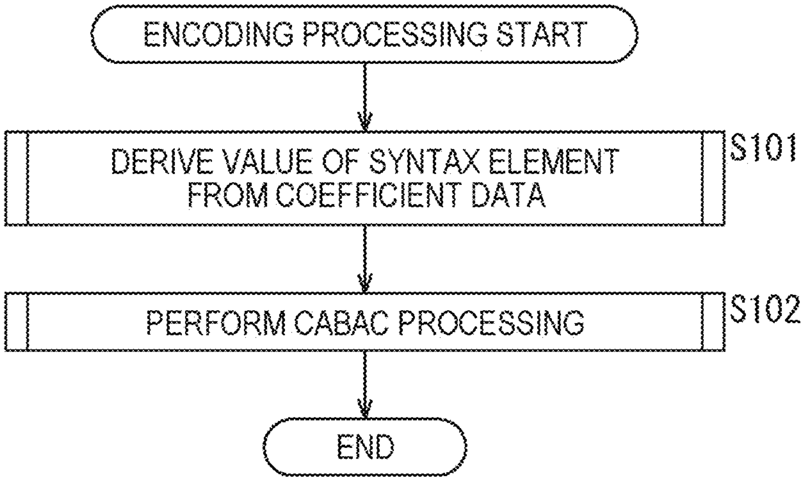
FIG. 6 is a flowchart explaining an example of a flow of encoding processing.

Then, in step S157, in a case where it is determined that the break condition A is satisfied, the CABAC processing ends, and the processing returns to FIG. 6.

By performing the CABAC processing in this way, the syntax element value can be encoded and the coded data can be generated.

<Decode Apparatus>

Figure 13:
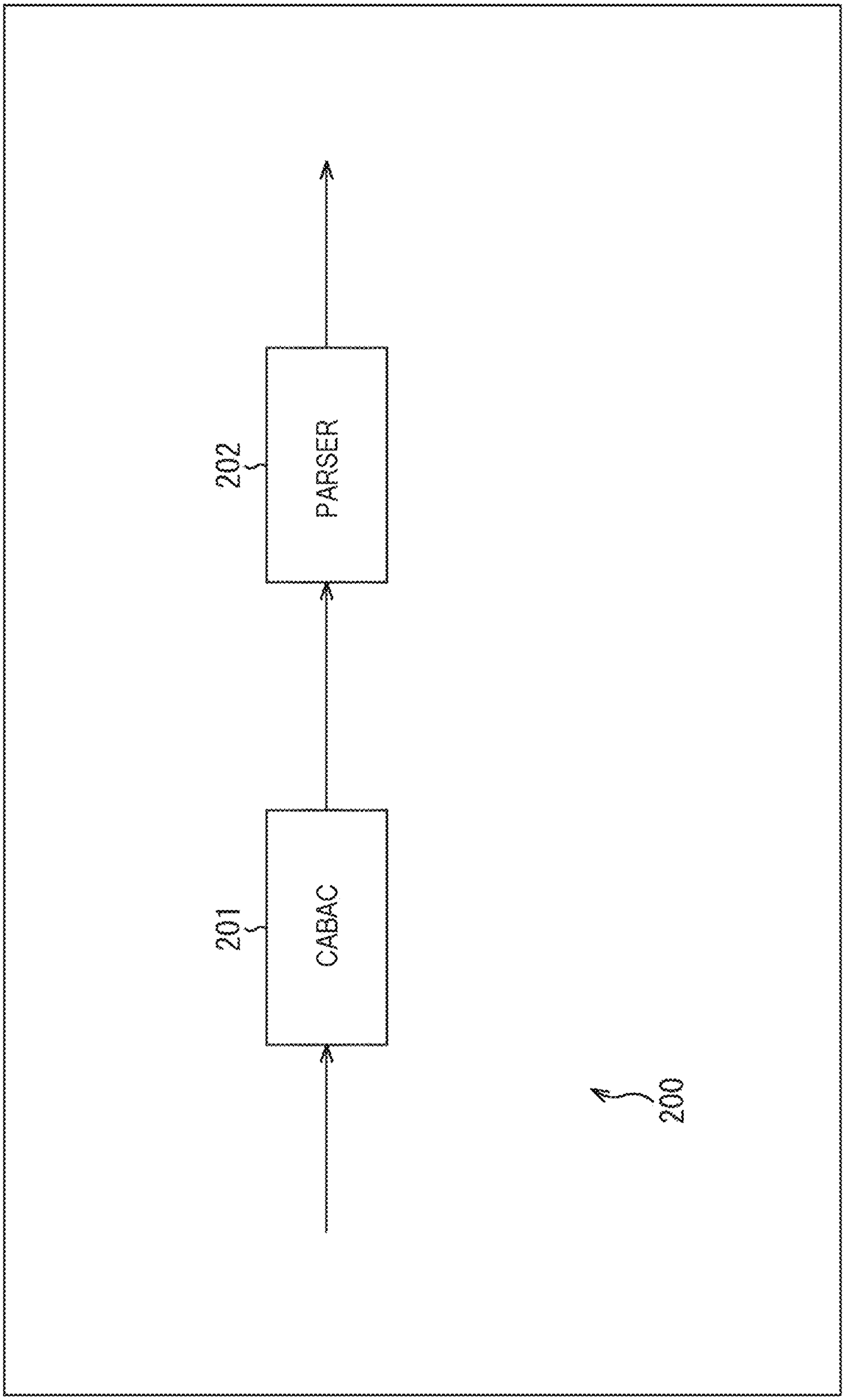
FIG. 13 is a block diagram showing a main configuration example of a decode apparatus.

FIG. 13 is a block diagram showing an example of the configuration of a decode apparatus, which is an aspect of an image processing apparatus to which the present technology is applied. A decode apparatus 200 shown in FIG. 13 is an apparatus that decodes the coded data and generates coefficient data corresponding to the image data.

Note that FIG. 13 shows the main things such as the processing unit and the data flow, and not all of them are shown in FIG. 13. That is, in the decode apparatus 200, there may be a processing unit that is not shown as a block in FIG. 13, or there may be a processing or data flow that is not shown as an arrow or the like in FIG. 13.

As shown in FIG. 13, the decode apparatus 200 includes a CABAC 201 and a parser 202. The CABAC 201 acquires the coded data, arithmetically decodes the coded data by switching the context for each bit of the binarized bit string to generate the binarized bit string, and converts the binarized bit string to multiple values using a predetermined method to generate the syntax element value. The CABAC 201 supplies the generated syntax element value to the parser 202. The parser 202 acquires the syntax element value and parses it to derive the coefficient data corresponding to the image data. The parser 202 outputs the derived coefficient data to the outside of the decode apparatus 200.

Note that these processing units (CABAC 201 and parser 202) have an arbitrary configuration. For example, each processing unit may include a logic circuit that realizes the above-mentioned processing. Furthermore, each processing unit may include, for example, a CPU, ROM, RAM, and the like, and execute a program using them to realize the above-mentioned processing. Of course, each processing unit may have both configurations, and a part of the above-mentioned processing may be realized by the logic circuit, and the rest may be realized by executing the program. The configurations of the respective processing units may be independent of each other. For example, some processing units may realize a part of the above-mentioned processing by the logic circuit, and some other processing units may execute the program to realize the above-mentioned processing, and yet other processing units may realize the above-mentioned processing by both the logic circuit and execution of the program.

<Cabac>

Figure 14:
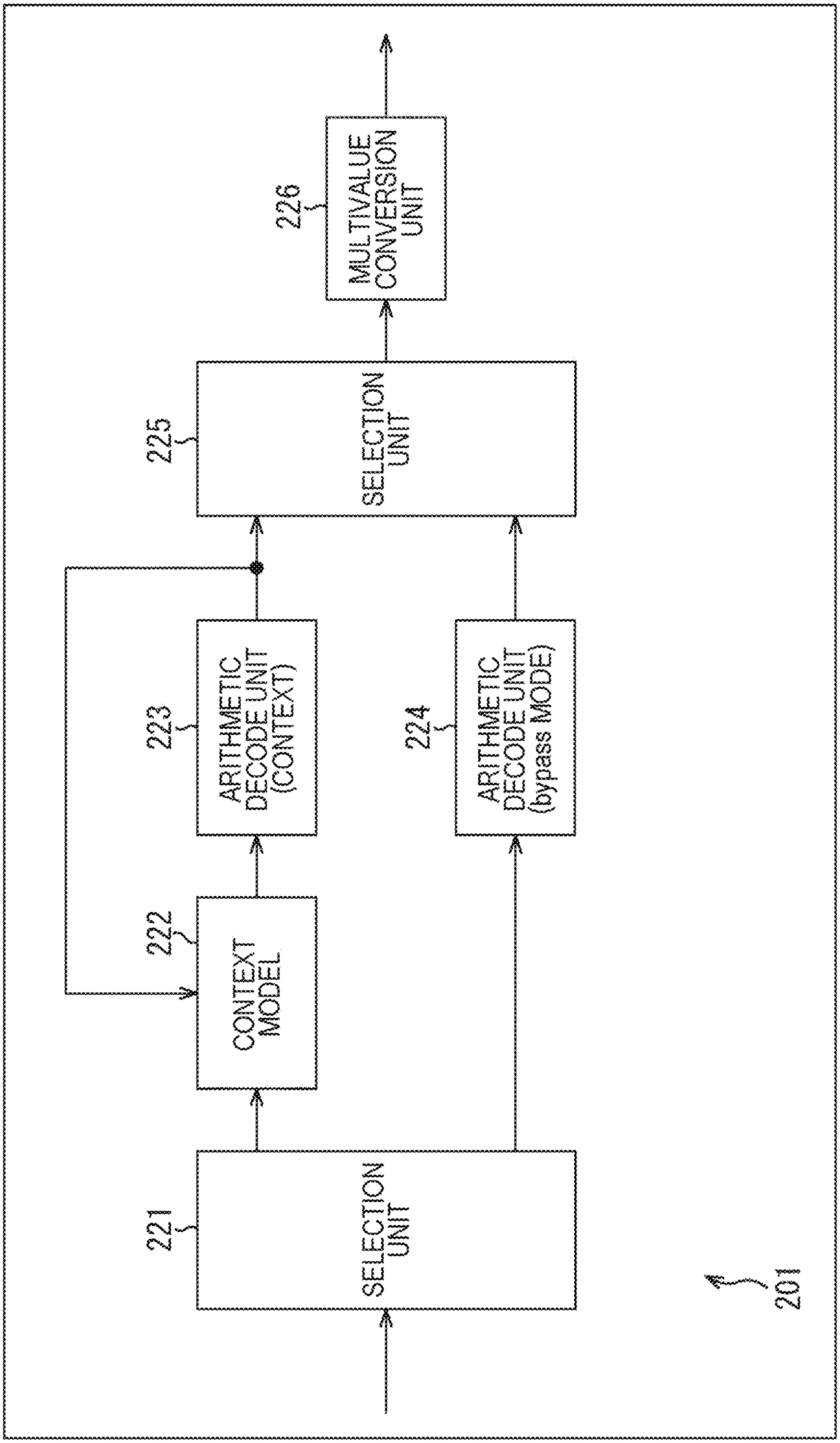
FIG. 14 is a block diagram showing a main configuration example of CABAC.

FIG. 14 is a block diagram showing a main configuration example of the CABAC 201. Note that FIG. 14 shows the main things such as the processing unit and the data flow, and not all of them are shown in FIG. 14. That is, in the CABAC 201, there may be a processing unit that is not shown as a block in FIG. 14, or there may be a processing or data flow that is not shown as an arrow or the like in FIG. 14.

As shown in FIG. 14, the CABAC 201 includes a selection unit 221, a context model 222, an arithmetic decode unit 223, an arithmetic decode unit 224, a selection unit 225, and a multivalue conversion unit 226.

The selection unit 221 acquires the coded data and the flag information isBypass input to the decode apparatus 200. The selection unit 221 selects the supply destination of the coded data on the basis of the value of isBypass. For example, in a case where isBypass=0, the selection unit 221 determines that it is the regular mode and supplies the coded data to the context model 222. Furthermore, in a case where isBypass=1, the selection unit 221 determines that it is the bypass mode and supplies the binarized bit string to the arithmetic decode unit 224.

The context model 222 dynamically switches the context model to be applied according to a decoding target and the surrounding situation. For example, the context model 222 holds a context variable ctx, and when the coded data is acquired from the selection unit 221, the context variable ctx corresponding to each bin position (binIdx) of a bin string defined for each syntax element is read. The context model 222 supplies the coded data and the read context variable ctx to the arithmetic decode unit 223.

When the arithmetic decode unit 223 acquires the coded data and the context variable ctx supplied from the context model 222, it refers to the probability state of the context variable ctx and arithmetically decodes (context decoding) the value of the bin in binIdx of the binarized bit string in the CABAC regular mode. The arithmetic decode unit 223 supplies the binarized bit string generated by the context decoding to the selection unit 225. Furthermore, the arithmetic decode unit 223 supplies the context variable ctx after the context decoding processing to the context model 222 and causes the context model 222 to hold the context variable ctx.

The arithmetic decode unit 224 arithmetically decodes the coded data supplied from the selection unit 221 in the CABAC bypass mode (bypass decoding). The arithmetic decode unit 224 supplies the binarized bit string generated by the bypass decoding to the selection unit 225.

The selection unit 225 acquires the flag information isBypass and selects the binarized bit string to be supplied to the multivalue conversion unit 226 on the basis of the value of the isBypass. For example, in a case where isBypass=0, the selection unit 225 determines that it is the regular mode, acquires the binarized bit string supplied from the arithmetic decode unit 223, and supplies it to the multivalue conversion unit 226. Furthermore, in a case where isBypass=1, the selection unit 225 determines that it is the bypass mode, acquires the binarized bit string supplied from the arithmetic decode unit 224, and supplies it to the multivalue conversion unit 226.

The multivalue conversion unit 226 acquires the binarized bit string supplied from the selection unit 225, converts the binarized bit string into multiple values using the method defined for each syntax element, and generates a syntax element value. The multivalue conversion unit 226 supplies the syntax element value to the parser 202.

Note that these processing units (selection unit 221 to multivalue conversion unit 226) have an arbitrary configuration. For example, each processing unit may include a logic circuit that realizes the above-mentioned processing. Furthermore, each processing unit may include, for example, a CPU, ROM, RAM, and the like, and execute a program using them to realize the above-mentioned processing. Of course, each processing unit may have both configurations, and a part of the above-mentioned processing may be realized by the logic circuit, and the rest may be realized by executing the program. The configurations of the respective processing units may be independent of each other. For example, some processing units may realize a part of the above-mentioned processing by the logic circuit, and some other processing units may execute the program to realize the above-mentioned processing, and yet other processing units may realize the above-mentioned processing by both the logic circuit and execution of the program.

<Flow of the Decoding Processing>

Figure 15:
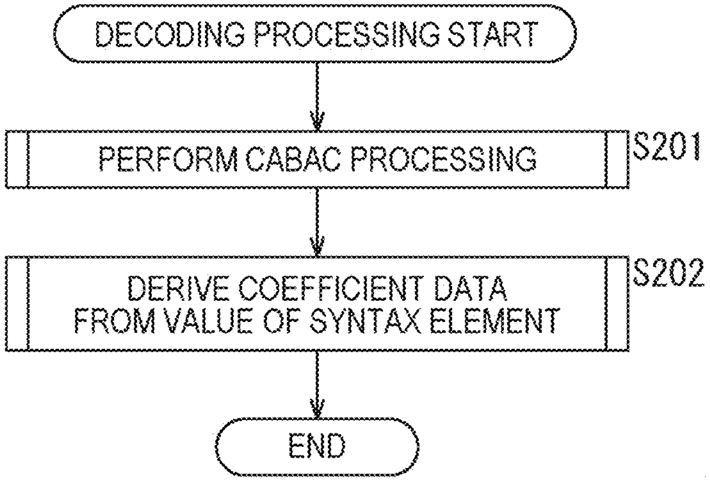
FIG. 15 is a flowchart explaining an example of a flow of decoding processing.

Next, an example of the flow of the decoding processing executed by the decode apparatus 200 will be described with reference to the flowchart of FIG. 15.

When the decoding processing is started, in step S201, the CABAC 201 of the decode apparatus 200 performs the CABAC processing, decodes the coded data input to the decode apparatus 200 by CABAC, and generates a syntax element value. In step S202, the parser 202 executes the coefficient data derivation processing, parses the syntax element value, and derives the coefficient data corresponding to the image data. The parser 202 outputs the derived coefficient data to the outside of the decode apparatus 200.

When the processing of step S202 ends, the decoding processing ends.

<Flow of CABAC Processing>

Figure 16:
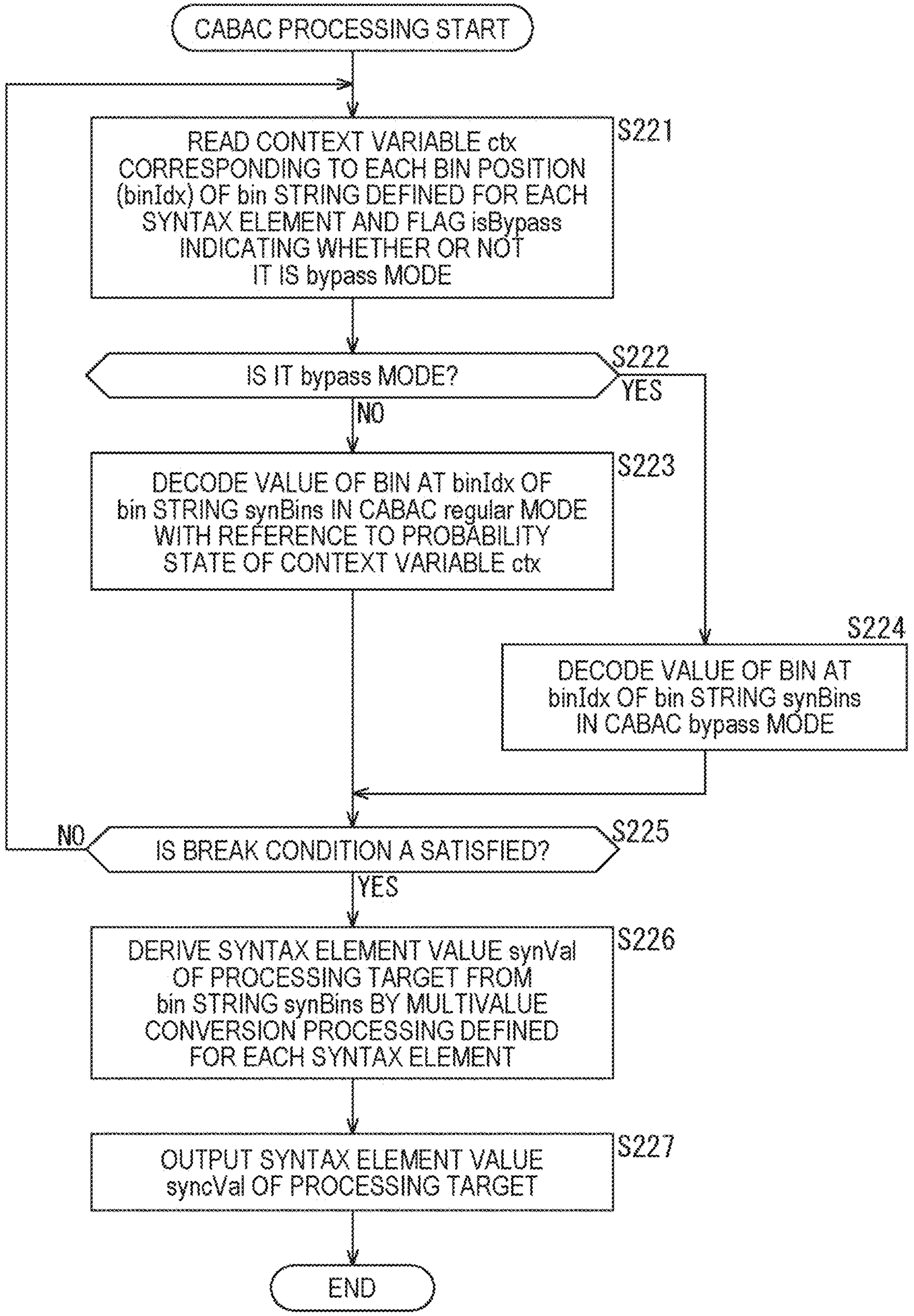
FIG. 16 is a flowchart explaining an example of a flow of CABAC processing.

Next, an example of the flow of the CABAC processing executed in step S201 of FIG. 15 will be described with reference to the flowchart of FIG. 16.

When the CABAC processing is started, in step S221, the selection unit 221 of the CABAC 201 reads the context variable ctx corresponding to each bin position (binIdx) of the bin string defined for each syntax element, and the flag isBypass indicating whether or not it is the bypass mode.

In step S222, the selection unit 221 determines whether or not it is the bypass mode. In a case where isBypass=0 and it is determined that it is the regular mode, the processing proceeds to step S223.

In step S223, the arithmetic decode unit 223 performs context decoding. That is, the arithmetic decode unit 223 decodes the coded data in the CABAC regular mode with reference to the probability state of the context variable ctx, and generates the value of the bin at the bin position (binIdx) of the bin string (synBins). When the processing of step S223 ends, the processing proceeds to step S225.

Furthermore, in a case where isBypass=1 and it is determined in step S222 that it is the bypass mode, the processing proceeds to step S224.

In step S224, the arithmetic decode unit 224 performs bypass decoding. That is, the arithmetic decode unit 224 decodes the coded data in the CABAC bypass mode and generates the value of the bin at the bin position (binIdx) of the bin string (synBins). When the processing of step S224 ends, the processing proceeds to step S225.

In step S225, the selection unit 225 determines whether or not the predetermined break condition A is satisfied. The break condition A is defined on the basis of the value of the bin string from binIdx=0 to binIdx=k (current binIdx position k) and the binarization method for each syntax element.

In a case where it is determined that the break condition A is not satisfied, the processing returns to step S221, and the processing of step S221 and subsequent steps for generating the value of the next bin position (binIdx) is executed. That is, the processing of steps S221 to S225 is executed for each bin position (binIdx).

Then, in step S225, in a case where it is determined that the break condition A is satisfied, the processing proceeds to step S226.

In step S226, the multivalue conversion unit 226 derives the syntax element value (syncVal) from the bin string (synBins) by the multivalue conversion processing defined for each syntax element.

In step S227, the multivalue conversion unit 226 supplies the derived syntax element value (syncVal) to the parser 202.

By performing the CABAC processing in this way, the coded data can be decoded and the syntax element value can be generated.

<Flow of the Coefficient Data Derivation Processing>

Next, an example of the flow of the coefficient data derivation processing executed in step S202 of FIG. 15 will be described with reference to the flowchart of FIG. 17. This coefficient data derivation processing is executed in a flow substantially similar to that of the syntax element value derivation processing (FIG. 7). That is, the processing of each step of the coefficient data derivation processing (steps S251 to S259 in FIG. 17) is executed in a manner substantially similar to that of each processing of the syntax element value derivation processing (steps S121 to S129 of FIG. 7).

However, the parser 202 decodes the subblock coefficient flag (coded_sub_block_flag) in the processing target block in step S251 as shown, for example, in the second to eleventh rows from the top of FIG. 9. When the processing of step S251 ends, the processing proceeds to step S252.

Furthermore, in step S258, the parser 202 parses the value of the syntax element for the processing target subblock so as not to exceed the upper limit value of the number of context-coded bins and derives the coefficient data. This processing corresponds to the syntax shown in FIG. 10 and subsequent drawings. When the processing of step S258 ends, the processing proceeds to step S259.

By executing the processing of each step as described above, the parser 202 can make the restriction on the number of context-coded bins of each subblock variable. For example, the number of context-coded bins allocated to zero subblocks in the processing target block can be distributed to nonzero subblocks. Therefore, the number of context-coded bins allocated to the zero subblocks can also be used. Therefore, a reduction in encoding efficiency can be suppressed.

Note that by decoding the subblock coefficient flag (coded_sub_block_flag) before the processing for each subblock, and by counting the number of zero subblocks and the number of nonzero subblocks, the number of extra context-coded bins can be distributed more freely (the restriction on distribution can be reduced).

Furthermore, by closing the management of the number of context-coded bins in the block (for example, TU) as described above, an increase in amount of processing can be suppressed.

3. SECOND EMBODIMENT

Method #2

The method #1 has been described in the first embodiment, but the present technology is not limited to this method. For example, the maximum number of context-coded bins may be shared within nonzero subblocks as shown in the top row of the table in FIG. 18.

That is, the number of context-coded bins allocated to each nonzero subblock in a case where the upper limit value of the number of context-coded bins is uniformly set for each subblock as in the method described in Non-Patent Document 1 is shared.

For example, as shown in the second row from the top of the table shown in FIG. 18, a subblock coefficient flag (coded_sub_block_flag) is put out of the existing loop and made independent. That is, first the subblock coefficient flags for all subblocks in the TU are parsed.

Then, the subblock with coded_sub_block_flag=1, i.e., the nonzero subblock is counted. Then, the number of nonzero subblocks×the number of context-coded bins for one subblock is shared.

Furthermore, management of the number of context-coded bins is closed within the TU (predetermined unit). That is, the number of context-coded bins as described above is distributed for each block.

By doing so, as shown in the third row from the top of the table shown in FIG. 18, the number of extra context-coded bins in the nonzero subblock can be used as the number of context-coded bins in another nonzero subblock, and a reduction in encoding efficiency can be suppressed. In other words, the reduction in image quality of the decoded image can be suppressed.

Figure 19:
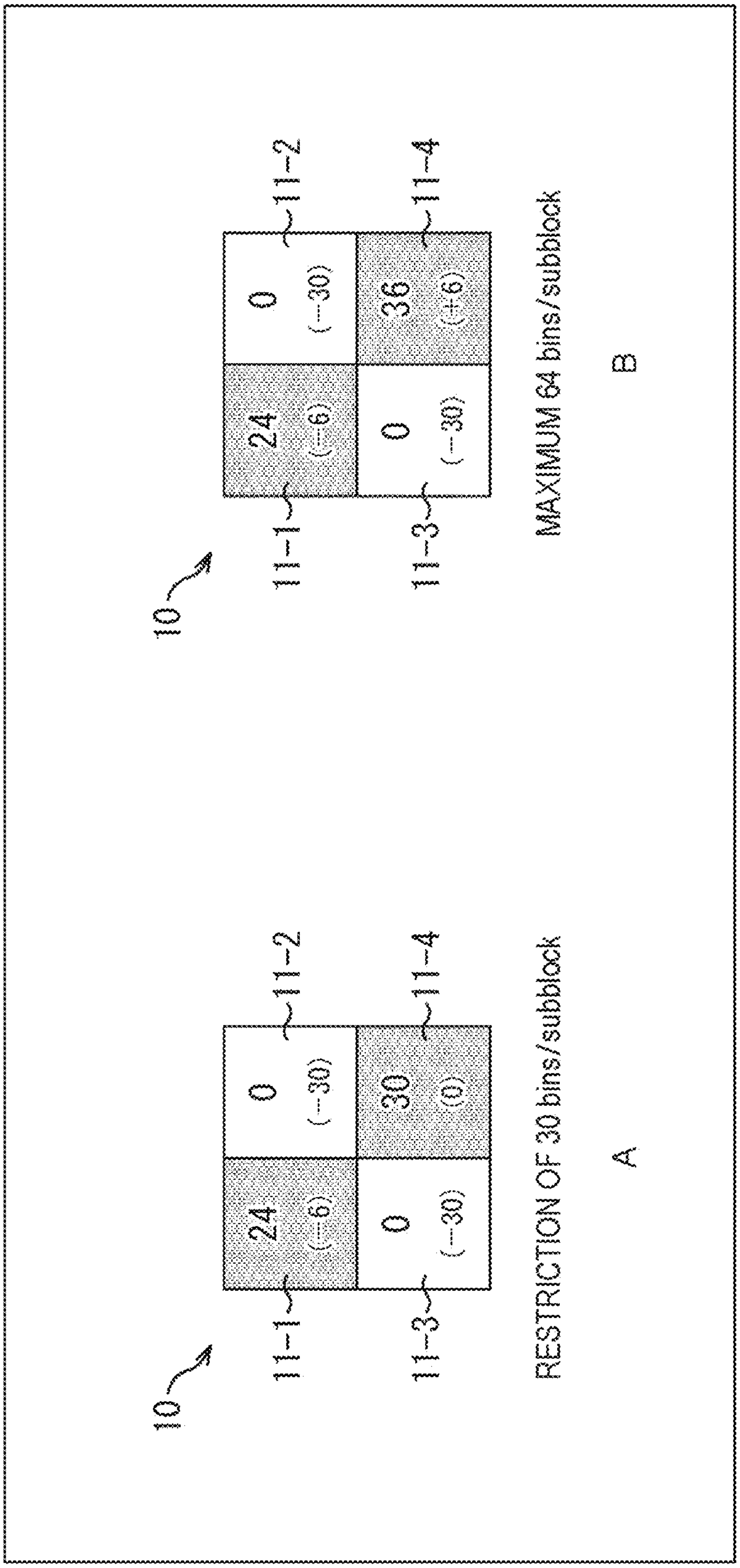
FIG. 19 is a diagram explaining an application example of method #2.

For example, as shown in A of FIG. 19, in a case where a restriction of 30 bins is set for each subblock, even when only 24 bins are generated in the subblock 11-1, which is a nonzero subblock, the 6 bins to the upper limit value could not be passed to another nonzero subblock. Therefore, even in the subblock 11-4, which is a nonzero subblock, the number of context-coded bins could not be increased beyond the 30 bins, which is the upper limit value.

On the other hand, in the case of the method #2, as shown in B of FIG. 19, the number of extra context-coded bins ("6" in this example) in the subblock 11-1, which is a nonzero subblock, can be allocated to the subblock 11-4, which is a nonzero subblock. That is, in those nonzero subblocks, the number of context-coded bins can be shared, and depending on the allocation, a syntax element value of 30 bins or more can be generated. Therefore, a reduction in encoding efficiency can be suppressed.

<Flow of the Syntax Element Value Derivation Processing>

In this case as well, the configuration of the encode apparatus 100 is similar to the case of the first embodiment (FIG. 4). Furthermore, the configuration of the CABAC 102 is similar to the case of the first embodiment (FIG. 5). Moreover, the flow of the encoding processing executed by the encode apparatus 100 is similar to the case of the first embodiment (FIG. 6). Furthermore, the flow of the CABAC processing is similar to the case of the first embodiment (FIG. 12).

Figure 20:
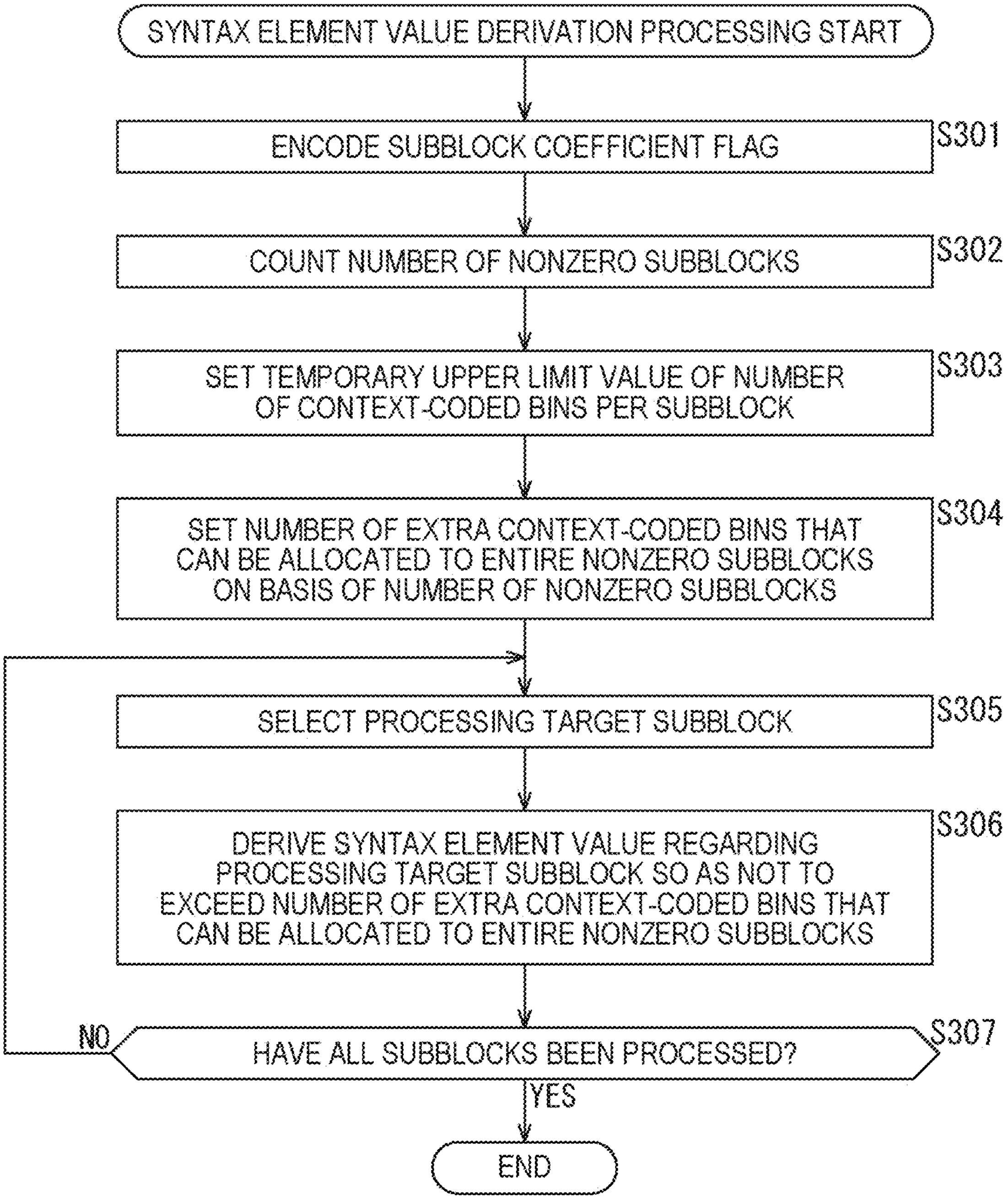
FIG. 20 is a flowchart explaining an example of a flow of syntax element value derivation processing.

An example of the flow of the syntax element value derivation processing in this case will be described with reference to the flowchart of FIG. 20. FIGS. 21 to 24 are diagrams showing an example of the syntax of residual coding. Description will be given in conjunction with these drawings as necessary. Note that in the syntax of FIGS. 21 to 24, threshold values (TH1 to TH3) can have, for example, the values described below.

TH1=6, TH2=28, TH3=3

Of course, the value of each threshold value is arbitrary and is not limited to this example.

When the syntax element value derivation processing is started, the sequencer 101 encodes the subblock coefficient flag (coded_sub_block_flag) in the processing target block in step S301 as shown, for example, in the first to tenth rows from the top of FIG. 22.

In step S302, the sequencer 101 counts the number of nonzero subblocks (numNonZeroSbk) on the basis of the value of the subblock coefficient flag as shown, for example, in the twelfth to fifteenth rows from the top of FIG. 22. That is, the sequencer 101 counts the number of subblocks with coded_sub_block_flag=1 for the block to be processed.

In step S303, the sequencer 101 sets a temporary upper limit value (remBinPass1Tmp) for the number of context-coded bins per subblock as shown, for example, in the seventeenth and eighteenth rows from the top of FIG. 22. For example, in the case of FIG. 19, the maximum number of context-coded bins per subblock is 64 bins similarly to the case of FIG. 3. The sequencer 101 sets this 64 bins to the above-mentioned temporary upper limit value (remBinPass1Tmp). That is, this temporary upper limit value (remBinPass1Tmp) can be set on the basis of the size of the subblock.

In step S304, the sequencer 101 sets the number of extra context-coded bins (remBinPass1) that can be allocated in the entire nonzero subblocks on the basis of the number of nonzero subblocks (numNonZeroSbk) as shown, for example, in the nineteenth and twentieth rows from the top of FIG. 22. The number of extra context-coded bins (remBinPass1) that can be allocated in the entire nonzero subblocks is derived from the product of the number of nonzero subblocks (numNonZeroSbk) counted in step S302 and the temporary upper limit value (remBinPass1Tmp) set in step S303, that is, the sum of the temporary upper limit value (remBinPass1Tmp) allocated to each nonzero subblock.

Next, the processing moves to processing for each subblock. That is, the processing moves to the processing in the loop of the for statement for each subblock in the syntax. In step S305, the sequencer 101 selects a processing target subblock (subSetId=i) from the subblocks in the processing target block.

In step S306, the sequencer 101 derives the value of the syntax element regarding the processing target subblock such that the sum of the number of bins generated in each subblock of the processing target block does not exceed the number of extra context-coded bins (remBinPass1) that can be allocated in the entire nonzero subblocks derived in step S304. This processing corresponds to the syntax shown in FIG. 23 and subsequent drawings.

In step S307, the sequencer 101 determines whether or not all the subblocks have been processed. In a case where it is determined that there is an unprocessed subblock in the processing target block, the processing returns to step S305, and the processing of step S305 and subsequent steps is repeated. That is, each processing of step S305 to step S307 is executed for each subblock in the processing target block. Then, in step S307, in a case where it is determined that all the subblocks in the processing target block have been processed, the syntax element value derivation processing ends, and the processing returns to FIG. 6.

By executing the processing of each step as described above, the sequencer 101 can make the restriction on the number of context-coded bins of each subblock variable. For example, the number of context-coded bins can be distributed among the nonzero subblocks in the processing target block. Therefore, a reduction in encoding efficiency can be suppressed.

Note that by encoding the subblock coefficient flag (coded_sub_block_flag) before the processing for each subblock, and by counting the number of zero subblocks and the number of nonzero subblocks, the number of extra context-coded bins can be distributed more freely (the restriction on distribution can be reduced).

Furthermore, by closing the management of the number of context-coded bins in the block (for example, TU) as described above, an increase in amount of processing can be suppressed.

<Flow of the Coefficient Data Derivation Processing>

In this case as well, the configuration of the decode apparatus 200 is similar to the case of the first embodiment (FIG. 13). Furthermore, the configuration of the CABAC 201 is similar to the case of the first embodiment (FIG. 14). Moreover, the flow of the decoding processing executed by the decode apparatus 200 is similar to the case of the first embodiment (FIG. 15). Furthermore, the flow of the CABAC processing is similar to the case of the first embodiment (FIG. 16).

Figure 25:
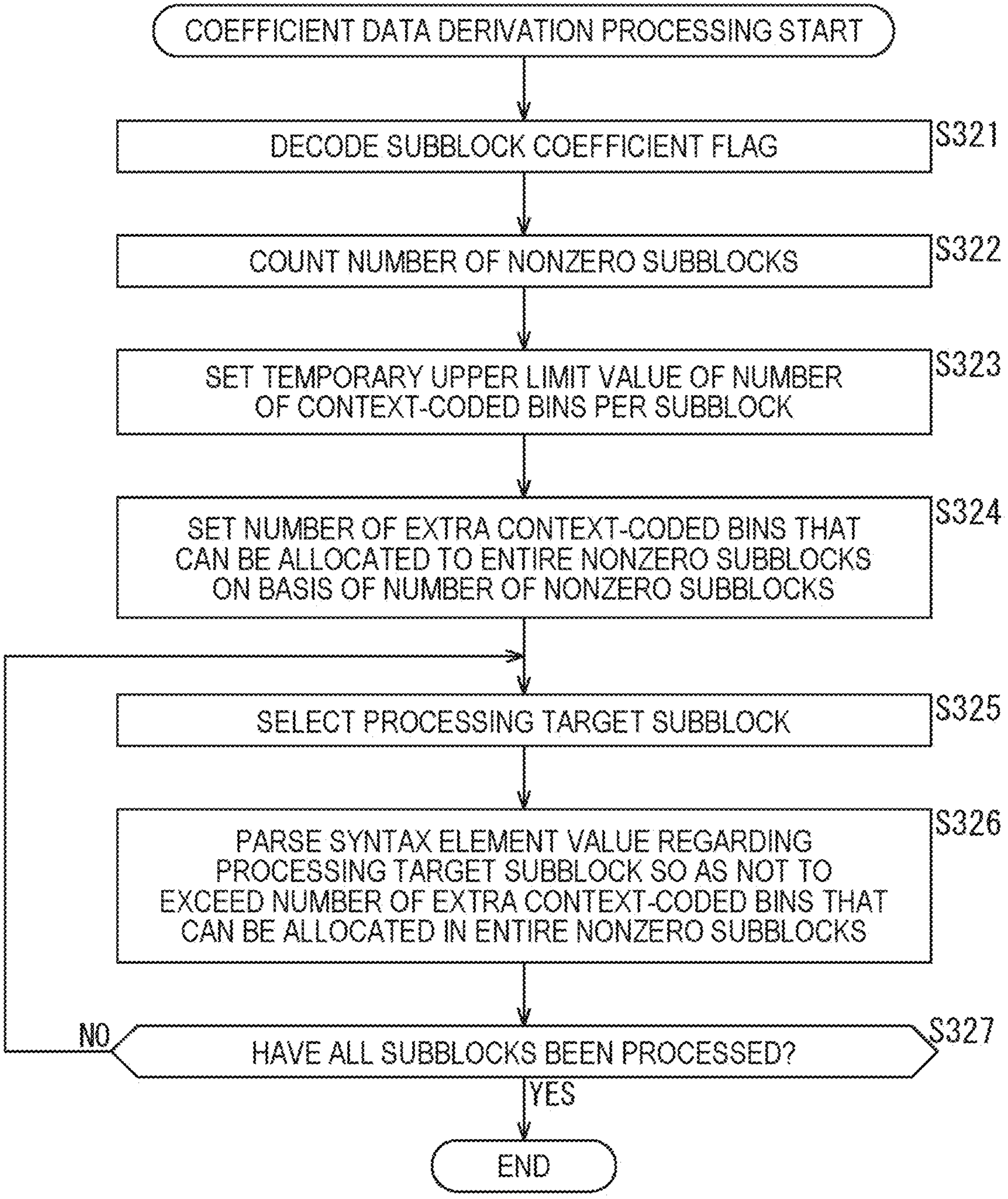
FIG. 25 is a flowchart explaining an example of a flow of coefficient data derivation processing.

An example of the flow of the coefficient data derivation processing in this case will be described with reference to the flowchart of FIG. 25. This coefficient data derivation processing is executed in a flow substantially similar to that of the syntax element value derivation processing (FIG. 20). That is, the processing of each step of the coefficient data derivation processing (steps S321 to S327 of FIG. 25) is executed in a manner substantially similar to that of each processing of the syntax element value derivation processing (steps S301 to S307 of FIG. 20).

However, the parser 202 decodes the subblock coefficient flag (coded_sub_block_flag) in the processing target block in step S321 as shown, for example, in the first to tenth rows from the top of FIG. 22. When the processing of step S321 ends, the processing proceeds to step S322.

Furthermore, in step S326, the parser 202 derives coefficient data by parsing the syntax element value regarding the processing target subblock such that the sum of the number of bins generated in each subblock of the processing target block does not exceed the number of extra context-coded bins (remBinPass1) that can be allocated in the entire nonzero subblocks derived in step S324. This processing corresponds to the syntax shown in FIG. 23 and subsequent drawings. When the processing of step S326 ends, the processing proceeds to step S327.

By executing the processing of each step as described above, the parser 202 can make the restriction on the number of context-coded bins of each subblock variable. For example, the number of context-coded bins can be distributed among the nonzero subblocks in the processing target block. Therefore, a reduction in encoding efficiency can be suppressed. The number of context-coded bins allocated to zero subblocks in the processing target block can be distributed to nonzero subblocks. Therefore, the number of context-coded bins allocated to the zero subblocks can also be used. Therefore, a reduction in encoding efficiency can be suppressed.

Note that by decoding the subblock coefficient flag (coded_sub_block_flag) before the processing for each subblock, and by counting the number of zero subblocks and the number of nonzero subblocks, the number of extra context-coded bins can be distributed more freely (the restriction on distribution can be reduced).

Furthermore, by closing the management of the number of context-coded bins in the block (for example, TU) as described above, an increase in amount of processing can be suppressed.

4. THIRD EMBODIMENT

Method #3

Furthermore, for example, the number of extra context-coded bins in the nonzero subblock may be used within another nonzero subblock as shown in the top row of the table in FIG. 26.

For example, as shown in the second row from the top of the table shown in FIG. 26, in a case where there is a subblock in which the maximum value of the number of context-coded bins per subblock is not reached, the number of extra context-coded bins is pooled and used for the next and subsequent subblocks.

By doing so, the subblock coefficient flag can be applied without leaving the existing loop, as shown in the third row from the top of the table shown in FIG. 26. That is, an increase in the amount of change in the syntax can be suppressed, and the present technology can be applied more easily.

Furthermore, the number of extra context-coded bins in the nonzero subblock can be used as the number of context-coded bins in another nonzero subblock, and a reduction in encoding efficiency can be suppressed. In other words, the reduction in image quality of the decoded image can be suppressed.

Figure 27:
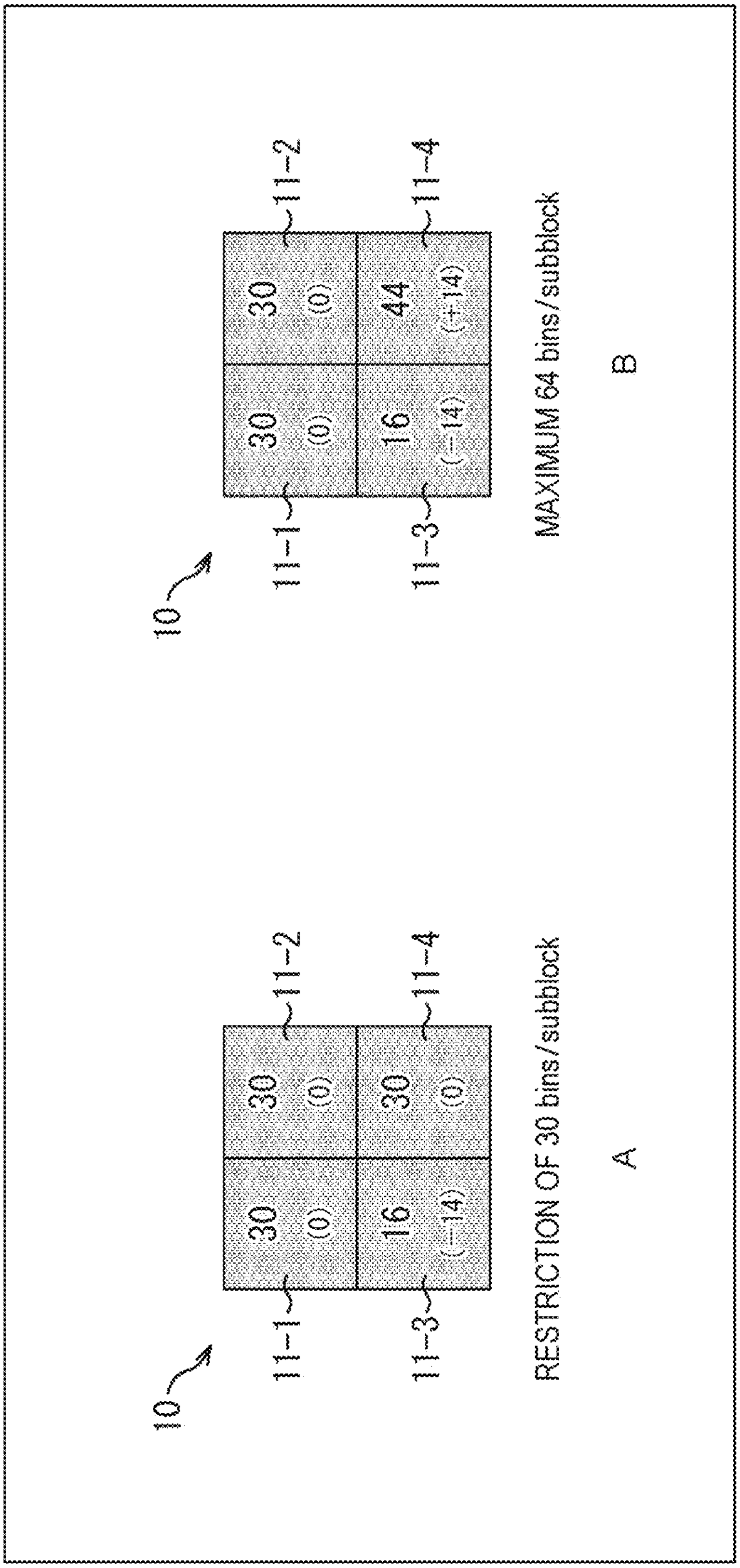
FIG. 27 is a diagram explaining an application example of method #3.

For example, as shown in A of FIG. 27, in a case where a restriction of 30 bins is set for each subblock, even when only 16 bins are generated in the subblock 11-3, the subblock 11-4 is subject to the restriction of 30 bins. That is, the 14 bins to the upper limit value could not be passed to the next and subsequent subblocks.

On the other hand, in the case of the method #3, as shown in B of FIG. 27, the number of extra context-coded bins ("14" in this example) in the subblock 11-3 can be allocated to the subblock 11-4 to be processed next. That is, in the subblock 11-4, a syntax element value of 30 bins or more can be generated. Therefore, a reduction in encoding efficiency can be suppressed.

<Flow of the Syntax Element Value Derivation Processing>

In this case as well, the configuration of the encode apparatus 100 is similar to the case of the first embodiment (FIG. 4). Furthermore, the configuration of the CABAC 102 is similar to the case of the first embodiment (FIG. 5). Moreover, the flow of the encoding processing executed by the encode apparatus 100 is similar to the case of the first embodiment (FIG. 6). Furthermore, the flow of the CABAC processing is similar to the case of the first embodiment (FIG. 12).

Figure 28:
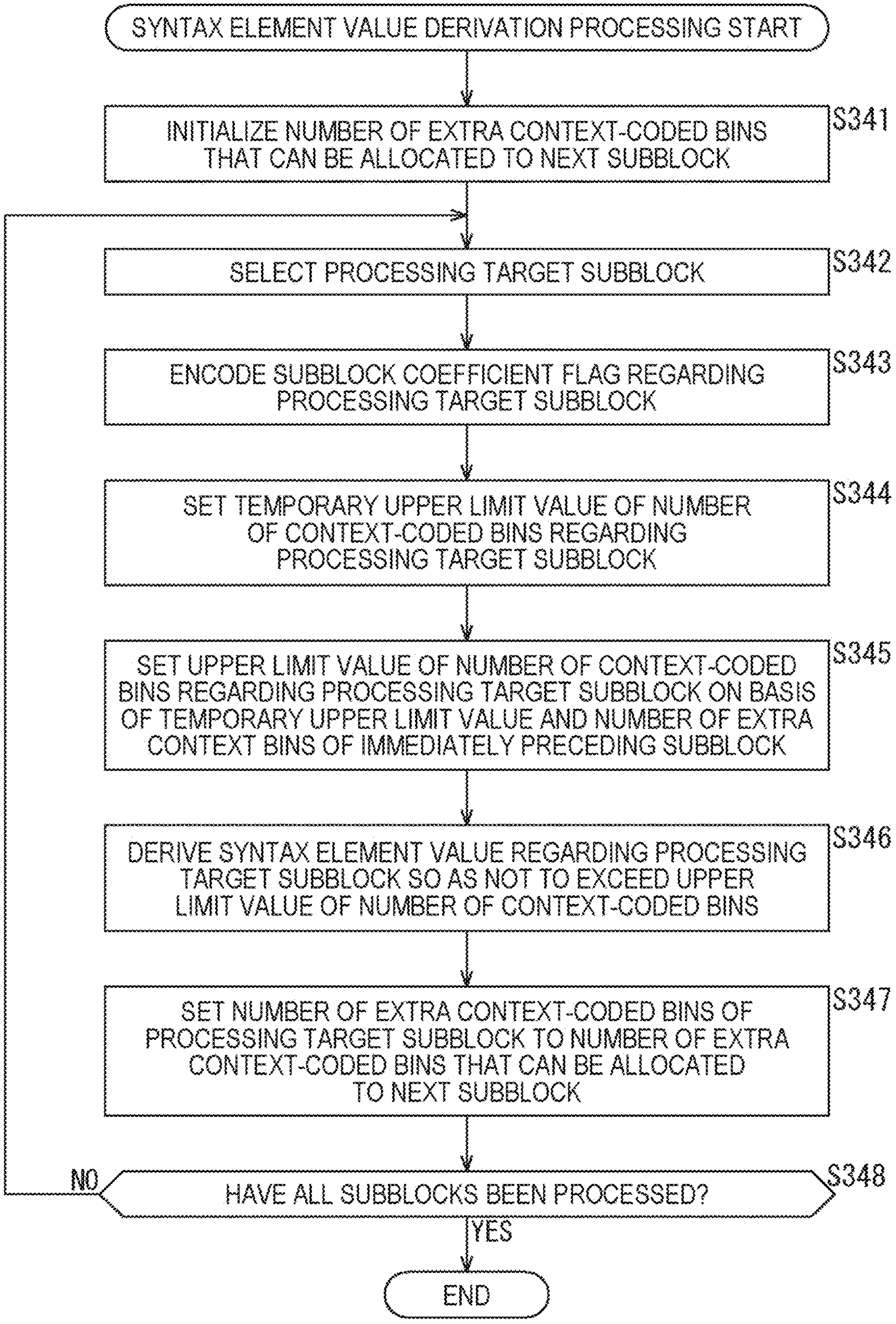
FIG. 28 is a flowchart explaining an example of a flow of syntax element value derivation processing.

An example of the flow of the syntax element value derivation processing in this case will be described with reference to the flowchart of FIG. 28. FIGS. 29 to 32 are diagrams showing an example of the syntax of residual coding. Description will be given in conjunction with these drawings as necessary. Note that in the syntax of FIGS. 29 to 32, threshold values (TH1 to TH3) can have, for example, the values described below.

TH1=6, TH2=28, TH3=3

Of course, the value of each threshold value is arbitrary and is not limited to this example.

When the syntax element value derivation processing is started, in step S341, the sequencer 101 initializes the number of extra context-coded bins (remBinPass1Next) that can be allocated to the next subblock (e.g., remBinPass1Next=0) as shown, for example, in the first and second rows from the top of FIG. 30. That is, by default, the number of extra context-coded bins is zero, indicating that the number of bins cannot be added to the next subblock.

Next, the processing moves to processing for each subblock. That is, the processing moves to the processing in the loop of the for statement for each subblock in the syntax. In step S342, the sequencer 101 selects a processing target subblock (subSetId=i) from the subblocks in the processing target block.

The sequencer 101 encodes the subblock coefficient flag (coded_sub_block_flag) regarding the processing target subblock in step S343 as shown, for example, in the third to eleventh rows from the top of FIG. 30.

In step S344, the sequencer 101 sets a temporary upper limit value (remBinPass1Tmp) for the number of context-coded bins for the processing target subblock as shown, for example, in the fourteenth and fifteenth rows from the top of FIG. 30. For example, in the case of FIG. 27, the maximum number of context-coded bins per subblock is 64 bins similarly to the case of FIG. 3. The sequencer 101 sets this 64 bins to the above-mentioned temporary upper limit value (remBinPass1Tmp). That is, this temporary upper limit value (remBinPass1Tmp) can be set on the basis of the size of the subblock.

In step S345, the sequencer 101 sets the upper limit value (remBinPass1) of the number of context-coded bins on the basis of the temporary upper limit value (remBinPass1Tmp) set for the processing target subblock in step S344 and the number of extra context-coded bins (remBinPass1Next) of the subblock processed immediately before that can be allocated to the next subblock as shown, for example, in the sixteenth and seventeenth rows from the top of FIG. 30. For example, the upper limit value (remBinPass1) of the number of context-coded bins of the processing target subblock is derived from the sum of the temporary upper limit value (remBinPass1Tmp) and the number of extra context-coded bins (remBinPass1Next) that can be allocated to the next subblock.

In step S346, the sequencer 101 derives the syntax element value so as not to exceed the upper limit value (remBinPass1) of the number of context-coded bins set for the processing target subblock in step S345.

In step S347, the sequencer 101 sets the number of extra context-coded bins of the processing target subblock (remBinPass1 after derivation of the syntax element value) to the number of extra context-coded bins (remBinPass1Next) that can be allocated to the next subblock as shown, for example, in the twenty-first and the twenty-second rows from the top of FIG. 31.

In step S348, the sequencer 101 determines whether or not all the subblocks have been processed. In a case where it is determined that there is an unprocessed subblock in the processing target block, the processing returns to step S342, and the processing of step S342 and subsequent steps is repeated. That is, each processing of step S342 to step S348 is executed for each subblock in the processing target block. Then, in step S348, in a case where it is determined that all the subblocks in the processing target block have been processed, the syntax element value derivation processing ends, and the processing returns to FIG. 6.

By executing the processing of each step as described above, the sequencer 101 can make the restriction on the number of context-coded bins of each subblock variable. For example, the number of extra context-coded bins of the processing target subblock can be used as the number of context-coded bins of the next and subsequent subblocks to be processed. Therefore, a reduction in encoding efficiency can be suppressed.

Note that by closing the management of the number of context-coded bins in the block (for example, TU) as described above, an increase in amount of processing can be suppressed.

<Flow of the Coefficient Data Derivation Processing>

In this case as well, the configuration of the decode apparatus 200 is similar to the case of the first embodiment (FIG. 13). Furthermore, the configuration of the CABAC 201 is similar to the case of the first embodiment (FIG. 14). Moreover, the flow of the decoding processing executed by the decode apparatus 200 is similar to the case of the first embodiment (FIG. 15). Furthermore, the flow of the CABAC processing is similar to the case of the first embodiment (FIG. 16).

Figure 33:
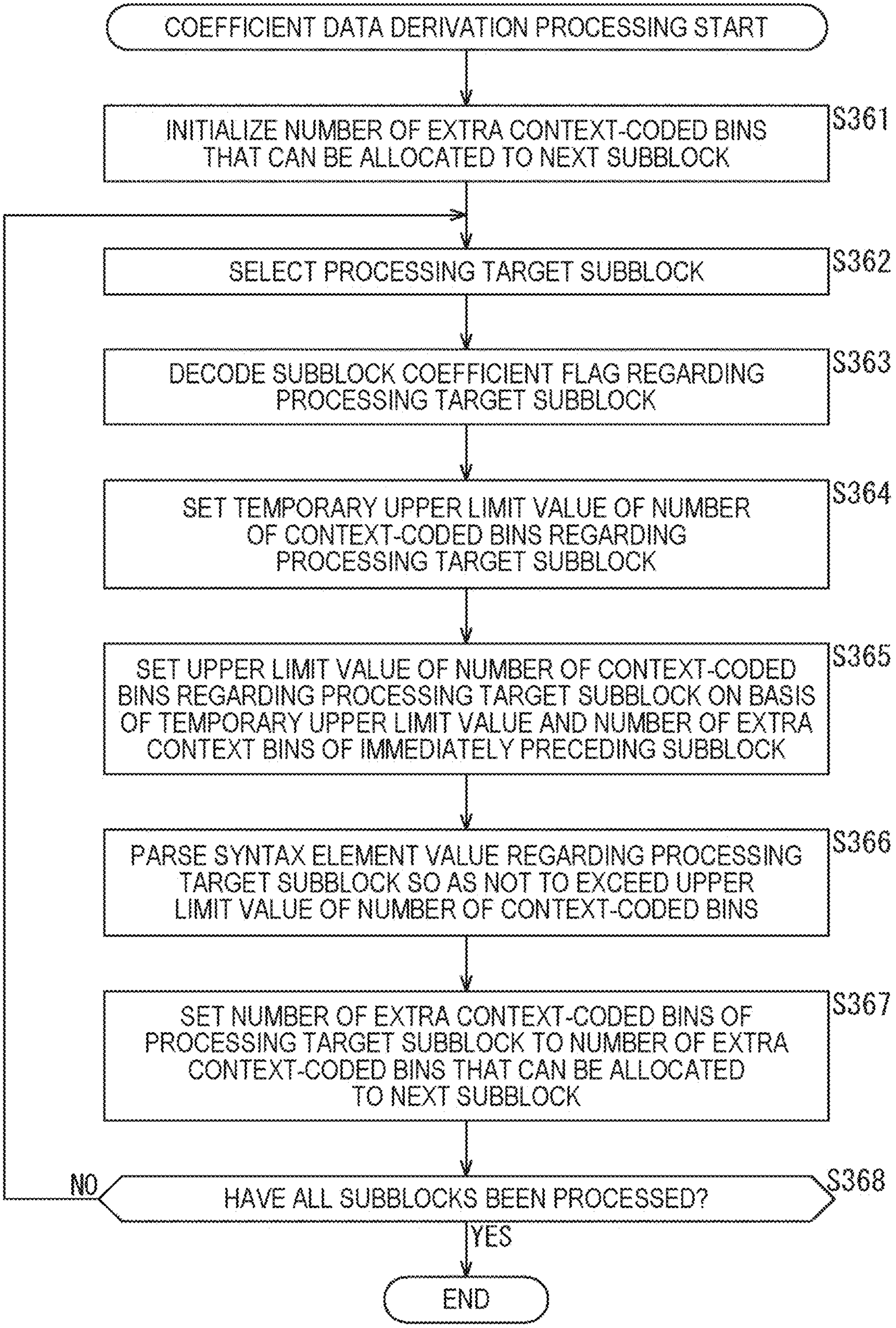
FIG. 33 is a flowchart explaining an example of a flow of coefficient data derivation processing.

An example of the flow of the coefficient data derivation processing in this case will be described with reference to the flowchart of FIG. 33. This coefficient data derivation processing is executed in a flow substantially similar to that of the syntax element value derivation processing (FIG. 28). That is, the processing of each step of the coefficient data derivation processing (steps S361 to S368 of FIG. 33) is executed in a manner substantially similar to that of each processing of the syntax element value derivation processing (steps S341 to S348 of FIG. 28).

However, the parser 202 decodes the subblock coefficient flag (coded_sub_block_flag) in the processing target subblock in step S363 as shown, for example, in the third to eleventh rows from the top of FIG. 30. When the processing of step S363 ends, the processing proceeds to step S364.

Furthermore, in step S366, the parser 202 derives the coefficient data by parsing the syntax element value so as not to exceed the upper limit value (remBinPass1) of the number of context-coded bins set for the processing target subblock in step S365. When the processing of step S366 ends, the processing proceeds to step S367.

By executing the processing of each step as described above, the parser 202 can make the restriction on the number of context-coded bins of each subblock variable. For example, the number of extra context-coded bins of the processing target subblock can be used as the number of context-coded bins of the next and subsequent subblocks to be processed. Therefore, a reduction in encoding efficiency can be suppressed.

Note that by closing the management of the number of context-coded bins in the block (for example, TU) as described above, an increase in amount of processing can be suppressed.

5. FOURTH EMBODIMENT

Method #4

The methods described above can be arbitrarily combined as long as there is no contradiction. For example, as shown in the top row of the table of FIG. 34, the above-mentioned methods #1 to #3 may be used in combination.

For example, as shown in the second row from the top of the table shown in FIG. 34, a subblock coefficient flag (coded_sub_block_flag) is put out of the existing loop and made independent. That is, first the subblock coefficient flags for all subblocks in the TU are parsed as in the methods #1 and #2.

Then, the subblock with coded_sub_block_flag=0, i.e., the zero subblock is counted as in the methods #1 and #2.

Then, the number of zero subblocks×the number of context-coded bins for one subblock is passed (added) to the nonzero subblock as in the method #1. Furthermore, the number of context-coded bins allocated to each nonzero subblock is shared as in the method #2. Moreover, as in the method #3, the number of extra context-coded bins generated in the processing target subblock is pooled and used for the next and subsequent subblocks.

Furthermore, management of the number of context-coded bins is closed within the TU (predetermined unit) as in the methods #1 to #3. That is, the number of context-coded bins as described above is distributed for each block.

By doing so, as shown in the third row from the top of the table shown in FIG. 34, the effects of each method of the above-mentioned methods #1 to #3 can be obtained. Therefore, a reduction in encoding efficiency can be suppressed. In other words, the reduction in image quality of the decoded image can be suppressed.

Figure 35:
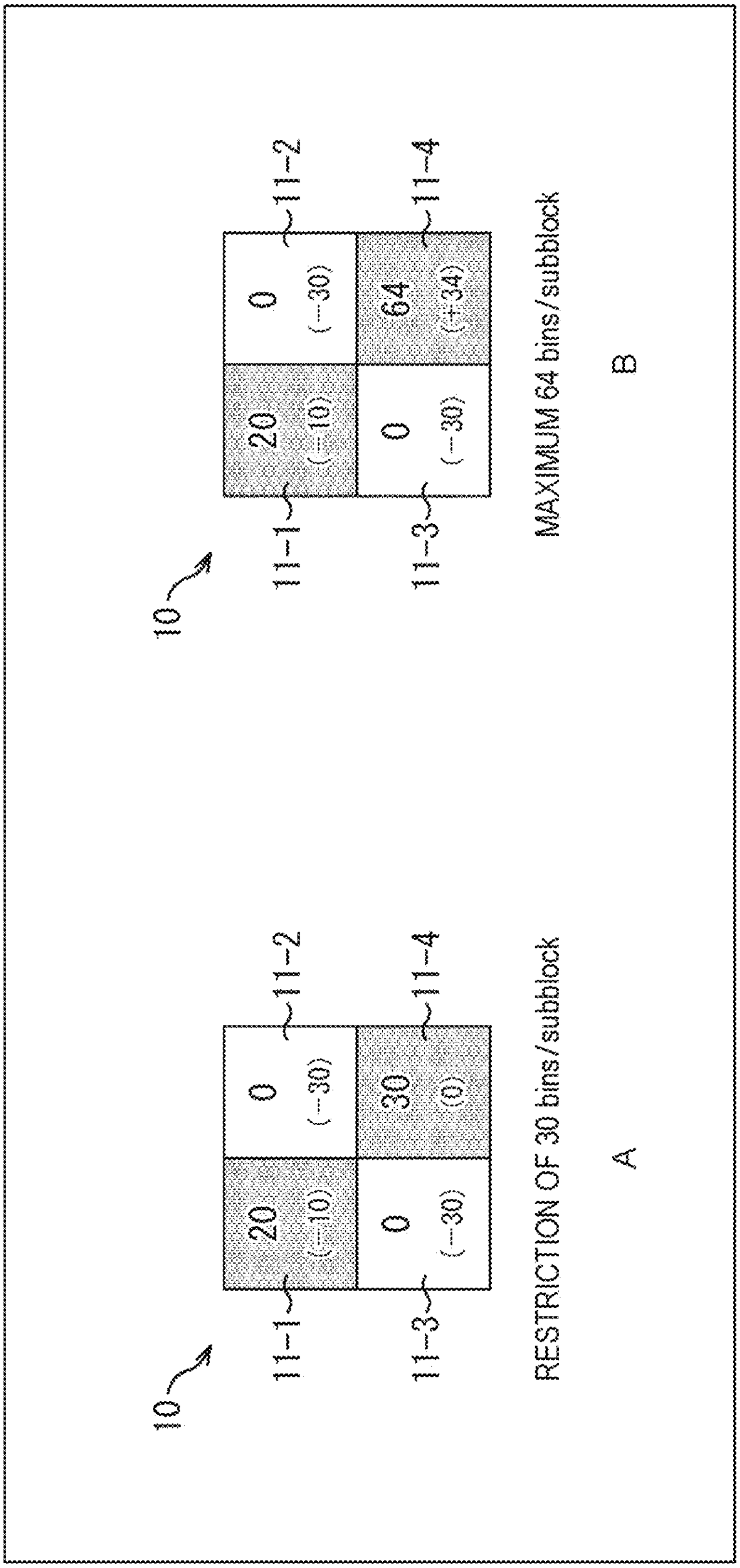
FIG. 35 is a diagram explaining an application example of method #4.

For example, as shown in A of FIG. 35, in a case where a restriction to 30 bins per subblock is set, even when the subblock 11-2 and the subblock 11-3 are zero subblocks, their number of extra context-coded bins could not be used in the subblock 11-1 or the subblock 11-4, which are nonzero subblocks. Furthermore, the number of extra context-coded bins could not be shared between nonzero subblocks. Moreover, even when only 20 bins are generated in the subblock 11-1, which is a nonzero subblock, the 10 bins to the upper limit value could not be passed to the subblock 11-4, which is another next and subsequent nonzero subblock to be processed. Therefore, the subblock 11-4 is subject to the restriction of 30 bins, and the number of context-coded bins could not be increased beyond the 30 bins, which is the upper limit value.

On the other hand, in the case of the method #4, as shown in B of FIG. 35, the number of extra context-coded bins of the subblock 11-2 and the subblock 11-3, which are zero subblocks, can be allocated to the subblock 11-1 or the subblock 11-4, which are nonzero subblocks. Furthermore, the number of context-coded bins can be shared between the subblock 11-1 and the subblock 11-4, which are nonzero subblocks. Moreover, the number of extra context-coded bins of the subblock 11-1 (10 bins in the case of A of FIG. 35) can be allocated to the subblock 11-4. That is, in the subblock, a syntax element value of 30 bins or more can be generated. Therefore, a reduction in encoding efficiency can be suppressed.

<Flow of the Syntax Element Value Derivation Processing>

In this case as well, the configuration of the encode apparatus 100 is similar to the case of the first embodiment (FIG. 4). Furthermore, the configuration of the CABAC 102 is similar to the case of the first embodiment (FIG. 5). Moreover, the flow of the encoding processing executed by the encode apparatus 100 is similar to the case of the first embodiment (FIG. 6). Furthermore, the flow of the CABAC processing is similar to the case of the first embodiment (FIG. 12).

An example of the flow of the syntax element value derivation processing in this case will be described with reference to the flowcharts of FIGS. 36 and 37. FIGS. 38 to 41 are diagrams showing an example of the syntax of residual coding. Description will be given in conjunction with these drawings as necessary. Note that in the syntax of FIGS. 38 to 41, threshold values (TH1 to TH4) can have, for example, the values described below.

TH1=6, TH2=28, TH3=2, TH4=4

Of course, the value of each threshold value is arbitrary and is not limited to this example.

Figure 36:
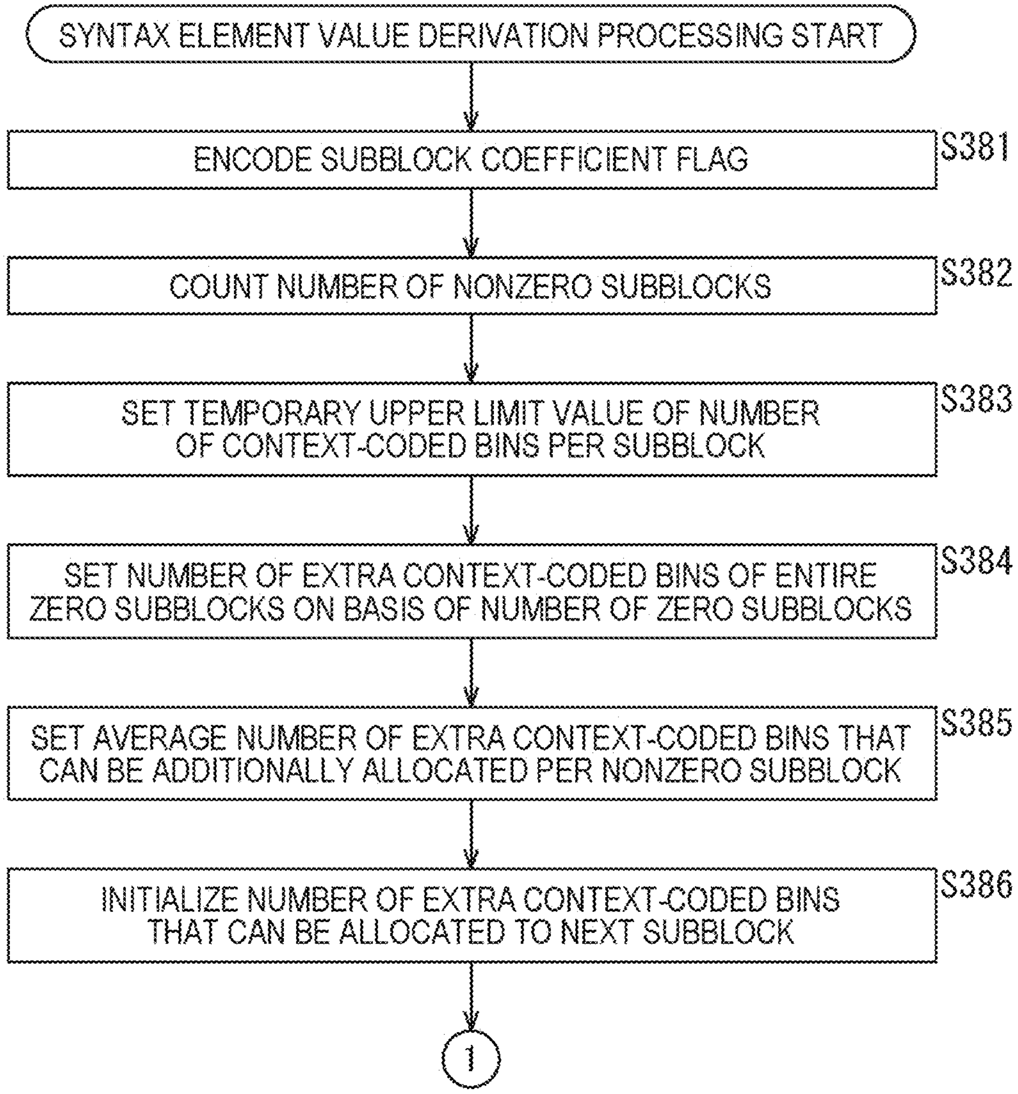
FIG. 36 is a flowchart explaining an example of a flow of syntax element value derivation processing.

When the syntax element value derivation processing is started, the sequencer 101 encodes the subblock coefficient flag (coded_sub_block_flag) in the processing target block in step S381 of FIG. 36 as shown, for example, in the first to tenth rows from the top of FIG. 39.

In step S382, the sequencer 101 counts the number of nonzero subblocks (numNonZeroSbk) on the basis of the value of the subblock coefficient flag as shown, for example, in the twelfth to fifteenth rows from the top of FIG. 39. That is, the sequencer 101 counts the number of subblocks with coded_sub_block_flag=1 for the block to be processed.

In step S383, the sequencer 101 sets a temporary upper limit value (remBinPass1Tmp) for the number of context-coded bins per subblock as shown, for example, in the seventeenth and eighteenth rows from the top of FIG. 39. Similarly to the case of the method #1, this temporary upper limit value (remBinPass1Tmp) can be set on the basis of the size of the subblock.

In step S384, the sequencer 101 sets the number of extra context-coded bins (remBinPass1InZeroSbk) of the entire zero subblocks on the basis of the number of zero subblocks (numZeroSBk) as shown, for example, in the nineteenth and twentieth rows from the top of FIG. 39. Similarly to the case of the method #1, the number of zero subblocks (numZeroSBk) can be determined from the number of nonzero subblocks (numNonZeroSbk) counted in step S382, and the number of extra context-coded bins (remBinPass1InZeroSbk) of the entire zero subblocks is derived by the product of the number of zero subblocks (numZeroSBk) and the temporary upper limit value (remBinPass1Tmp).

In step S385, the sequencer 101 sets the average number of extra context-coded bins (remBinPass1Extra) that can be additionally allocated per nonzero subblock as shown, for example, in the twenty-first and twenty-second rows from the top of FIG. 39. This average number of extra context-coded bins (remBinPass1Extra) can be derived by dividing the number of extra context-coded bins (remBinPass1InZeroSbk) of the entire zero subblocks derived in step S384 by the number of zero subblocks (numZeroSBk). Note that in order to avoid division, the average number of extra context-coded bins (remBinPass1Extra) may be derived using a lookup table.

In step S386, the sequencer 101 initializes the number of extra context-coded bins (remBinPass1Next) that can be allocated to the next subblock (e.g., remBinPass1Next=0) as shown, for example, in the twenty-fourth and the twenty-fifth rows from the top of FIG. 39. That is, by default, the number of extra context-coded bins is zero, indicating that the number of bins cannot be added to the next subblock.

Figure 37:
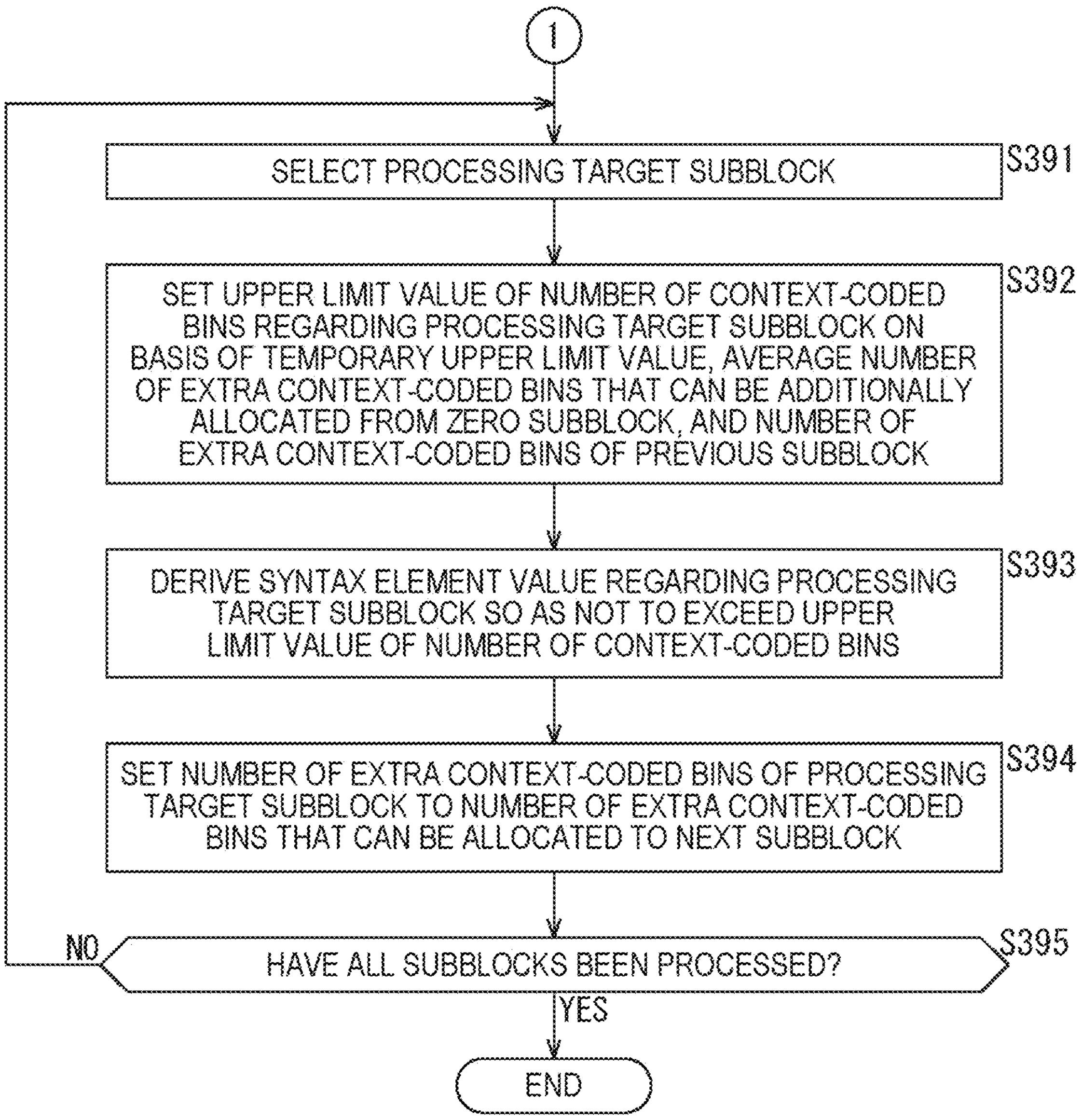
FIG. 37 is a flowchart following FIG. 36 explaining an example of a flow of syntax element value derivation processing.

When the processing of step S386 ends, the processing proceeds to FIG. 37.

Next, the processing moves to processing for each subblock. That is, the processing moves to the processing in the loop of the for statement for each subblock in the syntax. In step S391, the sequencer 101 selects a processing target subblock (subSetId=i) from the subblocks in the processing target block.

In step S392, the sequencer 101 sets the upper limit value (remBinPass1) of the number of context-coded bins for the processing target subblock as shown, for example, in the fifth and sixth rows from the top of FIG. 40 on the basis of the temporary upper limit value (remBinPass1Tmp), the average number of extra context-coded bins (remBinPass1Extra) that can be additionally allocated from the zero subblock, and the number of extra context-coded bins of the previous subblock. In the case of the example of FIG. 40, the upper limit value (remBinPass1) of the number of context-coded bins is derived from the sum of the temporary upper limit value (remBinPass1Tmp), the average number of extra context-coded bins that can be additionally allocated from the zero subblock (remBinPass1Extra), and the number of extra context-coded bins that can be allocated to the next subblock (remBinPass1Next).

In step S393, the sequencer 101 derives the syntax element value so as not to exceed the upper limit value (remBinPass1) of the number of context-coded bins for the processing target subblock.

In step S394, the sequencer 101 sets the number of extra context-coded bins of the processing target subblock (remBinPass1 after derivation of the syntax element value) to the number of extra context-coded bins (remBinPass1Next) that can be allocated to the next subblock as shown, for example, in the fortieth and the forty-first rows from the top of FIG. 40.

In step S395, the sequencer 101 determines whether or not all the subblocks have been processed. In a case where it is determined that there is an unprocessed subblock in the processing target block, the processing returns to step S391, and the processing of step S391 and subsequent steps is repeated. That is, each processing of step S391 to step S395 is executed for each subblock in the processing target block. Then, in step S395, in a case where it is determined that all the subblocks in the processing target block have been processed, the syntax element value derivation processing ends, and the processing returns to FIG. 6.

By executing the processing of each step as described above, the sequencer 101 can make the restriction on the number of context-coded bins of each subblock variable. That is, the effects of each method of the above-mentioned methods #1 to #3 can be obtained. Therefore, a reduction in encoding efficiency can be suppressed. In other words, the reduction in image quality of the decoded image can be suppressed.

<Flow of the Coefficient Data Derivation Processing>

In this case as well, the configuration of the decode apparatus 200 is similar to the case of the first embodiment (FIG. 13). Furthermore, the configuration of the CABAC 201 is similar to the case of the first embodiment (FIG. 14). Moreover, the flow of the decoding processing executed by the decode apparatus 200 is similar to the case of the first embodiment (FIG. 15). Furthermore, the flow of the CABAC processing is similar to the case of the first embodiment (FIG. 16).

An example of the flow of the coefficient data derivation processing in this case will be described with reference to the flowcharts of FIGS. 42 and 43. This coefficient data derivation processing is executed in a flow substantially similar to that of the syntax element value derivation processing (FIGS. 36 and 37). That is, the processing of each step of the coefficient data derivation processing (steps S411 to S416 of FIG. 42 and steps S421 to S425 of FIG. 43) is executed in a manner substantially similar to that of each processing of the syntax element value derivation processing (steps S381 to S386 of FIG. 36 and steps S391 to S395 of FIG. 37).

Figure 42:
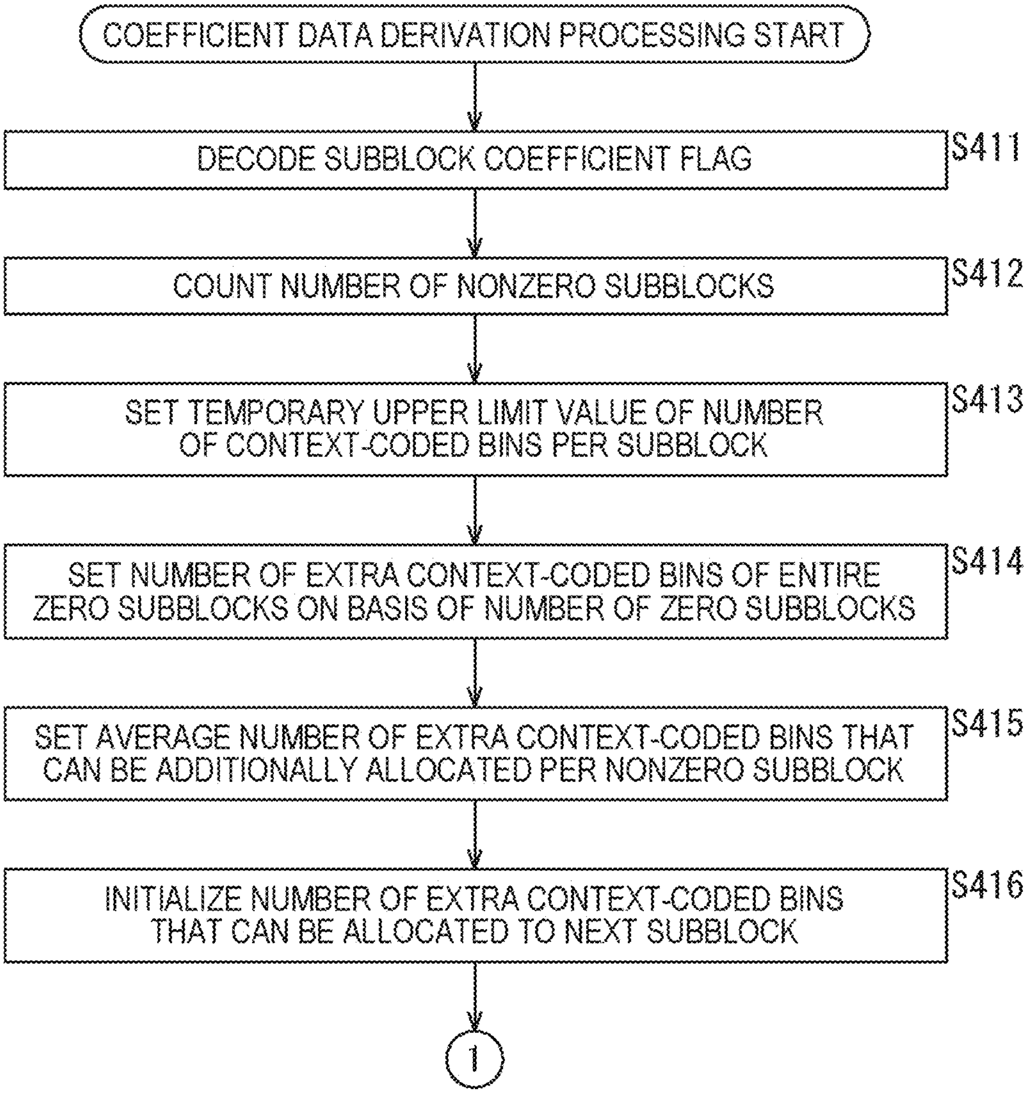
FIG. 42 is a flowchart explaining an example of a flow of coefficient data derivation processing.

However, the parser 202 decodes the subblock coefficient flag (coded_sub_block_flag) in the processing target subblock in step S411 of FIG. 42 as shown, for example, in the first to tenth rows from the top of FIG. 39. When the processing of step S411 ends, the processing proceeds to step S412.

Figure 43:
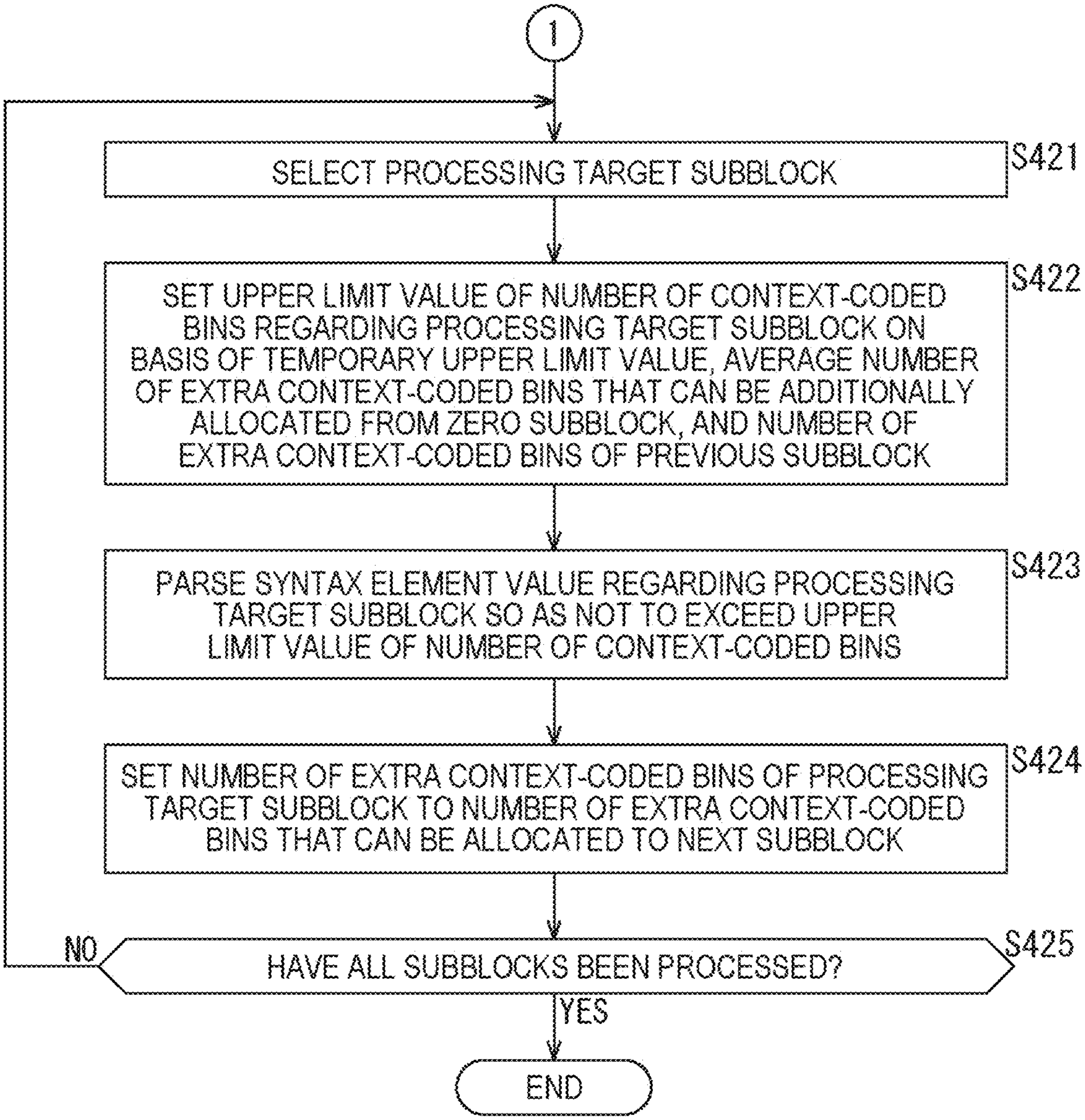
FIG. 43 is a flowchart following FIG. 42 explaining an example of a flow of coefficient data derivation processing.

Furthermore, in step S423 of FIG. 43, the parser 202 derives the coefficient data by parsing the syntax element value so as not to exceed the upper limit value (remBinPass1) of the number of context-coded bins set for the processing target subblock in step S422. When the processing of step S423 ends, the processing proceeds to step S424.

By executing the processing of each step as described above, the parser 202 can make the restriction on the number of context-coded bins of each subblock variable. That is, the effects of each method of the above-mentioned methods #1 to #3 can be obtained. Therefore, a reduction in encoding efficiency can be suppressed. In other words, the reduction in image quality of the decoded image can be suppressed.

6. FIFTH EMBODIMENT

Method #5

Furthermore, for example, as an application of the method #1 as shown in the top row of the table of FIG. 44, the priority for allocating the number of extra context-coded bins may be set according to the position of the subblock.

For example, as shown in the second row from the top of the table shown in FIG. 44, in the case of a low-range subblock, a larger number of extra context-coded bins may be allocated, and in the case of a high-range subblock, a less number of extra context-coded bins may be allocated. Furthermore, conversely, in the case of a high-range subblock, a larger number of extra context-coded bins may be allocated, and in the case of a low-range subblock, a less number of extra context-coded bins may be allocated.

By doing so, as shown in the third row from the top of the table shown in FIG. 44 the number of extra context-coded bins can be used as the number of context-coded bins in another subblock, and a reduction in encoding efficiency can be suppressed. In other words, the reduction in image quality of the decoded image can be suppressed.

Figure 45:
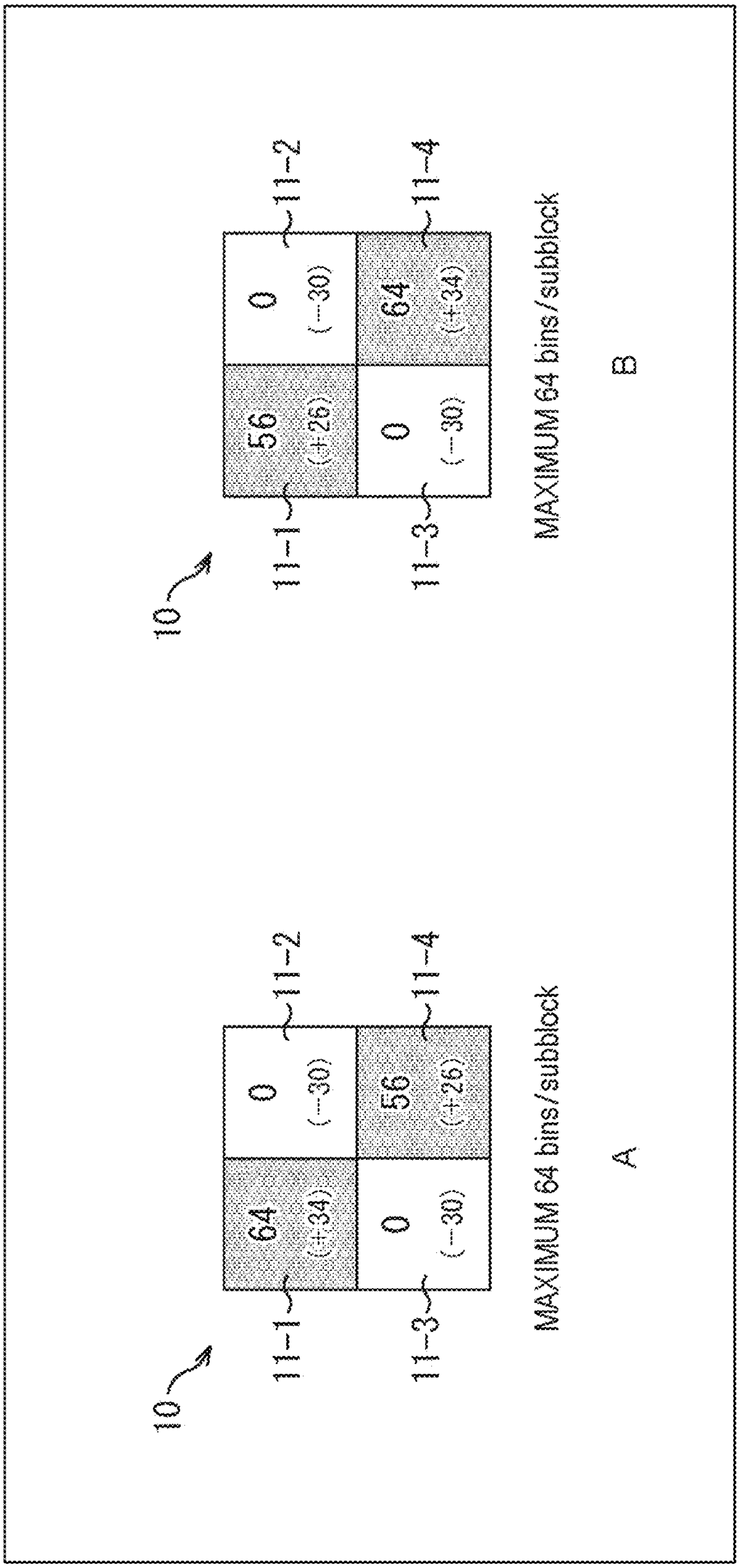
FIG. 45 is a diagram explaining an application example of method #5.

For example, in the case of A of FIG. 45, a larger number of extra context-coded bins than the number of extra context-coded bins of the subblock 11-4, which is a high-range subblock, is allocated to the subblock 11-1, which is a low-range subblock. In general, the coefficient data obtained by orthogonally transforming the image data is collected in a low range rather than in a high range. Therefore, in such a case, it is possible to further suppress the reduction in encoding efficiency by allocating a large number of extra context-coded bins to the low-range subblock as in the example of A of FIG. 45.

Furthermore, for example, in the case of B of FIG. 45, a larger number of extra context-coded bins than the number of extra context-coded bins of the subblock 11-1, which is a low-range subblock, is allocated to the subblock 11-4, which is a high-range subblock. When the orthogonal transform is skipped, for example, as in the case of lossless coding, the high-range coefficient data generally tends to be larger than the case where the orthogonal transform is performed. Furthermore, for example, in the case of an image having many edge components, the high-range coefficient data tends to be large. In such a case, it is possible to further suppress the reduction in encoding efficiency by allocating a large number of extra context-coded bins to the high-range subblock as in the example of B of FIG. 45.

In this case as well, the configuration of the encode apparatus 100 is similar to the case of the first embodiment (FIG. 4). Furthermore, the configuration of the CABAC 102 is similar to the case of the first embodiment (FIG. 5). Moreover, the flow of the encoding processing executed by the encode apparatus 100 is similar to the case of the first embodiment (FIG. 6). Furthermore, the flow of the CABAC processing is similar to the case of the first embodiment (FIG. 12).

Figure 7:
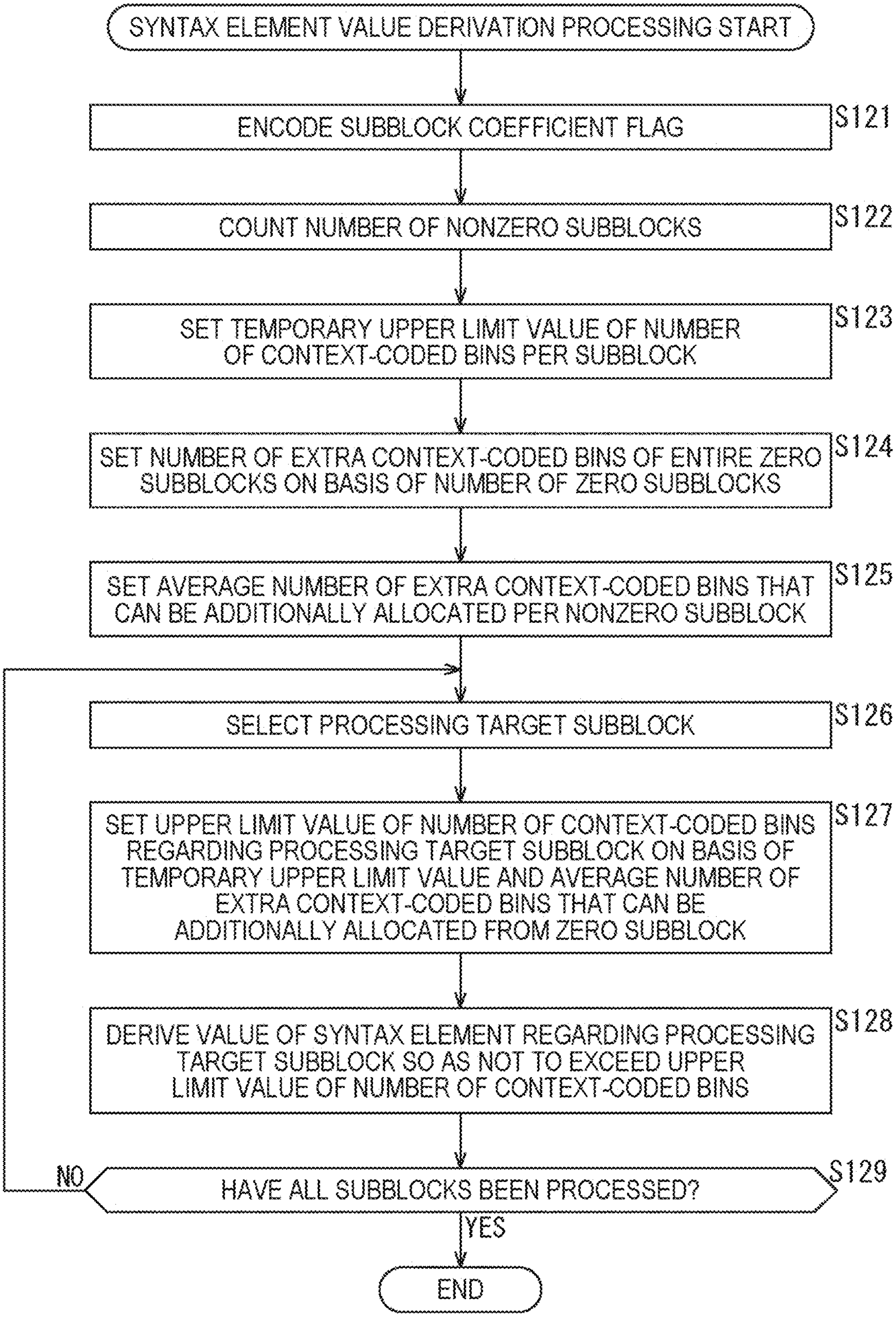
FIG. 7 is a flowchart explaining an example of a flow of syntax element value derivation processing.

Moreover, the syntax element value derivation processing is basically similar to the case of the first embodiment (FIG. 7). In step S127, when setting the upper limit value of the number of context-coded bins for the processing target subblock, as described above, it is only required to set the upper limit value by taking into consideration the position of the processing target subblock.

Furthermore, in this case as well, the configuration of the decode apparatus 200 is similar to the case of the first embodiment (FIG. 13). Furthermore, the configuration of the CABAC 201 is similar to the case of the first embodiment (FIG. 14). Moreover, the flow of the decoding processing executed by the decode apparatus 200 is similar to the case of the first embodiment (FIG. 15). Furthermore, the flow of the CABAC processing is similar to the case of the first embodiment (FIG. 16).

Figure 17:
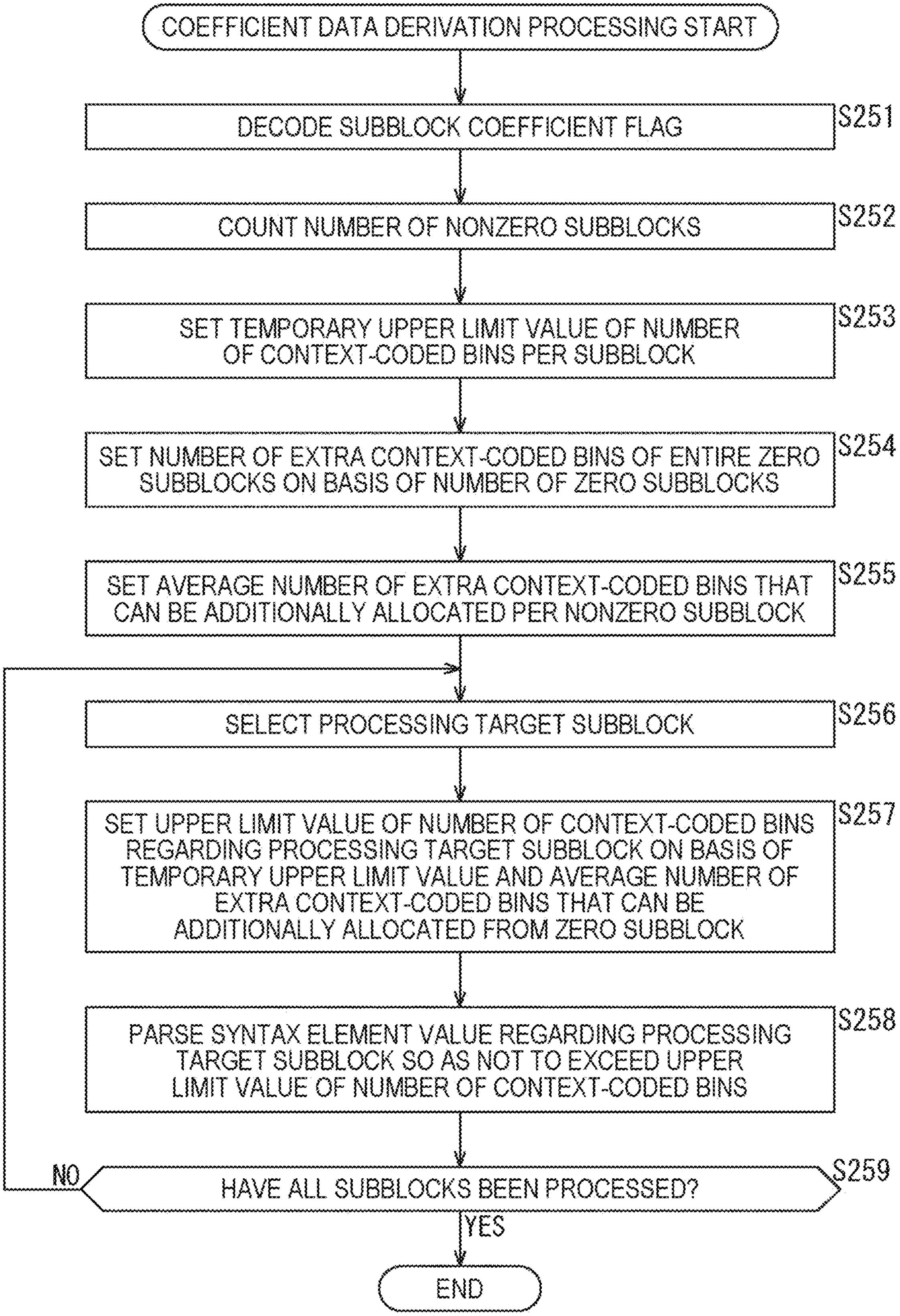
FIG. 17 is a flowchart explaining an example of a flow of coefficient data derivation processing.

Moreover, the coefficient data derivation processing is basically similar to the case of the first embodiment (FIG. 17). In step S257, when setting the upper limit value of the number of context-coded bins for the processing target subblock, as described above, it is only required to set the upper limit value by taking into consideration the position of the processing target subblock.

7. SIXTH EMBODIMENT

Method #6

Furthermore, for example, as shown in the top row of the table of FIG. 46, the unit for managing the number of context-coded bins may be extended to a size larger than the TU.

For example, as shown in the second row from the top of the table shown in FIG. 46, the number of extra context-coded bins may be managed, for example, for each CU, VPDU, or CTU. That is, the number of bins may be distributed among nonzero subblocks in the CU, VPDU, or CTU to set the upper limit value of the number of bins allocated to the processing target subblock.

By doing so, the number of extra context-coded bins can be shared in a wider range. That is, as shown in the third row from the top of the table shown in FIG. 46, it is possible to allocate the number of context-coded bins with a higher degree of freedom. Therefore, a reduction in encoding efficiency can be suppressed. In other words, the reduction in image quality of the decoded image can be suppressed.

Figure 47:
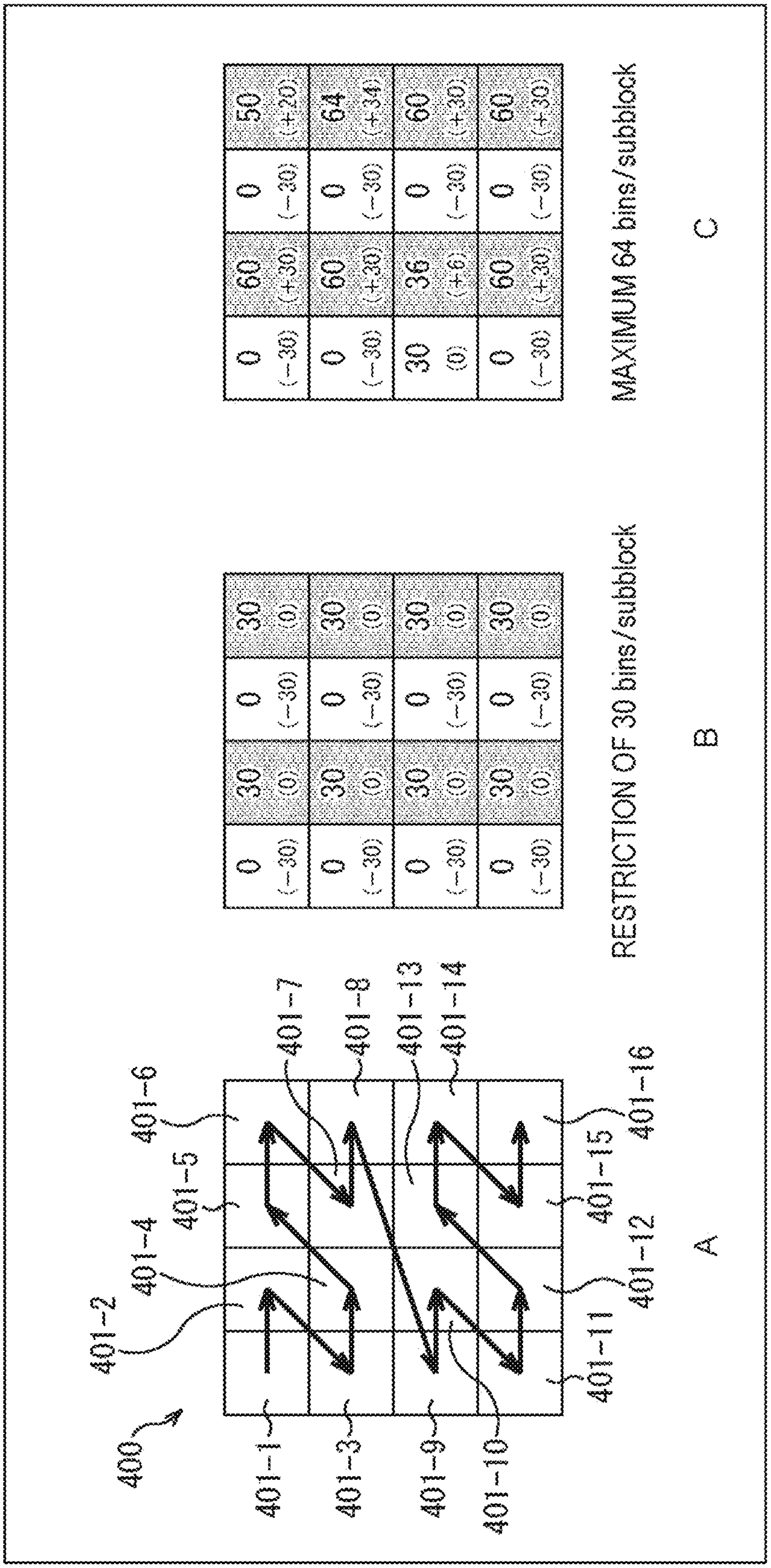
FIG. 47 is a diagram explaining an application example of method #6.

For example, as shown in A of FIG. 47, it is assumed that a CU 400 includes 4×4 subblocks 401 (subblocks 401-1 to 401-16). Furthermore, it is assumed that each subblock is processed in the Morton code order as shown by the arrow in the drawing.

In a case where there is a restriction of 30 bins per subblock as shown in B of FIG. 47, even when there are zero subblocks, the number of extra context-coded bins could not be used in the next and subsequent subblocks. Therefore, the number of context-coded bins was limited to 30 bins or less in all subblocks.

Therefore, the method #6 is applied to share the number of extra context-coded bins within the CU 400. In this case, as shown in C of FIG. 47, the number of extra context-coded bins generated in the processing target subblock can be allocated to the next and subsequent subblocks to be processed. Therefore, in the subblock 401, a syntax element value of 30 bins or more can be generated. Therefore, a reduction in encoding efficiency can be suppressed. In particular, in the case of the method #6, since the range for sharing the number of extra context-coded bins is wider than that of the TU, it is possible to allocate the number of context-coded bins with a higher degree of freedom.

In this case as well, the configuration of the encode apparatus 100 is similar to the case of the first embodiment (FIG. 4). Furthermore, the configuration of the CABAC 102 is similar to the case of the first embodiment (FIG. 5). Moreover, the flow of the encoding processing executed by the encode apparatus 100 is similar to the case of the first embodiment (FIG. 6). Furthermore, the flow of the CABAC processing is similar to the case of the first embodiment (FIG. 12).

Moreover, the syntax element value derivation processing is basically similar to the case of the first embodiment (FIG. 7). It is sufficient if the processing target block is a data unit larger than the TU (for example, CU, VPDU, or CTU).

Furthermore, in this case as well, the configuration of the decode apparatus 200 is similar to the case of the first embodiment (FIG. 13). Furthermore, the configuration of the CABAC 201 is similar to the case of the first embodiment (FIG. 14). Moreover, the flow of the decoding processing executed by the decode apparatus 200 is similar to the case of the first embodiment (FIG. 15). Furthermore, the flow of the CABAC processing is similar to the case of the first embodiment (FIG. 16).

Moreover, the coefficient data derivation processing is basically similar to the case of the first embodiment (FIG. 17). It is sufficient if the processing target block is a data unit larger than the TU (for example, CU, VPDU, or CTU).

8. SEVENTH EMBODIMENT

Method #7

Furthermore, for example, as shown in the top row of the table of FIG. 48, the upper limit of the maximum value of the number of context-coded bins in the syntax structure may be omitted (not set).

For example, as shown in the second row from the top of the table shown in FIG. 48, the amount of bins generated may be limited by a Level restriction, a conditional expression, or the like. Furthermore, the amount of generation may be limited in units of data larger than the subblock (for example, TU unit, CU unit, VPDU unit, CTU unit, slice unit, picture unit, and the like) instead of the subblock unit.

By doing so, as shown in the third row from the top of the table shown in FIG. 48, many coefficients can be expressed by flags when local coefficient data is generated. Therefore, a reduction in encoding efficiency can be suppressed. In other words, the reduction in image quality of the decoded image can be suppressed.

Figure 49:
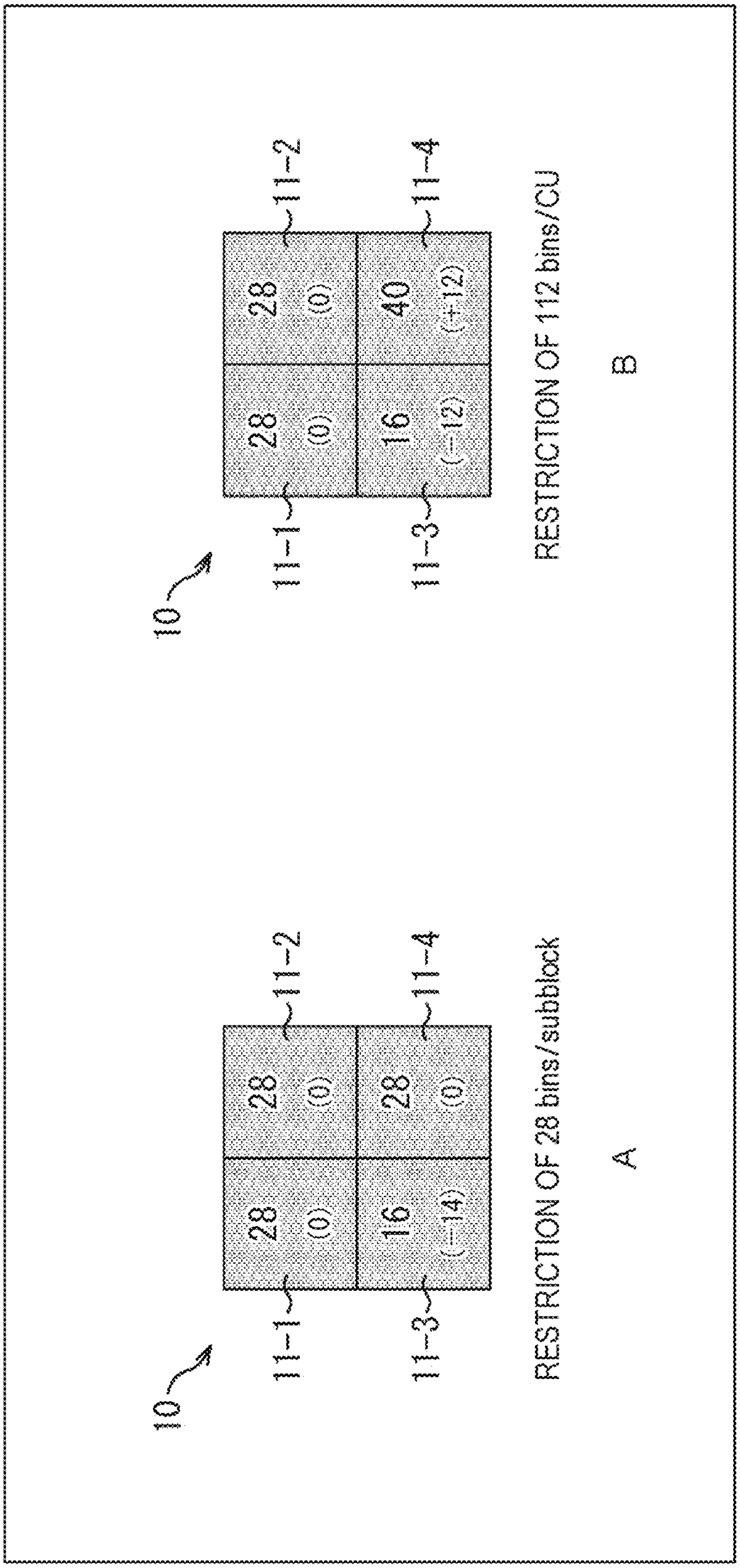
FIG. 49 is a diagram explaining an application example of method #7.

For example, as shown in A of FIG. 49, in a case where a restriction of 28 bins is set for each subblock, even when the number of extra context-coded bins is generated, it could not be used in another subblock. Therefore, for example, even in the subblock 11-4, the number of context-coded bins could not be increased beyond the 28 bins, which is the upper limit value.

On the other hand, in the case of the method #7, as shown in B of FIG. 49, the number of context-coded bins can be shared, for example, in CU units. Therefore, it is possible to allocate 28 bins or more context-coded bins for a subblock. Therefore, a reduction in encoding efficiency can be suppressed.

<Flow of the Syntax Element Value Derivation Processing>

In this case as well, the configuration of the encode apparatus 100 is similar to the case of the first embodiment (FIG. 4). Furthermore, the configuration of the CABAC 102 is similar to the case of the first embodiment (FIG. 5). Moreover, the flow of the encoding processing executed by the encode apparatus 100 is similar to the case of the first embodiment (FIG. 6). Furthermore, the flow of the CABAC processing is similar to the case of the first embodiment (FIG. 12).

Figure 50:
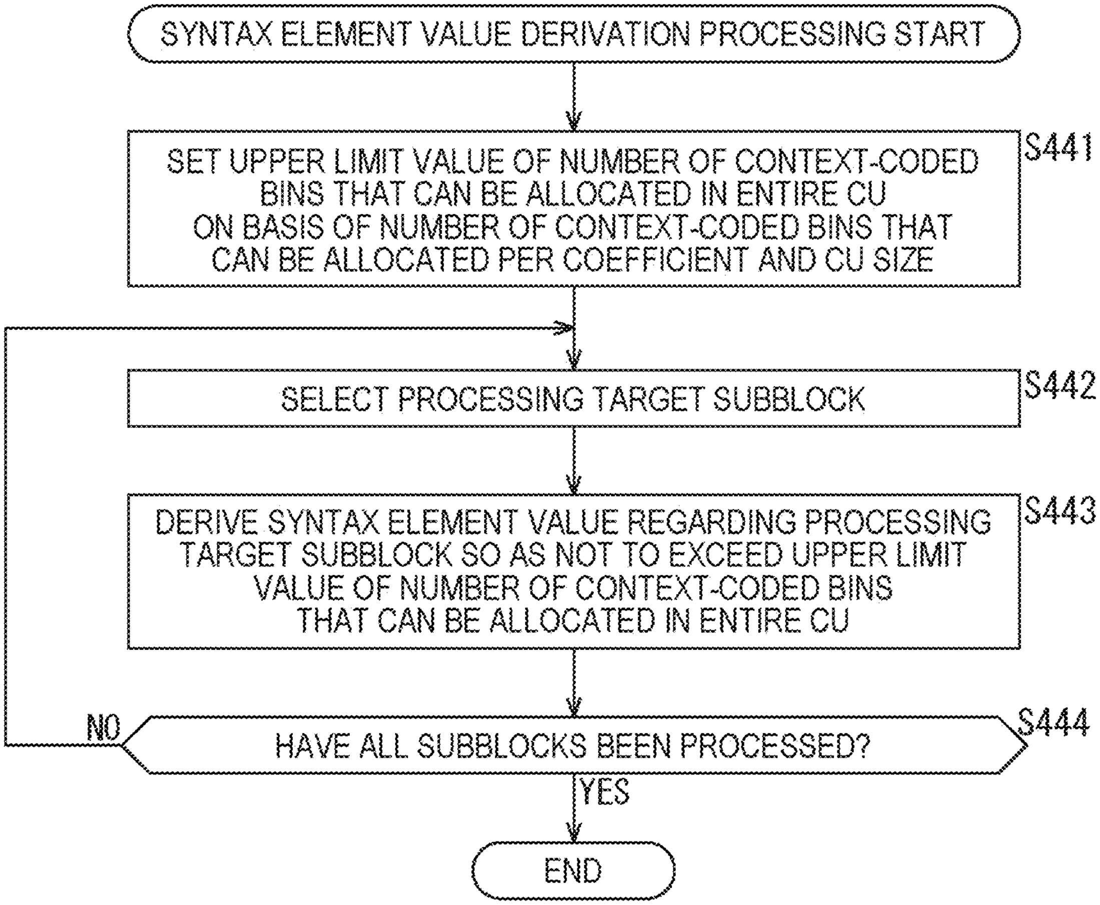
FIG. 50 is a flowchart explaining an example of a flow of syntax element value derivation processing.

An example of the flow of the syntax element value derivation processing in this case will be described with reference to the flowchart of FIG. 50. Note that, here, a case where the number of context-coded bins is shared in CU units will be described as an example. Furthermore, FIGS. 51 to 53 are diagrams showing an example of the syntax of residual coding. Description will be given in conjunction with these drawings as necessary.

When the syntax element value derivation processing is started, in step S441, the sequencer 101 sets the upper limit value (remBinsPass1) of the number of context-coded bins that can be allocated in the entire CU on the basis of the number of context-coded bins that can be allocated per coefficient ("*7)>>2") and the CU size (log 2TbWidth, log 2TbHeight) as shown, for example, in the twenty-first row from the top of FIG. 51.

Next, the processing moves to processing for each subblock. In step S442, the sequencer 101 selects a processing target subblock from the subblocks in the processing target CU.

In step S443, the sequencer 101 derives the syntax element value for the processing target subblock so as not to exceed the upper limit value (remBinsPass1) of the number of context-coded bins that can be allocated in the entire CU set in step S441.

In step S444, the sequencer 101 determines whether or not all the subblocks have been processed. In a case where it is determined that there is an unprocessed subblock in the processing target CU, the processing returns to step S442, and the processing of step S442 and subsequent steps is repeated. That is, each processing of step S442 to step S444 is executed for each subblock in the processing target CU. Then, in step S444, in a case where it is determined that all the subblocks in the processing target CU have been processed, the syntax element value derivation processing ends, and the processing returns to FIG. 6.

By executing the processing of each step as described above, the sequencer 101 can make the restriction on the number of context-coded bins of each subblock variable. For example, the number of context-coded bins can be shared in CU units. Therefore, a reduction in encoding efficiency can be suppressed.

Note that by closing the management of the number of context-coded bins in the block (for example, CU) as described above, an increase in amount of processing can be suppressed.

<Flow of the Coefficient Data Derivation Processing>

In this case as well, the configuration of the decode apparatus 200 is similar to the case of the first embodiment (FIG. 13). Furthermore, the configuration of the CABAC 201 is similar to the case of the first embodiment (FIG. 14). Moreover, the flow of the decoding processing executed by the decode apparatus 200 is similar to the case of the first embodiment (FIG. 15). Furthermore, the flow of the CABAC processing is similar to the case of the first embodiment (FIG. 16).

Figure 54:
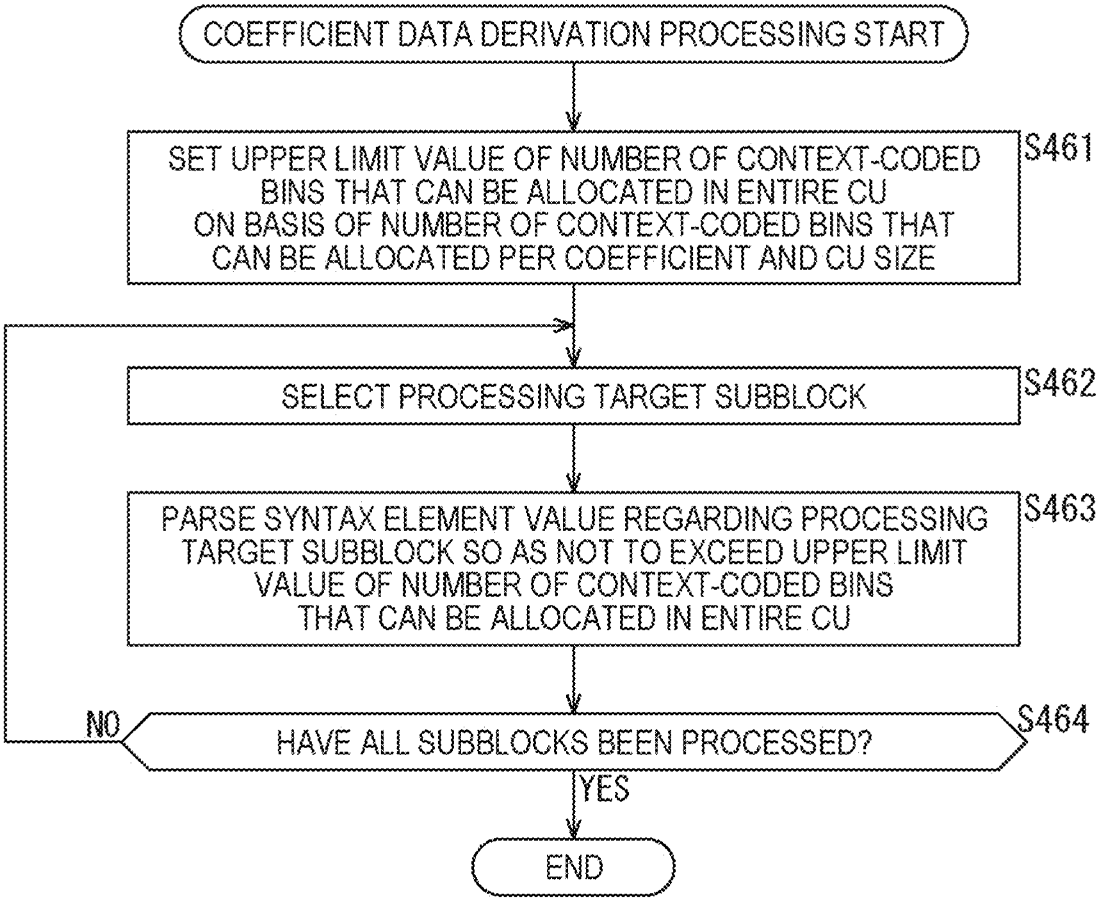
FIG. 54 is a flowchart explaining an example of a flow of coefficient data derivation processing.

An example of the flow of the coefficient data derivation processing in this case will be described with reference to the flowchart of FIG. 54. This coefficient data derivation processing is executed in a flow substantially similar to that of the syntax element value derivation processing (FIG. 50). That is, the processing of each step of the coefficient data derivation processing (steps S461 to S464 of FIG. 54) is executed in a manner substantially similar to that of each processing of the syntax element value derivation processing (steps S441 to S444 of FIG. 50).

However, in step S463, the parser 202 derives the coefficient data by parsing the syntax element value for the processing target subblock so as not to exceed the upper limit value (remBinsPass1) of the number of context-coded bins that can be allocated in the entire CU set in step S461. When the processing of step S463 ends, the processing proceeds to step S464.

By executing the processing of each step as described above, the parser 202 can make the restriction on the number of context-coded bins of each subblock variable. For example, the number of context-coded bins can be shared in CU units. Therefore, a reduction in encoding efficiency can be suppressed.

Note that by closing the management of the number of context-coded bins in the block (for example, CU) as described above, an increase in amount of processing can be suppressed.

9. EIGHTH EMBODIMENT

Method #8

Furthermore, for example, as shown in the top row of the table of FIG. 55, the upper limit of the maximum value of the number of context-coded bins in the syntax structure may be omitted (not set).

At that time, for example, as shown in the second row from the top of the table shown in FIG. 55, the maximum value of the number of bins that can be generated in the nonzero subblock next to the zero subblock may be set as the upper limit value. Furthermore, in a case where the zero subblocks are continuous, the maximum value of the number of bins that can be generated in the same number of nonzero subblocks may be set as the upper limit value. That is, the maximum value of the number of bins that can be generated in the same number of nonzero subblocks as the zero subblocks may be set as the upper limit value.

By doing so, as shown in the third row from the top of the table shown in FIG. 55, many coefficients can be expressed by flags when local coefficient data is generated. Therefore, a reduction in encoding efficiency can be suppressed. In other words, the reduction in image quality of the decoded image can be suppressed.

Figure 56:
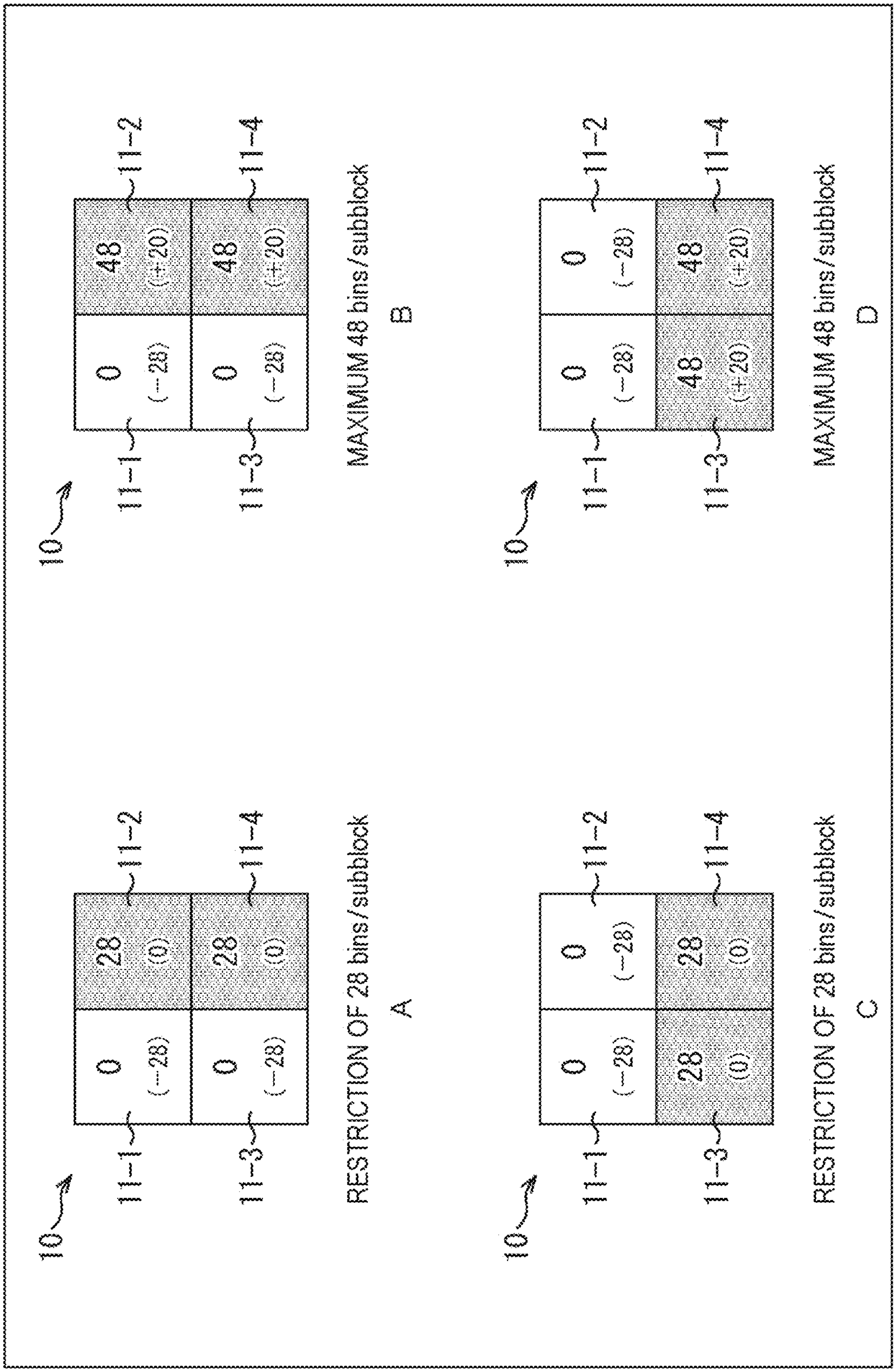
FIG. 56 is a diagram explaining an application example of method #8.

For example, in the case of A of FIG. 56, there is a restriction of 28 bins per subblock. The subblocks 11-1 and 11-3 are zero subblocks, the number of extra context-coded bins (28 bins) is generated. However, in this case, the number of extra context-coded bins could not be used in another subblock. That is, in the subblocks 11-2 and 11-4, which are nonzero subblocks, the number of bins larger than 28 bins, which is the upper limit value, could not be allocated.

On the other hand, in the case of the method #8, the maximum value of the number of bins that can be generated can be set as the upper limit value in the nonzero subblock next to the zero subblock. For example, as shown in B of FIG. 56, since the subblock 11-1 is a zero subblock, the maximum value of the number of bins (48 bins) generated in one subblock can be allocated to the subblock 11-2, which is a nonzero subblock to be processed next, as the upper limit value. Similarly, since the subblock 11-3 is a zero subblock, the maximum value of the number of bins (48 bins) generated in one subblock can be allocated to the subblock 11-4, which is a nonzero subblock to be processed next, as the upper limit value.

Furthermore, in a case where there is a restriction of 28 bins per subblock, even in a case where the subblock 11-1 and the subblock 11-2 are zero subblocks as shown in C of FIG. 56, the number of extra context-coded bins generated in the subblocks 11 could not be used in the subblock 11-3 or the subblock 11-4, which are nonzero subblocks.

On the other hand, in the case of the method #8, in the case of such an arrangement of subblocks, as shown in D of FIG. 56, the subblocks 11-1 and 11-2 are consecutive zero subblocks. Therefore, in the two next and subsequent nonzero subblocks to be processed, the maximum value of the number of bins generated in one subblock can be allocated as the upper limit value. That is, in the subblocks 11-3 and 11-4, the maximum value of the number of bins (48 bins) generated in one subblock can be allocated as the upper limit value.

<Flow of the Syntax Element Value Derivation Processing>

In this case as well, the configuration of the encode apparatus 100 is similar to the case of the first embodiment (FIG. 4). Furthermore, the configuration of the CABAC 102 is similar to the case of the first embodiment (FIG. 5). Moreover, the flow of the encoding processing executed by the encode apparatus 100 is similar to the case of the first embodiment (FIG. 6). Furthermore, the flow of the CABAC processing is similar to the case of the first embodiment (FIG. 12).

Figure 57:
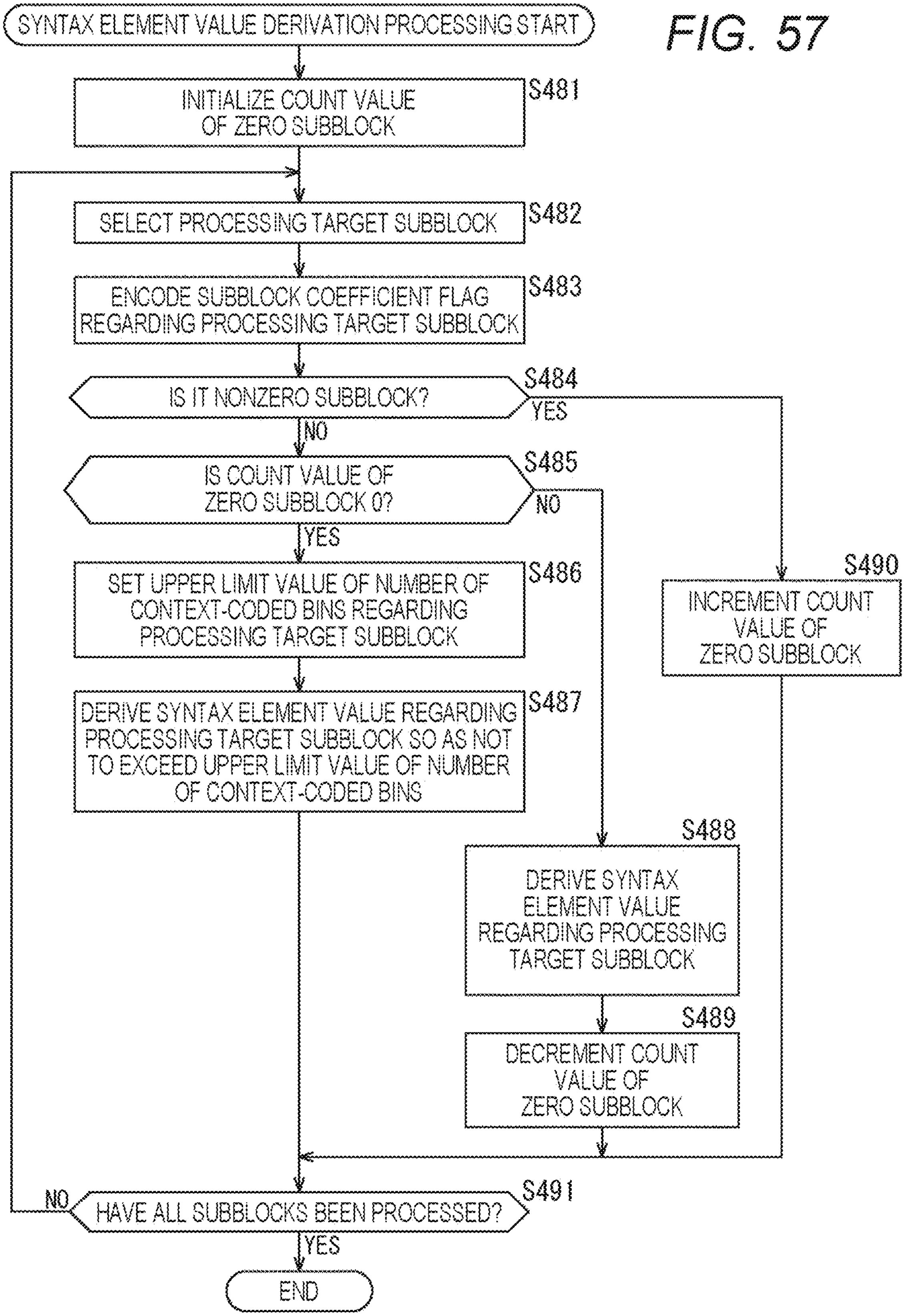
FIG. 57 is a flowchart explaining an example of a flow of syntax element value derivation processing.

An example of the flow of the syntax element value derivation processing in this case will be described with reference to the flowchart of FIG. 57.

When the syntax element value derivation processing is started, the sequencer 101 initializes the count value of the zero subblocks in step S481. For example, the sequencer 101 sets the count value of the zero subblocks to "0".

Next, the processing moves to processing for each subblock. In step S482, the sequencer 101 selects a processing target subblock.

The sequencer 101 encodes the subblock coefficient flag (coded_sub_block_flag) for the processing target subblock in step S483.

In step S484, the sequencer 101 determines whether or not the processing target subblock is a nonzero block on the basis of the value of the subblock coefficient flag. In a case where coded_sub_block_flag=1 and it is determined that it is a nonzero subblock, the processing proceeds to step S485.

In step S485, the sequencer 101 determines whether or not the count value of the zero subblocks is "0". In a case where it is determined that the count value is "0", the processing proceeds to step S486. In this case, the restriction of the number of bins is applied to the processing target subblock.

Therefore, in step S486, the sequencer 101 sets the upper limit value (remBinPass1) of the number of context-coded bins for the processing target subblock. That is, the upper limit value (remBinPass1) of the number of context-coded bins is set on the basis of the restriction of the number of bins for the processing target subblock.

In step S487, the sequencer 101 derives the syntax element value so as not to exceed the upper limit value (remBinPass1) of the number of context-coded bins set for the processing target subblock in step S486. When the processing of step S487 ends, the processing proceeds to step S491.

Furthermore, in a case where it is determined that the count value of the zero subblocks is "1" or more in step S485, the processing proceeds to step S488.

In step S488, the sequencer 101 derives the syntax element value for the processing target subblock. In this case, it is possible to add the number of extra context-coded bins from the zero subblock, and the restriction of the number of bins is not applied to the processing target subblock. That is, the syntax element value is derived without the upper limit value (remBinPass1) of the number of context-coded bins being set.

In step S489, the sequencer 101 decrements the count value of the zero subblocks (e.g., subtracts "1" from the count value). When the processing of step S489 ends, the processing proceeds to step S491.

Furthermore, in a case where it is determined in step S484 that the processing target block is a zero subblock, the processing proceeds to step S490. In this case, the derivation of the syntax element value is omitted. In step S490, the sequencer 101 increments the count value of the zero subblock (e.g., adds "1" to the count value). When the processing of step S490 ends, the processing proceeds to step S491.

In step S491, the sequencer 101 determines whether or not all the subblocks have been processed. In a case where it is determined that there is an unprocessed subblock in the processing target block, the processing returns to step S482, and the processing of step S482 and subsequent steps is repeated. That is, each processing of step S482 to step S491 is executed for each subblock in the processing target block. Then, in step S491, in a case where it is determined that all the subblocks in the processing target block have been processed, the syntax element value derivation processing ends, and the processing returns to FIG. 6.

As described above, by using the count value of the zero subblocks, it is possible to omit the setting of the upper limit value (remBinPass1) of the number of context-coded bins for the same number of nonzero subblocks as the zero subblocks. That is, by executing the processing of each step as described above, the sequencer 101 can make the restriction on the number of context-coded bins of each subblock variable. Therefore, a reduction in encoding efficiency can be suppressed. In other words, the reduction in image quality of the decoded image can be suppressed.

<Flow of the Coefficient Data Derivation Processing>

In this case as well, the configuration of the decode apparatus 200 is similar to the case of the first embodiment (FIG. 13). Furthermore, the configuration of the CABAC 201 is similar to the case of the first embodiment (FIG. 14). Moreover, the flow of the decoding processing executed by the decode apparatus 200 is similar to the case of the first embodiment (FIG. 15). Furthermore, the flow of the CABAC processing is similar to the case of the first embodiment (FIG. 16).

An example of the flow of the coefficient data derivation processing in this case will be described with reference to the flowchart of FIG. 58. This coefficient data derivation processing is executed in a flow substantially similar to that of the syntax element value derivation processing (FIG. 57). That is, the processing of each step of the coefficient data derivation processing (steps S521 to S531 of FIG. 58) is executed in a manner substantially similar to that of each processing of the syntax element value derivation processing (steps S481 to S491 of FIG. 57).

Figure 58:
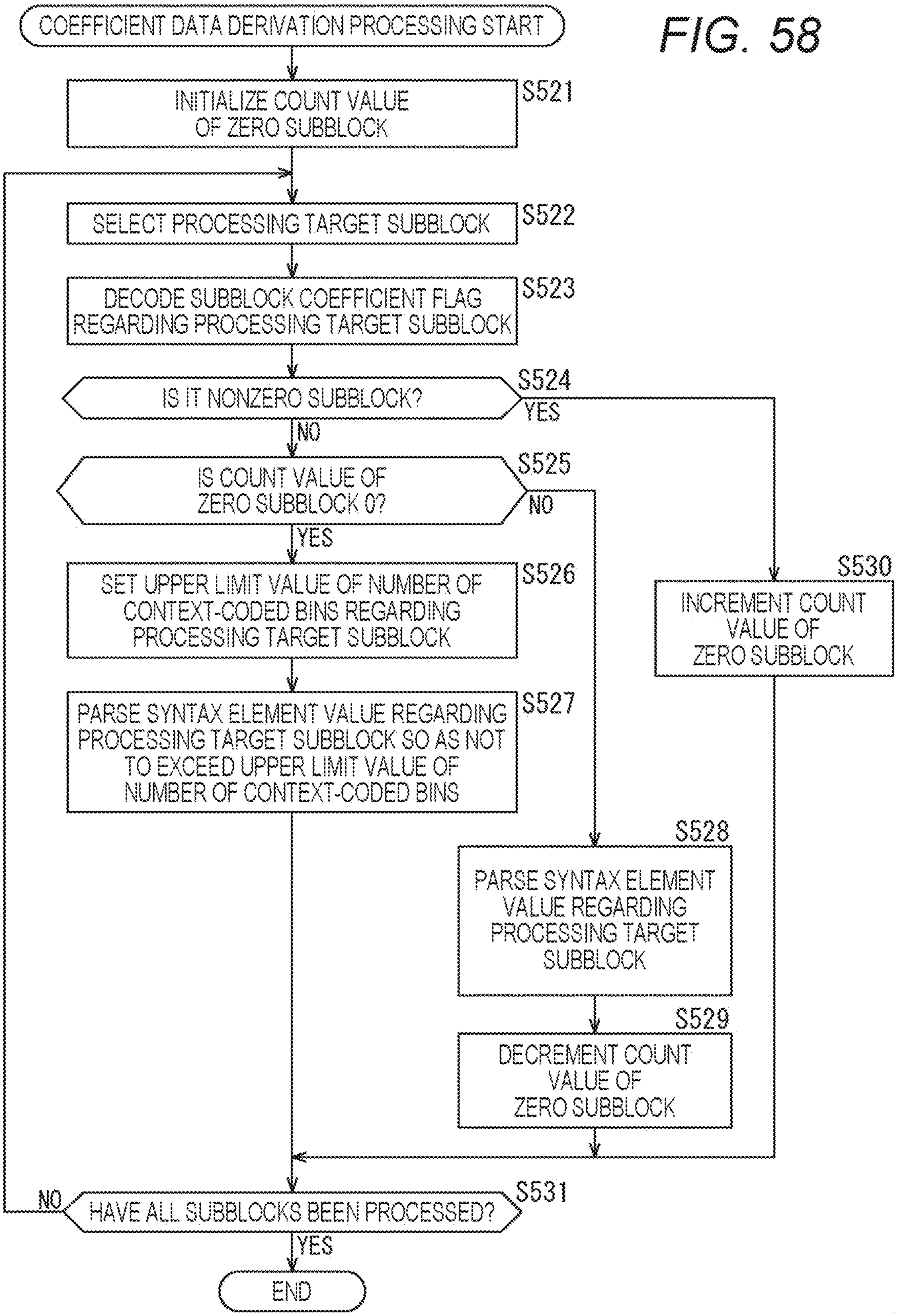
FIG. 58 is a flowchart explaining an example of a flow of coefficient data derivation processing.

However, the parser 202 decodes the subblock coefficient flag (coded_sub_block_flag) in the processing target subblock in step S523 of FIG. 58. When the processing of step S523 ends, the processing proceeds to step S524.

Furthermore, in step S527 of FIG. 58, the parser 202 derives the coefficient data by parsing the syntax element value so as not to exceed the upper limit value (remBinPass1) of the number of context-coded bins set for the processing target subblock in step S526. When the processing of step S527 ends, the processing proceeds to step S531.

Moreover, in step S528 of FIG. 58, the parser 202 derives the coefficient data by parsing the syntax element value for the processing target subblock. When the processing of step S528 ends, the processing proceeds to step S529.

As described above, by using the count value of the zero subblocks, it is possible to omit the setting of the upper limit value (remBinPass1) of the number of context-coded bins for the same number of nonzero subblocks as the zero subblocks. That is, by executing the processing of each step as described above, the parser 202 can make the restriction on the number of context-coded bins of each subblock variable. Therefore, a reduction in encoding efficiency can be suppressed. In other words, the reduction in image quality of the decoded image can be suppressed.

10. NINTH EMBODIMENT

<Image Encode Apparatus>

In the above, an example of applying the present technology to the encode apparatus 100 and the decode apparatus 200 has been described, but the present technology can be applied not only to the above but to any apparatuses, devices, systems, or the like. For example, the present technology can be applied to an image encode apparatus that encodes image data.

Figure 59:
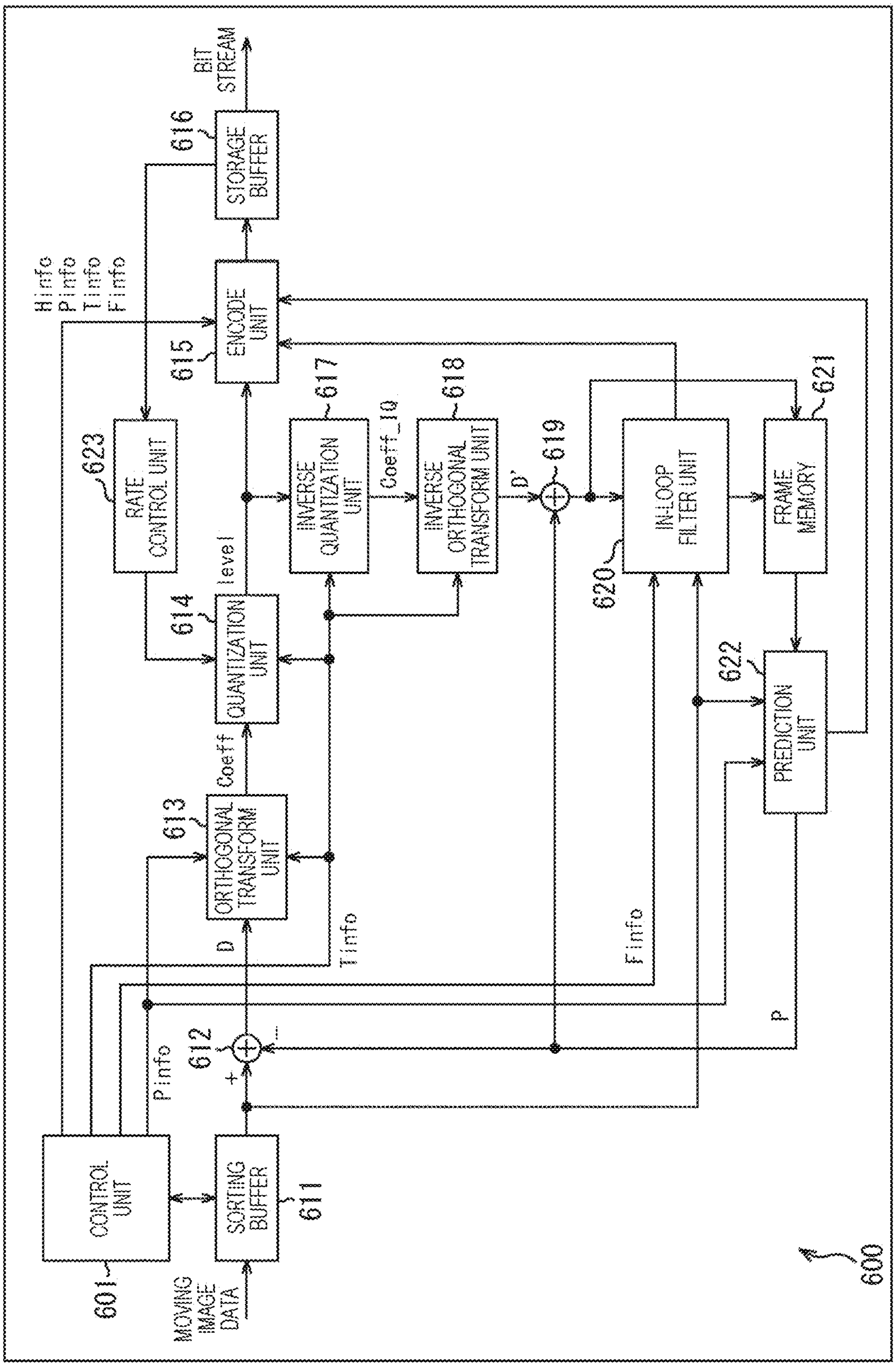
FIG. 59 is a block diagram showing a main configuration example of an image encode apparatus.

FIG. 59 is a block diagram showing an example of the configuration of an image encode apparatus, which is an aspect of an image processing apparatus to which the present technology is applied. An image encode apparatus 600 shown in FIG. 59 is an apparatus that encodes image data of a moving image. For example, the image encode apparatus 600 encodes the image data of a moving image by the encoding method described in any of Non-Patent Documents 1 to 12.

Note that FIG. 59 shows the main things such as the processing unit (block) and the data flow, and not all of them are shown in FIG. 59. That is, in the image encode apparatus 600, there may be a processing unit that is not shown as a block in FIG. 59, or there may be a processing or data flow that is not shown as an arrow or the like in FIG. 59.

As shown in FIG. 59, the image encode apparatus 600 includes a control unit 601, a sorting buffer 611, an arithmetic unit 612, an orthogonal transform unit 613, a quantization unit 614, an encode unit 615, a storage buffer 616, and an inverse quantization unit 617, an inverse orthogonal transform unit 618, an arithmetic unit 619, an in-loop filter unit 620, a frame memory 621, a prediction unit 622, and a rate control unit 623.

<Control Unit>

The control unit 601 divides moving image data held by the sorting buffer 611 into blocks (CU, PU, transform block, and the like) in units of processing on the basis of the block size in external or predetermined units of processing. Furthermore, the control unit 601 determines encoding parameters (header information Hinfo, prediction mode information Pinfo, transform information Tinfo, filter information Finfo, and the like) supplied to each block on the basis of, for example, rate-distortion optimization (RDO).

Details of these encoding parameters will be described later. When the control unit 601 determines the encoding parameters described above, the control unit 601 supplies them to each block. Specifically, it is as described below.

The header information Hinfo is supplied to each block.

The prediction mode information Pinfo is supplied to the encode unit 615 and the prediction unit 622.

The transform information Tinfo is supplied to the encode unit 615, the orthogonal transform unit 613, the quantization unit 614, the inverse quantization unit 617, and the inverse orthogonal transform unit 618.

The filter information Finfo is supplied to the in-loop filter unit 620.

<Sorting Buffer>

Each field (input image) of moving image data is input to the image encode apparatus 600 in the reproduction order (display order). The sorting buffer 611 acquires and holds (stores) each input image in the reproduction order (display order). The sorting buffer 611 sorts the input images in the encoding order (decoding order) or divides the input images into blocks in units of processing on the basis of the control of the control unit 601. The sorting buffer 611 supplies each processed input image to the arithmetic unit 612. Furthermore, the sorting buffer 611 also supplies each input image (original image) to the prediction unit 622 and the in-loop filter unit 620.

<Arithmetic Unit>

The arithmetic unit 612 takes an image I corresponding to the block in units of processing and a prediction image P supplied from the prediction unit 622 as inputs, subtracts the prediction image P from the image I as shown in the formula described below, derives a prediction residual D and supplies it to the orthogonal transform unit 613.

$$D = I - P$$

<Orthogonal Transform Unit>

The orthogonal transform unit 613 takes the prediction residual D supplied from the arithmetic unit 612 and the transform information Tinfo supplied from the control unit 601 as inputs, and performs orthogonal transform with respect to the prediction residual D on the basis of the transform information Tinfo to derive transform coefficient Coeff. Note that the orthogonal transform unit 613 can perform adaptive orthogonal transform (ANT) for adaptively selecting the type of orthogonal transform (transform coefficient). The orthogonal transform unit 613 supplies the obtained transform coefficient Coeff to the quantization unit 614.

<Quantization Unit>

The quantization unit 614 takes the transform coefficient Coeff supplied from the orthogonal transform unit 613 and the transform information Tinfo supplied from the control unit 601 as inputs, and scales (quantizes) the transform coefficient Coeff on the basis of the transform information Tinfo. Note that the rate of the quantization is controlled by the rate control unit 623. The quantization unit 614 supplies the transform coefficient after quantization obtained by such quantization, i.e., the quantization transform coefficient level level, to the encode unit 615 and the inverse quantization unit 617.

<Encode Unit>

The encode unit 615 takes the quantization transform coefficient level level supplied from the quantization unit 614, the various encoding parameters (header information Hinfo, prediction mode information Pinfo, transform information Tinfo, filter information Finfo, and the like) supplied from the control unit 601, information regarding a filter such as a filter coefficient supplied from the in-loop filter unit 620, and information regarding an optimum prediction mode supplied from the prediction unit 622 as inputs. The encode unit 615 performs variable length coding (for example, arithmetic encoding) of the quantization transform coefficient level level to generate a bit string (coded data).

Furthermore, the encode unit 615 derives residual information Rinfo from the quantization transform coefficient level level, encodes the residual information Rinfo, and generates a bit string.

Moreover, the encode unit 615 includes the information regarding the filter supplied from the in-loop filter unit 620 in the filter information Finfo, and includes the information regarding the optimum prediction mode supplied from the prediction unit 622 in the prediction mode information Pinfo. Then, the encode unit 615 encodes the aforementioned various encoding parameters (header information Hinfo, prediction mode information Pinfo, transform information Tinfo, filter information Finfo, and the like) to generate a bit string.

Furthermore, the encode unit 615 multiplexes the bit strings of the various information generated as described above to generate the coded data. The encode unit 615 supplies the coded data to the storage buffer 616.

<Storage Buffer>

The storage buffer 616 temporarily holds the coded data obtained by the encode unit 615. The storage buffer 616 outputs the held coded data as, for example, a bit stream or the like to the outside of the image encode apparatus 600 at a predetermined timing. For example, this coded data is transmitted to the decoding side via an arbitrary recording medium, an arbitrary transmission medium, an arbitrary information processing apparatus, or the like. That is, the storage buffer 616 is also a transmission unit that transmits the coded data (bit stream).

<Inverse Quantization Unit>

The inverse quantization unit 617 performs processing related to inverse quantization. For example, the inverse quantization unit 617 takes the quantization transform coefficient level level supplied from the quantization unit 614 and the transform information Tinfo supplied from the control unit 601 as inputs, and scales (inversely quantizes) the value of the quantization transform coefficient level level on the basis of the transform information Tinfo. Note that this inverse quantization is inverse processing of the quantization performed in the quantization unit 614. The inverse quantization unit 617 supplies transform coefficient Coeff_IQ obtained by such inverse quantization to the inverse orthogonal transform unit 618.

<Inverse Orthogonal Transform Unit>

The inverse orthogonal transform unit 618 performs processing related to the inverse orthogonal transform. For example, the inverse orthogonal transform unit 618 takes the transform coefficient Coeff_IQ supplied from the inverse quantization unit 617 and the transform information Tinfo supplied from the control unit 601 as inputs, and performs inverse orthogonal transform with respect to the transform coefficient Coeff_IQ on the basis of the transform information Tinfo to derive prediction residual D'. Note that this inverse orthogonal transform is inverse processing of the orthogonal transform performed in the orthogonal transform unit 613. That is, the inverse orthogonal transform unit 618 can perform adaptive inverse orthogonal transform (AMT) for adaptively selecting the type of inverse orthogonal transform (transform coefficient).

The inverse orthogonal transform unit 618 supplies the prediction residual D' obtained by such inverse orthogonal transform to the arithmetic unit 619. Note that since the inverse orthogonal transform unit 618 is similar to an inverse orthogonal transform unit (described later) on the decoding side, the description (described later) given on the decoding side can be applied to the inverse orthogonal transform unit 618.

<Arithmetic Unit>

The arithmetic unit 619 takes the prediction residual D' supplied from the inverse orthogonal transform unit 618 and the prediction image P supplied from the prediction unit 622 as inputs. The arithmetic unit 619 adds the prediction residual D' and the prediction image P corresponding to the prediction residual D' to derive a locally decoded image Rlocal. The arithmetic unit 619 supplies the derived locally decoded image Rlocal to the in-loop filter unit 620 and the frame memory 621.

<In-Loop Filter Unit>

The in-loop filter unit 620 performs processing related to in-loop filter processing. For example, the in-loop filter unit 620 takes the locally decoded image Rlocal supplied from the arithmetic unit 619, the filter information Finfo supplied from the control unit 601, and the input image (original image) supplied from the sorting buffer 611 as inputs. Note that the information input to the in-loop filter unit 620 is arbitrary, and information other than such information may be input. For example, the prediction mode, motion information, code amount target value, quantization parameters QP, picture type, the information of blocks (CU, CTU, and the like) and the like may be input to the in-loop filter unit 620 as necessary.

The in-loop filter unit 620 appropriately performs filter processing with respect to the locally decoded image Rlocal on the basis of the filter information Finfo. The in-loop filter unit 620 also uses the input image (original image) and other input information for the filter processing as necessary.

For example, the in-loop filter unit 620 applies four in-loop filters: a bilateral filter, a deblocking filter (DBF), an adaptive offset filter (sample adaptive offset (SAO)), and an adaptive loop filter (ALF) in this order as described in Non-Patent Document 11. Note that which filter to apply and in what order to apply are arbitrary and can be appropriately selected.

Of course, the filter processing performed by the in-loop filter unit 620 is arbitrary and is not limited to the above example. For example, the in-loop filter unit 620 may apply a Wiener filter or the like.

The in-loop filter unit 620 supplies the locally decoded image Rlocal that has been subjected to the filter processing to the frame memory 621. Note that in a case where the information regarding the filter such as a filter coefficient to the decoding side, the in-loop filter unit 620 supplies the information regarding the filter to the encode unit 615.

<Frame Memory>

The frame memory 621 performs processing related to storage of data related to images. For example, the frame memory 621 takes the locally decoded image Rlocal supplied from the arithmetic unit 619 or the locally decoded image Rlocal, which has been subjected to the filter processing, supplied from the in-loop filter unit 620 as an input, and holds (stores) it. Furthermore, the frame memory 621 reconstructs a decoded image R for each picture unit using the locally decoded image Rlocal and holds it (stores it in the buffer in the frame memory 621). The frame memory 621 supplies the decoded image R (or a part thereof) to the prediction unit 622 in response to a request of the prediction unit 622.

<Prediction Unit>

The prediction unit 622 performs processing related to the generation of a prediction image. For example, the prediction unit 622 takes the prediction mode information Pinfo supplied from the control unit 601, the input image (original image) supplied from the sorting buffer 611, and the decoded image R (or a part thereof) read from the frame memory 621 as inputs. The prediction unit 622 performs prediction processing such as inter-prediction and intra-prediction using the prediction mode information Pinfo or the input image (original image), makes a prediction by referring to the decoded image R as a reference image, performs motion compensation processing on the basis of the prediction result, and generates the prediction image P. The prediction unit 622 supplies the generated prediction image P to the arithmetic unit 612 and the arithmetic unit 619. Furthermore, the prediction unit 622 supplies information regarding the prediction mode selected by the above processing, i.e., the optimum prediction mode, to the encode unit 615 as necessary.

<Rate Control Unit>

The rate control unit 623 performs processing related to rate control. For example, the rate control unit 623 controls the rate of the quantization operation of the quantization unit 614 on the basis of the code amount of the coded data stored in the storage buffer 616 so that overflow or underflow does not occur.

Note that these processing units (control unit 601 and sorting buffer 611 to rate control unit 623) have an arbitrary configuration. For example, each processing unit may include a logic circuit that realizes the above-mentioned processing. Furthermore, each processing unit may include, for example, a CPU, ROM, RAM, and the like, and execute a program using them to realize the above-mentioned processing. Of course, each processing unit may have both configurations, and a part of the above-mentioned processing may be realized by the logic circuit, and the rest may be realized by executing the program. The configurations of the respective processing units may be independent of each other. For example, some processing units may realize a part of the above-mentioned processing by the logic circuit, and some other processing units may execute the program to realize the above-mentioned processing, and yet other processing units may realize the above-mentioned processing by both the logic circuit and execution of the program.

In the image encode apparatus 600 having the above configuration, the present technology is applied to the encode unit 615. That is, the encode unit 615 has a configuration similar to that of the encode apparatus 100 shown in FIG. 4, and performs similar processing. That is, the encode unit 615 performs one of the above-mentioned methods #1 to #8. By doing so, the image encode apparatus 600 can obtain the effects similar to those described above in any one of the first embodiment to the eighth embodiment. Therefore, the image encode apparatus 600 can suppress the reduction in encoding efficiency (improve the encoding efficiency). In other words, the image encode apparatus 600 can suppress the reduction in image quality of the decoded image.

<Flow of Image Encoding Processing>

Figure 60:
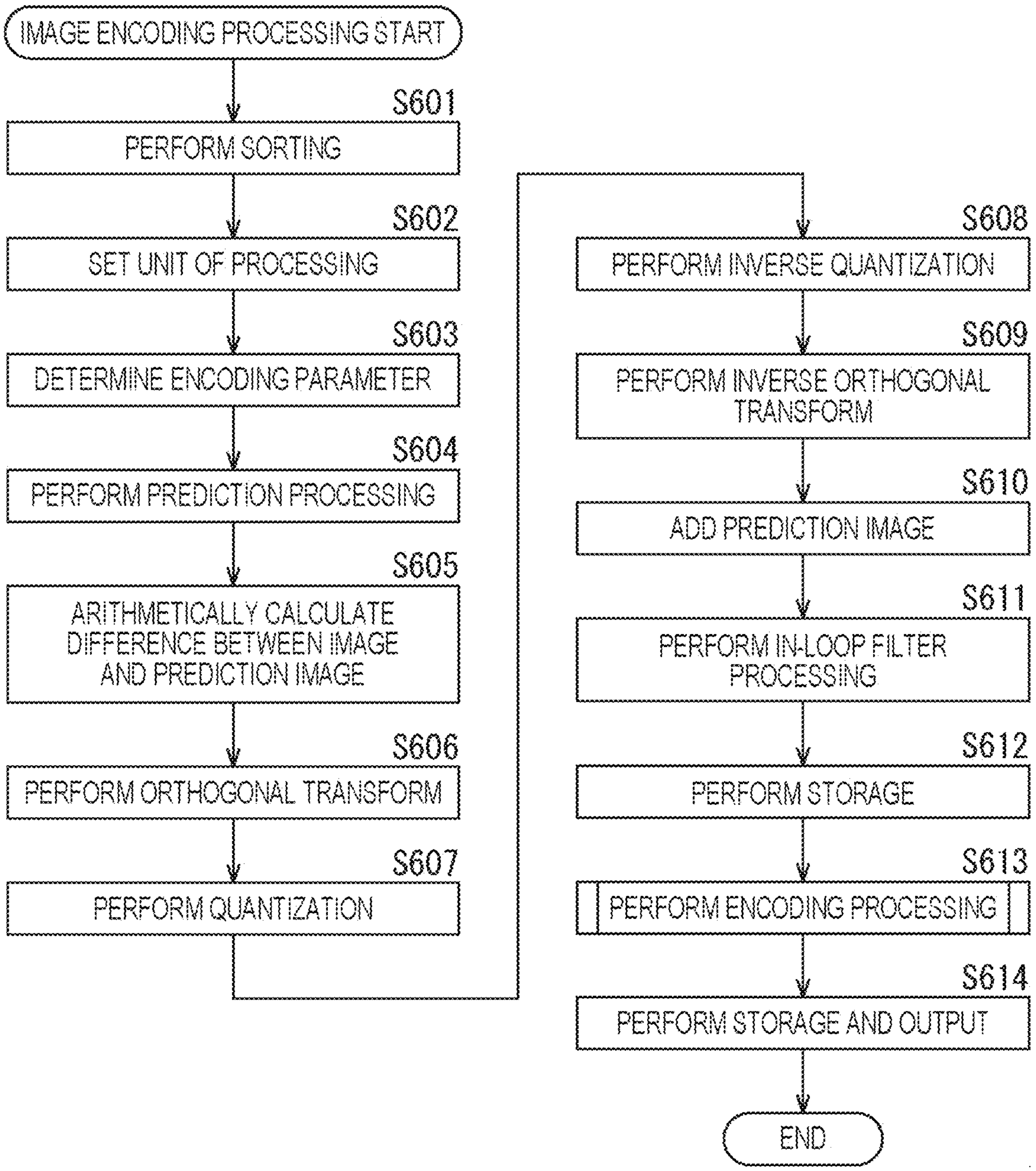
FIG. 60 is a flowchart showing an example of a flow of image encoding processing.

Next, an example of the flow of image encoding processing executed by the image encode apparatus 600 having the above configuration will be described with reference to the flowchart of FIG. 60.

When the image encoding processing is started, in step S601, the sorting buffer 611 is controlled by the control unit 601 to sort the frame order of the input moving image data from the display order to the encoding order.

In step S602, the control unit 601 sets the unit of processing (performs block division) for the input image held by the sorting buffer 611.

In step S603, the control unit 601 determines (sets) the encoding parameters for the input image held by the sorting buffer 611.

In step S604, the prediction unit 622 performs prediction processing and generates a prediction image or the like of the optimum prediction mode. For example, in this prediction processing, the prediction unit 622 performs intra-prediction to generate a prediction image or the like of the optimum intra-prediction mode, performs inter-prediction to generate a prediction image or the like of the optimum inter-prediction mode, and selects the optimum prediction mode from among them on the basis of a cost function value and the like.

In step S605, the arithmetic unit 612 arithmetically calculates the difference between the input image and the prediction image of the optimum mode selected by the prediction processing in step S604. That is, the arithmetic unit 612 generates the prediction residual D between the input image and the prediction image. The amount of data of the prediction residual D obtained in this way is smaller than that of the original image data. Therefore, the amount of data can be compressed as compared with the case where the image is encoded as it is.

In step S606, the orthogonal transform unit 613 performs orthogonal transform processing on the prediction residual D generated by the processing of step S605, and derives the transform coefficient Coeff.

In step S607, the quantization unit 614 quantizes the transform coefficient Coeff obtained by the processing of step S606, for example, by using quantization parameters calculated by the control unit 601, and derives the quantization transform coefficient level level.

In step S608, the inverse quantization unit 617 inversely quantizes the quantization transform coefficient level level generated by the processing of step S607 with the characteristics corresponding to the characteristics of the quantization of step S607, and derives the transform coefficient Coeff_IQ.

In step S609, the inverse orthogonal transform unit 618 performs inverse orthogonal transform of the transform coefficient Coeff_IQ obtained by the processing of step S608 using a method corresponding to the orthogonal transform processing of step S606, and derives the prediction residual D'. Note that since the inverse orthogonal transform processing is similar to inverse orthogonal transform processing (described later) performed on the decoding side, the description (described later) given on the decoding side can be applied to the inverse orthogonal transform processing of step S609.

In step S610, the arithmetic unit 619 adds the prediction image obtained by the prediction processing of step S604 to the prediction residual D' derived by the processing of step S609 to generate a locally decoded decoded image.

In step S611, the in-loop filter unit 620 performs the in-loop filter processing on the locally decoded decoded image derived by the processing of step S610.

In step S612, the frame memory 621 stores the locally decoded decoded image derived by the processing of step S610 or the locally decoded decoded image subjected to the filter processing in step S611.

In step S613, the encode unit 615 encodes the quantization transform coefficient level level obtained by the processing of step S607. For example, the encode unit 615 encodes the quantization transform coefficient level level, which is information regarding an image, by arithmetic encoding or the like to generate the coded data. Furthermore, at this time, the encode unit 615 encodes the various encoding parameters (header information Hinfo, prediction mode information Pinfo, transform information Tinfo). Moreover, the encode unit 615 derives the residual information RInfo from the quantization transform coefficient level level, and encodes the residual information RInfo.

In step S614, the storage buffer 616 stores the resulting coded data and outputs it, for example, as a bit stream to the outside of the image encode apparatus 600. This bit stream is transmitted to the decoding side via, for example, a transmission path or a recording medium. Furthermore, the rate control unit 623 performs the rate control as necessary.

When the processing of step S614 ends, the image encoding processing ends.

In the image encoding processing of the above flow, the present technology is applied to the encoding processing of step S613. That is, in this step S613, the encoding processing of the flow similar to FIG. 6 is performed. That is, the encode unit 615 performs the encoding processing adopting one of the above-mentioned methods #1 to #8. By doing so, the image encode apparatus 600 can obtain the effects similar to those described above in any one of the first embodiment to the eighth embodiment. Therefore, the image encode apparatus 600 can suppress the reduction in encoding efficiency (improve the encoding efficiency). In other words, the image encode apparatus 600 can suppress the reduction in image quality of the decoded image.

<Image Decode Apparatus>

Figure 61:
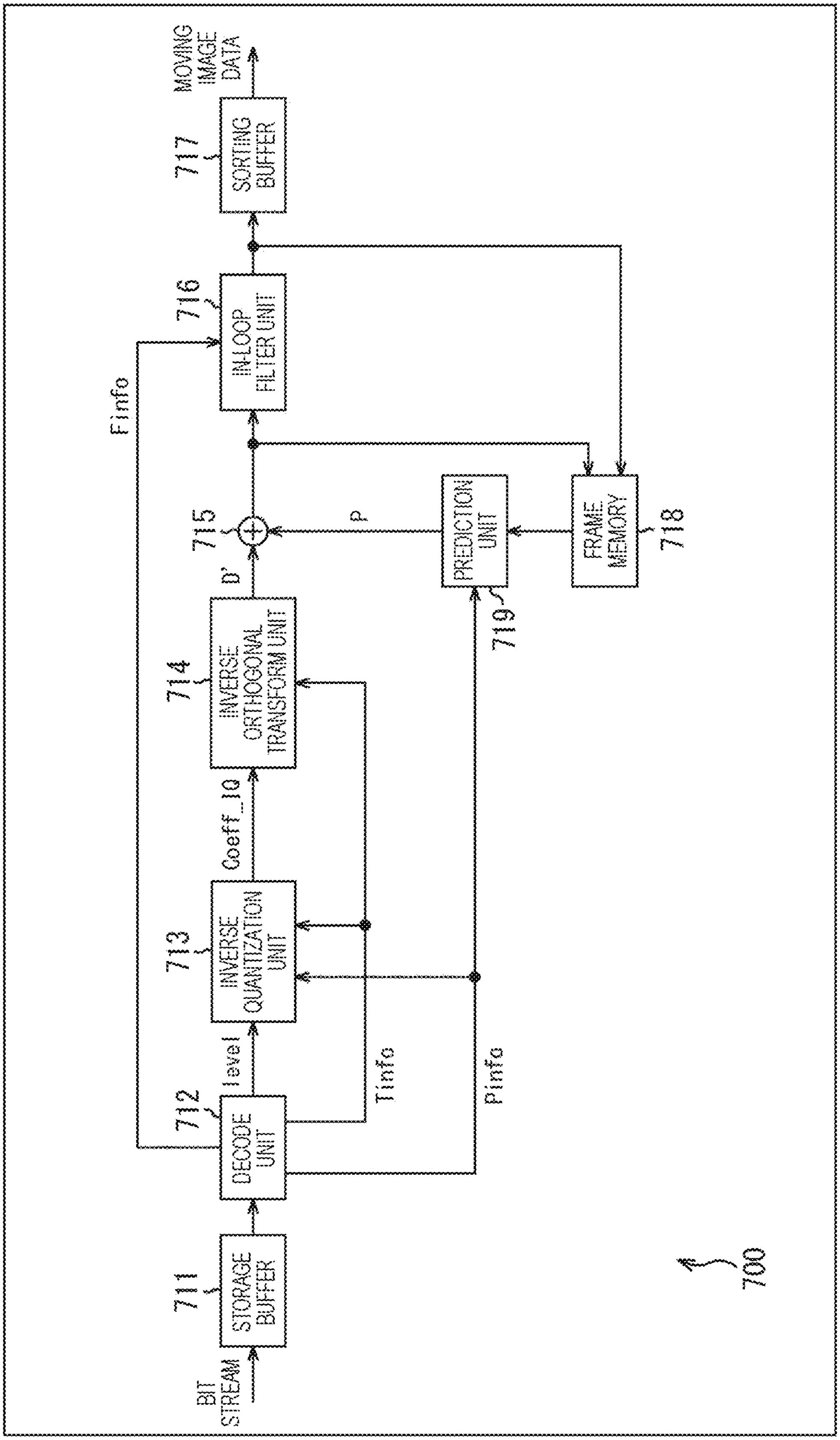
FIG. 61 is a block diagram showing a main configuration example of an image decode apparatus.

Furthermore, for example, the present technology can be applied to an image decode apparatus that decodes the coded data of the image data. FIG. 61 is a block diagram showing an example of the configuration of an image decode apparatus, which is an aspect of an image processing apparatus to which the present technology is applied. An image decode apparatus 700 shown in FIG. 61 is an apparatus that decodes the coded data of a moving image. For example, the image decode apparatus 700 decodes the coded data using the decoding method described in any of Non-Patent Documents 1 to 12. For example, the image decode apparatus 700 decodes the coded data (bit stream) generated by the image encode apparatus 600 described above.

Note that FIG. 61 shows the main things such as the processing unit and the data flow, and not all of them are shown in FIG. 61. That is, in the image decode apparatus 700, there may be a processing unit that is not shown as a block in FIG. 61, or there may be a processing or data flow that is not shown as an arrow or the like in FIG. 61.

In FIG. 61, the image decode apparatus 700 includes a storage buffer 711, a decode unit 712, an inverse quantization unit 713, an inverse orthogonal transform unit 714, an arithmetic unit 715, an in-loop filter unit 716, a sorting buffer 717, a frame memory 718, and a prediction unit 719. Note that the prediction unit 719 includes an intra-prediction unit and an inter-prediction unit, which are not shown. The image decode apparatus 700 is an apparatus for generating moving image data by decoding the coded data (bit stream).

<Storage Buffer>

The storage buffer 711 acquires and holds (stores) the bit stream input to the image decode apparatus 700. The storage buffer 711 supplies the stored bit stream to the decode unit 712 at a predetermined timing or, for example, in a case where a predetermined condition is satisfied.

<Decode Unit>

The decode unit 712 performs processing related to image decoding. For example, the decode unit 712 takes the bit stream supplied from the storage buffer 711 as an input, performs variable length decoding on the syntax value of each syntax element from the bit string according to the definition of a syntax table, and derives parameters.

The syntax element and the parameters derived from the syntax value of the syntax element include, for example, information such as the header information Hinfo, the prediction mode information Pinfo, the transform information Tinfo, the residual information Rinfo, and the filter information Finfo. That is, the decode unit 712 parses (analyzes and acquires) these pieces of information from the bit stream. These pieces of information will be described below.

<Header Information Hinfo>

The header information Hinfo includes, for example, header information such as video parameter set (VPS)/sequence parameter set (SPS)/picture parameter set (PPS)/slice header (SH). The header information Hinfo includes, for example, information that specifies image size (width PicWidth, height PicHeight), bit depth (brightness bitDepthY, color difference bitDepthC), color difference array type ChromaArrayType, maximum value MaxCUSize/minimum value MinCUSize of CU size, maximum depth MaxQTDepth/minimum depth MinQTDepth of quadtree division (also referred to as Quad-tree division), maximum depth MaxBTDepth/minimum depth MinBTDepth of binarytree division (Binary-tree division), maximum value MaxTSSize of transform skip block (also referred to as maximum transform skip block size), on/off flag (also referred to as enabled flag) of each encoding tool.

For example, the on/off flag of the encoding tool included in the header information Hinfo include on/off flags related to the transform and quantization processing shown below. Note that the on/off flag of the encoding tool can also be interpreted as a flag indicating whether or not the syntax related to the encoding tool exists in the coded data. Furthermore, in a case where the value of the on/off flag is 1 (true), it indicates that the encoding tool can be used, and in a case where the value of the on/off flag is 0 (false), it indicates that the encoding tool cannot be used. Note that the interpretation of the flag values may be reversed.

Cross-component prediction enabled flag (ccp_enabled_flag): flag information indicating whether or not cross-component prediction (CCP), also referred to as CC prediction) can be used. For example, in a case where this flag information is "1" (true), it indicates that it can be used, and in a case where it is "0" (false), it indicates that it cannot be used.

Note that this CCP is also referred to as cross-component linear prediction (CCLM or CCLMP).

<Prediction Mode Information Pinfo>

The prediction mode information Pinfo includes, for example, information such as size information PBSize (prediction block size) of processing target PB (prediction block), intra-prediction mode information IPinfo, motion prediction information MVinfo, and the like.

The intra-prediction mode information IPinfo includes, for example, prev intra luma pred flag, mpm_idx, rem intra pred mode in JCTVC-W1005, 7.3.8.5 Coding Unit syntax, and brightness intra-prediction mode IntraPredModeY derived from the syntaxes.

Furthermore, the intra-prediction mode information IPinfo includes, for example, cross-component prediction flag (ccp_flag (cclmp_flag)), multi-class linear prediction mode flag (mclm_flag), color difference sample location type identifier (chroma_sample_loc_type_idx), color difference MPM identifier (chroma_mpm_idx), and, brightness intra-prediction mode (IntraPredModeC) derived from these syntaxes.

The cross-component prediction flag (ccp_flag (cclmp_flag)) is flag information indicating whether or not to apply the cross-component linear prediction. For example, when ccp_flag==1, it indicates that the cross-component prediction is applied, and when ccp_flag==0, it indicates that the cross-component prediction is not applied.

The multi-class linear prediction mode flag (mclm_flag) is information regarding the mode of linear prediction (linear prediction mode information). More specifically, the multi-class linear prediction mode flag (mclm_flag) is flag information indicating whether or not to set the multi-class linear prediction mode. For example, in the case of "0", it indicates 1-class mode (single class mode) (for example, CCLMP), and in the case of "1", it indicates 2-class mode (multi-class mode) (for example, MCLMP).

The color difference sample location type identifier (chroma_sample_loc_type_idx) is an identifier that identifies the type of pixel position of the color difference component (also referred to as the color difference sample position type). For example, in a case where the color difference array type (ChromaArrayType), which is information regarding a color format, indicates 420 format, the color difference sample location type identifier is allocated as shown in the formulae below.

chroma_sample_loc_type_idx==0:Type2 chroma_sample_loc_type_idx==1:Type3 chroma_sample_loc_type_idx==2:Type0 chroma_sample_loc_type_idx==3:Type1

Note that the color difference sample location type identifier (chroma_sample_loc_type_idx) is (stored in) transmitted as information (chroma_sample_loc_info( )) regarding the pixel position of the color difference component.

The color difference MPM identifier (chroma_mpm_idx) is an identifier indicating which prediction mode candidate in a color difference intra-prediction mode candidate list (intraPredModeCandListC) is designated as the color difference intra-prediction mode.

The motion prediction information MVinfo includes, for example, information such as merge idx, merge flag, inter_pred_idc, ref_idx_LX, mvp_lX_flag, X={0,1}, mvd (see, for example, JCTVC-W1005, 7.3.8.6 Prediction Unit Syntax).

Of course, the information included in the prediction mode information Pinfo is arbitrary, and information other than these pieces of information may be included.

<Transform Information Tinfo>

The transform information Tinfo includes, for example, the information described below. Of course, the information included in the transform information Tinfo is arbitrary, and information other than these pieces of information may be included.

Width size TBWSize and height TBHSize of a processing target transform block (or may be logarithm values log 2TBWSize and log 2TBHSize of respective TBWSize and TBHSize to base 2).

Transform skip flag (ts_flag): A flag indicating whether or not to skip (inverse) primary transform and (inverse) secondary transform.

Scan identifier (scanIdx)

Quantization parameter (qp)

Quantization matrix (scaling matrix (e.g., JCTVC-W1005, 7.3.4 Scaling list data syntax))

<Residual Information Rinfo>

The residual information Rinfo (see, for example, 7.3.8.11 Residual Coding syntax of JCTVC-W1005) includes, for example, the syntaxes described below.

cbf(coded_block_flag): Residual data presence/absence flag last_sig_coeff_x_pos: Last nonzero coefficient X coordinate last_sig_coeff_y_pos: Last nonzero coefficient Y coordinate coded_sub_block_flag: Subblock nonzero coefficient presence/absence flag sig_coeff_flag: Nonzero coefficient presence/absence flag gr1_flag: Flag indicating whether the level of nonzero coefficient is greater than 1 (also referred to as GR1 flag)

gr2_flag: Flag indicating whether the level of nonzero coefficient is greater than 2 (also referred to as GR2 flag)

sign_flag: Code indicating whether the nonzero coefficient is positive or negative (also referred to as sign code)

coeff_abs_level_remaining: Remaining level of nonzero coefficient (also referred to as nonzero coefficient remaining level)

Of course, the information included in the residual information Rinfo is arbitrary, and information other than these pieces of information may be included.

<Filter Information Finfo>

The filter information Finfo includes, for example, control information related to each filter processing described below.

Control information related to deblocking filter (DBF)

Control information related to pixel adaptive offset (SAO)

Control information related to adaptive loop filter (ALF)

Control information related to other linear and nonlinear filters

More specifically, for example, information for specifying a picture to which each filter is applied and an area in the picture, filter On/Off control information in CU units, filter On/Off control information related to slice and tile boundaries, and the like are included. Of course, the information included in the filter information Finfo is arbitrary, and information other than these pieces of information may be included.

Referring back to the description of the decode unit 712, the decode unit 712 derives the quantization transform coefficient level level of each coefficient position in each transform block with reference to the residual information Rinfo. The decode unit 712 supplies the quantization transform coefficient level level to the inverse quantization unit 713.

Furthermore, the decode unit 712 supplies the parsed header information Hinfo, prediction mode information Pinfo, quantization transform coefficient level level, transform information Tinfo, and filter information Finfo to each block. Specifically, it is as described below.

The header information Hinfo is supplied to the inverse quantization unit 713, the inverse orthogonal transform unit 714, the prediction unit 719, and the in-loop filter unit 716.

The prediction mode information Pinfo is supplied to the inverse quantization unit 713 and the prediction unit 719.

The transform information Tinfo is supplied to the inverse quantization unit 713 and the inverse orthogonal transform unit 714.

The filter information Finfo is supplied to the in-loop filter unit 716.

Of course, the above-mentioned example is an example and is not limited to this example. For example, each encoding parameter may be supplied to an arbitrary processing unit. Furthermore, other information may be supplied to an arbitrary processing unit.

<Inverse Quantization Unit>

The inverse quantization unit 713 has at least a configuration necessary for performing processing related to the inverse quantization. For example, the inverse quantization unit 713 takes the transform information Tinfo and the quantization transform coefficient level level supplied from the decode unit 712 as inputs, scales (inversely quantizes) the value of the quantization transform coefficient level level on the basis of the transform information Tinfo, and derives the transform coefficient Coeff_IQ after the inverse quantization.

Note that this inverse quantization is performed as inverse processing of the quantization by the quantization unit 614. Furthermore, this inverse quantization is processing similar to the inverse quantization by the inverse quantization unit 617. That is, the inverse quantization unit 617 performs processing (inverse quantization) similar to that by the inverse quantization unit 713.

The inverse quantization unit 713 supplies the derived transform coefficient Coeff_IQ to the inverse orthogonal transform unit 714.

<Inverse Orthogonal Transform Unit>

The inverse orthogonal transform unit 714 performs processing related to the inverse orthogonal transform. For example, the inverse orthogonal transform unit 714 takes the transform coefficient Coeff_IQ supplied from the inverse quantization unit 713 and the transform information Tinfo supplied from the decode unit 712 as inputs, and performs inverse orthogonal transform processing with respect to the transform coefficient Coeff_IQ on the basis of the transform information Tinfo to derive the prediction residual D'.

Note that this inverse orthogonal transform is performed as inverse processing of the orthogonal transform by the orthogonal transform unit 613. Furthermore, this inverse orthogonal transform is processing similar to the inverse orthogonal transform by the inverse orthogonal transform unit 618. That is, the inverse orthogonal transform unit 618 performs processing (inverse orthogonal transform) similar to that by the inverse orthogonal transform unit 714.

The inverse orthogonal transform unit 714 supplies the derived prediction residual D' to the arithmetic unit 715.

<Arithmetic Unit>

The arithmetic unit 715 performs processing related to addition of information regarding images. For example, the arithmetic unit 715 takes the prediction residual D' supplied from the inverse orthogonal transform unit 714 and the prediction image P supplied from the prediction unit 719 as inputs. As shown in the formula below, the arithmetic unit 715 adds the prediction residual D' and the prediction image P (prediction signal) corresponding to the prediction residual D' to derive the locally decoded image $R_{local}$.

$$R_{local} = D' + P$$

The arithmetic unit 715 supplies the derived locally decoded image $R_{local}$ to the in-loop filter unit 716 and the frame memory 718.

<In-Loop Filter Unit>

The in-loop filter unit 716 performs processing related to in-loop filter processing. For example, the in-loop filter unit 716 takes the locally decoded image $R_{local}$ supplied from the arithmetic unit 715 and the filter information Finfo supplied from the decode unit 712 as inputs. Note that the information input to the in-loop filter unit 716 is arbitrary, and information other than such information may be input.

The in-loop filter unit 716 appropriately performs filter processing with respect to the locally decoded image $R_{local}$ on the basis of the filter information Finfo.

For example, the in-loop filter unit 716 applies four in-loop filters: a bilateral filter, a deblocking filter (DBF), an adaptive offset filter (sample adaptive offset (SAO)), and an adaptive loop filter (ALF) in this order as described in Non-Patent Document 11. Note that which filter to apply and in what order to apply are arbitrary and can be appropriately selected.

The in-loop filter unit 716 performs filter processing corresponding to the filter processing performed by the encoding side (for example, the in-loop filter unit 620 of the image encode apparatus 600). Of course, the filter processing performed by the in-loop filter unit 716 is arbitrary and is not limited to the above example. For example, the in-loop filter unit 716 may apply a Wiener filter or the like.

The in-loop filter unit 716 supplies the locally decoded image $R_{local}$ that has been subjected to the filter processing to the sorting buffer 717 and the frame memory 718.

<Sorting Buffer>

The sorting buffer 717 takes the locally decoded image $R_{local}$ supplied from the in-loop filter unit 716 as an input and holds (stores) it. The sorting buffer 717 reconstructs a decoded image R for each picture unit using the locally decoded image $R_{local}$ and holds it (stores it in the buffer). The sorting buffer 717 sorts the obtained decoded image R from the decoding order to the reproduction order. The sorting buffer 717 outputs a sorted decoded image R group as moving image data to the outside of the image decode apparatus 700.

<Frame Memory>

The frame memory 718 performs processing related to storage of data related to images. For example, the frame memory 718 takes the locally decoded image $R_{local}$ supplied by the arithmetic unit 715 as an input, reconstructs the decoded image R for each picture unit, and stores it in the buffer in the frame memory 718.

Furthermore, the frame memory 718 takes the locally decoded image $R_{local}$ that has been subjected to the in-loop filter processing and supplied from the in-loop filter unit 716 as an input, reconstructs the decoded image R for each picture unit, and stores it in the buffer in the frame memory 718. The frame memory 718 appropriately supplies the stored decoded image R (or a part thereof) to the prediction unit 719 as a reference image.

Note that the frame memory 718 may store the header information Hinfo, the prediction mode information Pinfo, the transform information Tinfo, the filter information Finfo, and the like related to the generation of the decoded image.

<Prediction Unit>

The prediction unit 719 performs processing related to the generation of a prediction image. For example, the prediction unit 719 takes the prediction mode information Pinfo supplied from the decode unit 712 as an input, makes a prediction using a prediction method specified by the prediction mode information Pinfo, and derives the prediction image P. At the time of derivation, the prediction unit 719 uses the decoded image R (or a part thereof) before or after the filter stored in the frame memory 718 specified by the prediction mode information Pinfo as a reference image. The prediction unit 719 supplies the derived prediction image P to the arithmetic unit 715.

Note that these processing units (storage buffer 711 to prediction unit 719) have an arbitrary configuration. For example, each processing unit may include a logic circuit that realizes the above-mentioned processing. Furthermore, each processing unit may include, for example, a CPU, ROM, RAM, and the like, and execute a program using them to realize the above-mentioned processing. Of course, each processing unit may have both configurations, and a part of the above-mentioned processing may be realized by the logic circuit, and the rest may be realized by executing the program. The configurations of the respective processing units may be independent of each other. For example, some processing units may realize a part of the above-mentioned processing by the logic circuit, and some other processing units may execute the program to realize the above-mentioned processing, and yet other processing units may realize the above-mentioned processing by both the logic circuit and execution of the program.

In the image decode apparatus 700 having the above configuration, the present technology is applied to the decode unit 712. That is, the decode unit 712 has a configuration similar to that of the decode apparatus 200 shown in FIG. 13, and performs similar processing. That is, the decode unit 712 performs one of the above-mentioned methods #1 to #8. By doing so, the image decode apparatus 700 can obtain the effects similar to those described above in any one of the first embodiment to the eighth embodiment. Therefore, the image decode apparatus 700 can suppress the reduction in encoding efficiency (improve the encoding efficiency). In other words, the image decode apparatus 700 can suppress the reduction in image quality of the decoded image.

<Flow of Image Decoding Processing>

Figure 62:
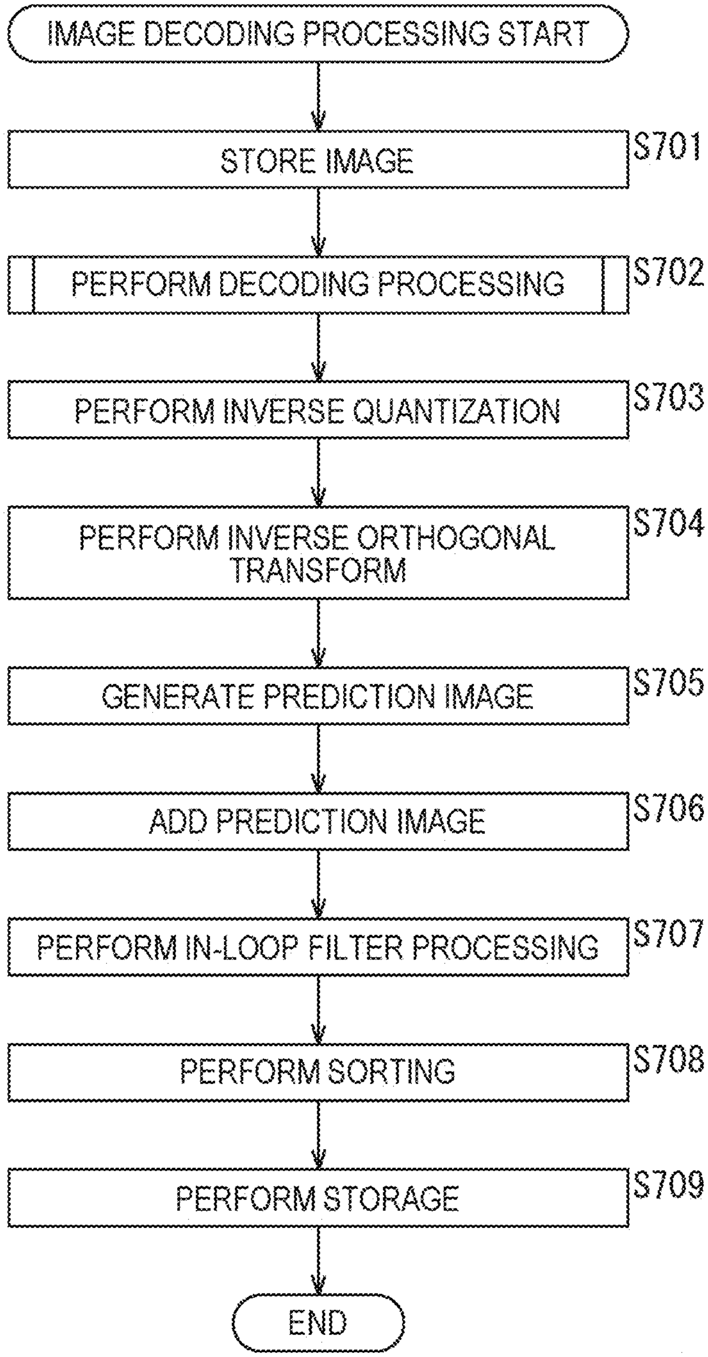
FIG. 62 is a flowchart showing an example of a flow of image decoding processing.

Next, the flow of each processing executed by the image decode apparatus 700 having the above configuration will be described. First, an example of the flow of the image encoding processing will be described with reference to the flowchart of FIG. 62.

When the image decoding processing is started, the storage buffer 711 acquires the coded data (bit stream) supplied from the outside of the image decode apparatus 700 and holds (stores) it in step S701.

In step S702, the decode unit 712 decodes the coded data (bit stream) to obtain the quantization transform coefficient level level. Furthermore, the decode unit 712 parses (analyzes and acquires) various encoding parameters from the coded data (bit stream) by this decoding.

In step S703, the inverse quantization unit 713 performs the inverse quantization, which is inverse processing of the quantization performed on the encoding side, with respect to the quantization transform coefficient level level obtained by the processing of step S702 to obtain the transform coefficient Coeff_IQ.

In step S704, the inverse orthogonal transform unit 714 performs the inverse orthogonal transform processing, which is the inverse processing of the orthogonal transform processing performed on the encoding side, with respect to the transform coefficient Coeff_IQ obtained in step S703, and obtains the prediction residual D'.

In step S705, the prediction unit 719 executes the prediction processing using a prediction method specified on the encoding side on the basis of the information parsed in step S702, refers to the reference image stored in the frame memory 718, and the like, and generates the prediction image P.

In step S706, the arithmetic unit 715 adds the prediction residual D' obtained in step S704 and the prediction image P obtained in step S705 to derive the locally decoded image $R_{local}$.

In step S707, the in-loop filter unit 716 performs the in-loop filter processing on the locally decoded image $R_{local}$ obtained by the processing of step S706.

In step S708, the sorting buffer 717 derives the decoded image R using the locally decoded image Rlocal that has been subjected to the filter processing and obtained by the processing of step S707, and sorts the decoded image R group from the decoding order to the reproduction order. The decoded image R group sorted in the reproduction order is output as a moving image to the outside of the image decode apparatus 700.

Furthermore, in step S709, the frame memory 718 stores at least one of the locally decoded image $R_{local}$ obtained by the processing of step S706 or the locally decoded image $R_{local}$ after the filter processing obtained by the processing of step S707.

When the processing of step S709 ends, the image decoding processing ends.

In the image decoding processing of the above flow, the present technology is applied to the decoding processing of step S703. That is, in this step S703, the decoding processing of the flow similar to FIG. 15 is performed. That is, the decode unit 712 performs the decoding processing adopting one of the above-mentioned methods #1 to #8. By doing so, the image decode apparatus 700 can obtain the effects similar to those described above in any one of the first embodiment to the eighth embodiment. Therefore, the image decode apparatus 700 can suppress the reduction in encoding efficiency (improve the encoding efficiency). In other words, the image decode apparatus 700 can suppress the reduction in image quality of the decoded image.

11. APPENDIX

<Computer>

The series of processing described above can be executed by hardware and can also be executed by software. In a case where the series of processing is executed by software, a program constituting the software is installed in a computer. Here, the computer includes a computer mounted in dedicated hardware, for example, a general-purpose a personal computer that can execute various functions by installing the various programs, or the like.

Figure 63:
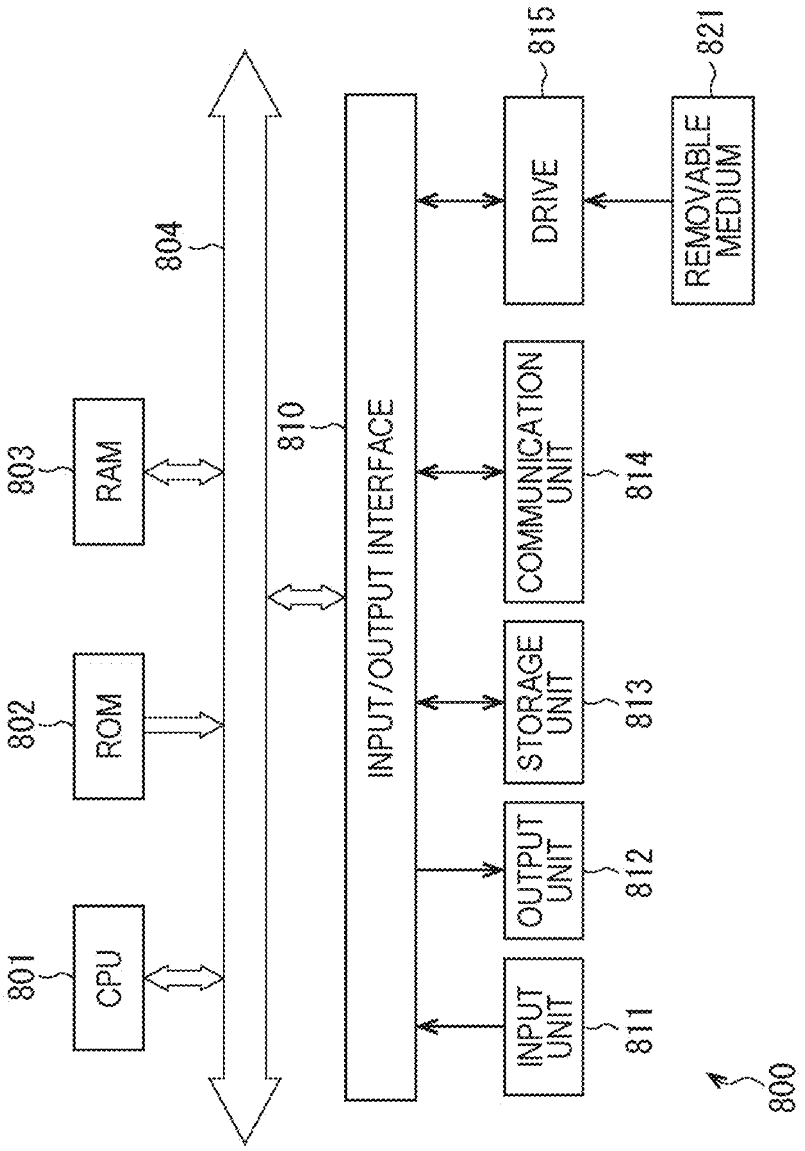
FIG. 63 is a block diagram showing a main configuration example of a computer.

FIG. 63 is a block diagram showing a configuration example of hardware of a computer in which the series of processing described above is executed by a program.

In a computer 800 shown in FIG. 63, a central processing unit (CPU) 801, a read only memory (ROM) 802, a random access memory (RAN) 803 are interconnected by a bus 804.

An input/output interface 810 is also connected to the bus 804. An input unit 811, an output unit 812, a storage unit 813, a communication unit 814, and a drive 815 are connected to the input/output interface 810.

The input unit 811 includes, for example, a keyboard, a mouse, a microphone, a touch panel, an input terminal, and the like. The output unit 812 includes, for example, a display, a speaker, an output terminal, and the like. The storage unit 813 includes, for example, a hard disk, a RAM disk, a non-volatile memory, and the like. The communication unit 814 includes, for example, a network interface and the like. The drive 815 drives a removable medium 821 such as a magnetic disk, an optical disk, a magneto-optical disk, or a semiconductor memory.

In a computer configured in the aforementioned manner, for example, the CPU 801 loads a program stored in the storage unit 813 on the RAM 803 via the input/output interface 810 and the bus 804 and executes the program, and thus the aforementioned series of processing is performed. Data or the like required for the CPU 801 to execute various processing is also stored in the RAM 803 as appropriate.

The program to be executed by the computer can be applied by being recorded on the removable medium 821, for example, as a package medium or the like. In that case, the program can be installed on the storage unit 813 via the input/output interface 810 such that the removable medium 821 is mounted on the drive 815.

Furthermore, this program can also be provided via a wired or wireless transmission medium such as a local area network, the Internet, or digital satellite broadcasting. In that case, the program can be received by the communication unit 814 and installed in the storage unit 813.

In addition, the program can be pre-installed in the ROM 802 or the storage unit 813.

<Unit of Information and Processing>

The unit of data in which the various information described above is set and the unit of data targeted by various processing are arbitrary and are not limited to the above-mentioned examples. For example, these information and processing may be set for each Transform Unit (TU), Transform Block (TB), Prediction Unit (PU), Prediction Block (PB), Coding Unit (CU), Largest Coding Unit (LCU), and subblock, block, tile, slice, picture, sequence, or component, or data in those units of data may be a target. Of course, this unit of data can be set for each information or processing, and it is not necessary that the unit of data of all the information or processing is consistent. Note that the storage location of these pieces of information is arbitrary, and the information may be stored in the header, parameter set, or the like of the above-mentioned unit of data. Furthermore, it may be stored in a plurality of locations.

<Control Information>

The control information related to the present technology described in each of the above embodiments may be transmitted from the encoding side to the decoding side. For example, control information (for example, enabled_flag) that controls whether or not to permit (or prohibit) the application of the above-mentioned present technology described above may be transmitted. Furthermore, for example, control information (for example, present_flag) indicating a target to which the above-mentioned present technology is applied (or a target to which the above-mentioned present technology is not applied) may be transmitted. For example, control information that specifies a block size (upper and lower limits, or both), a frame, a component, a layer, and the like to which the present technology is applied (or application is permitted or prohibited) may be transmitted.

<Applicable Target of the Present Technology>

The present technology can be applied to any image encoding and decoding method. That is, as long as it does not contradict the above-mentioned present technology, the specs of various processing related to image encoding and decoding such as transform (inverse transform), quantization (inverse quantization), encoding (decoding), prediction, and the like are arbitrary, and are not limited to the above-mentioned example. Furthermore, a part of the processing may be omitted as long as it does not contradict the above-mentioned present technology.

Furthermore, the present technology can be applied to a multi-viewpoint image encoding and decoding system that encodes and decodes a multi-viewpoint image including images of a plurality of viewpoints (views). In that case, it is only required to apply the present technology for encoding and decoding of each viewpoint (view).

Moreover, the present technology can be applied to a hierarchical image encoding (scalable encoding) and decoding system that encodes and decodes a hierarchical image that is layered so as to have a scalability function for a predetermined parameter. In that case, it is only required to apply the present technology for encoding and decoding of each hierarchy (layer).

Furthermore, in the above, the encode apparatus 100, the decode apparatus 200, the image encode apparatus 600, and the image decode apparatus 700 have been described as application examples of the present technology, but the present technology can be applied to any configuration.

For example, the present technology can be applied to various electronic devices such as a transmitter or receiver (for example, a television receiver or mobile phone) for satellite broadcasting, cable broadcasting such as cable TV, distribution on the Internet, and distribution to terminals by cellular communication, apparatuses (for example, hard disk recorders and cameras) that record images on a medium such as an optical disk, a magnetic disk, and a flash memory, and reproduce images from these recording media, and the like.

Furthermore, for example, the present technology can be carried out as the configuration of a part of an apparatus such as a processor as a system large scale integration (LSI) or the like (for example, a video processor), a module using a plurality of processors or the like (for example, a video module), a unit using a plurality of modules or the like (for example, a video unit), or a set in which other functions are added to the unit (for example, a video set).

Furthermore, for example, the present technology can also be applied to a network system including a plurality of apparatuses. For example, the present technology may be carried out as cloud computing that is shared and jointly processed by a plurality of apparatuses via a network. For example, the present technology may be carried out in a cloud service that provides services related to images (moving images) to arbitrary terminals such as computers, audio visual (AV) devices, portable information processing terminals, and internet of things (IoT) devices.

Note that, in the present description, the system means a cluster of a plurality of constituent elements (an apparatus, a module (component), or the like), and it does not matter whether or not all the constituent elements are present in the same enclosure. Therefore, a plurality of apparatuses that is housed in different enclosures and connected via a network, and a single apparatus in which a plurality of modules is housed in a single enclosure are both the system.

<Fields and Usages to which the Present Technology can be Applied>

Systems, apparatuses, processing units, and the like to which the present technology is applied can be used in any field such as transportation, medical care, crime prevention, agriculture, livestock industry, mining, beauty, factories, home appliances, weather, nature monitoring, and the like. Furthermore, the usage is also arbitrary.

For example, the present technology can be applied to systems and devices used for providing ornamental content and the like. Furthermore, for example, the present technology can also be applied to systems and devices provided for traffic purposes such as traffic condition supervision and automatic driving control. Moreover, for example, the present technology can also be applied to systems and devices provided for security purposes. Furthermore, for example, the present technology can be applied to systems and devices provided for purposes of automatic control of machines and the like. Moreover, for example, the present technology can also be applied to systems and devices provided for agriculture and livestock industry purposes. Furthermore, the present technology can also be applied to systems and devices for monitoring natural conditions such as volcanoes, forests, and oceans, and wildlife. Moreover, for example, the present technology can also be applied to systems and devices provided for sports purposes.

<Other>

Note that in the present specification, the "flag" is information for identifying a plurality of states, and includes not only information used for identifying two states: true (1) or false (0), but also information with which it is possible to identify three or more states. Therefore, the value that this "flag" can take may be, for example, two values: I/O, or three or more values. That is, the number of bits constituting this "flag" is arbitrary, and may be 1 bit or a plurality of bits.

Furthermore, the identification information (including the flag) is assumed to include not only the identification information in the bit stream but also the difference information of the identification information with respect to a certain reference information in the bit stream. Therefore, in the present specification, the "flag" and "identification information" include not only the information but also the difference information with respect to the reference information.

Furthermore, various information (metadata, and the like) regarding the coded data (bit stream) may be transmitted or recorded in any form as long as it is associated with the coded data. Here, the term "associating" means, for example, to make the other data available (linkable) when processing one data. That is, the data associated with each other may be combined as one data or may be separate data. For example, the information associated with the coded data (image) may be transmitted on a transmission path different from that of the coded data (image). Furthermore, for example, the information associated with the coded data (image) may be recorded on a recording medium different from that of the coded data (image) (or another recording area of the same recording medium). Note that this "association" may be with a part of the data, not the entire data. For example, an image and information corresponding to the image may be associated with each other in any unit such as a plurality of frames, one frame, or a part within a frame.

Note that in the present specification, the terms such as "synthesize", "multiplex", "add", "integrate", "include", "store", "put in", "plug in", "insert", and the like means combining a plurality of objects into one, for example, combining coded data and metadata into one data, and means one method of "associating" described above.

Furthermore, the embodiment of the present technology is not limited to the aforementioned embodiments, but various changes may be made within the scope not departing from the gist of the present technology.

For example, the configuration described as one apparatus (or processing unit) may be divided and configured as a plurality of apparatuses (or processing units). On the contrary, the configuration described as a plurality of apparatuses (or processing units) above may be integrally configured as one apparatus (or processing unit). Furthermore, of course, a configuration other than the above may be added to the configuration of each apparatus (or each processing unit). Moreover, when the configuration and operation of the entire system are substantially the same, a part of the configuration of an apparatus (or processing unit) may be included in the configuration of another apparatus (or another processing unit).

Furthermore, for example, the above-mentioned program may be executed in any apparatus. In that case, it is sufficient if the apparatus has necessary functions (functional blocks, and the like) so that necessary information can be obtained.

Furthermore, for example, each step of one flowchart may be executed by one apparatus, or may be shared and executed by a plurality of apparatuses. Moreover, in a case where one step includes a plurality of pieces of processing, the plurality of pieces of processing may be executed by one apparatus, or may be shared and executed by a plurality of apparatuses. In other words, the plurality of pieces of processing included in one step can be executed as processing of a plurality of steps. On the contrary, the processing described as a plurality of steps can be collectively executed as one step.

Furthermore, for example, regarding the program executed by the computer, the processing of steps writing the program may be executed in chronological order along the order described in the present specification or may be executed in parallel or individually at a required timing, e.g., when call is carried out. That is, as long as there is no contradiction, the processing of each step may be executed in an order different from the above-mentioned order. Moreover, the processing of the steps writing this program may be executed in parallel with the processing of another program, or may be executed in combination with the processing of another program.

Furthermore, for example, a plurality of techniques related to the present technology can be independently carried out as long as there is no contradiction. Of course, any number of the present technologies can be used in combination. For example, a part or whole of the present technology described in any of the embodiments may be carried out in combination with a part or whole of the present technology described in another embodiment. Furthermore, it is also possible to carry out a part or whole of any of the above-mentioned present technology in combination with another technology not described above.

Note that the present technology may be configured as below.

(1) An image processing apparatus including:

a syntax element value derivation unit that sets an upper limit value of the number of bins allocated to a processing target subblock by distributing the number of bins among nonzero subblocks and derives a syntax element value regarding the processing target subblock by using coefficient data derived from image data so that the number of bins does not exceed the upper limit value; and an encode unit that encodes the syntax element value derived and generates coded data.

(2) The image processing apparatus according to (1), in which the syntax element value derivation unit sets the upper limit value of the number of bins allocated to the processing target subblock on the basis of the number of extra bins of an immediately preceding nonzero subblock and a temporary upper limit value of the number of bins allocated to the processing target subblock.

(3) The image processing apparatus according to (1) or (2), in which the syntax element value derivation unit sets the upper limit value of the number of bins allocated to the processing target subblock by distributing the number of bins among nonzero subblocks in a CU.

(4) The image processing apparatus according to any of (1) to (3), in which the syntax element value derivation unit derives the syntax element value regarding the processing target subblock so that a sum of the number of bins allocated to all nonzero subblocks in a block does not exceed a sum of temporary upper limit values of the number of bins allocated to each nonzero subblock in the block.

(5) The image processing apparatus according to (4), in which the syntax element value derivation unit further distributes the number of extra bins of a zero subblock in the block.

(6) The image processing apparatus according to any of (1) to (5), in which the syntax element value derivation unit sets an upper limit value of the number of bins allocated to a block and derives the syntax element value regarding the block by using the coefficient data derived from the image data so that the number of bins does not exceed the upper limit value.

(7) An image processing method including:

setting an upper limit value of the number of bins allocated to a processing target subblock by distributing the number of bins among nonzero subblocks and deriving a syntax element value regarding the processing target subblock by using coefficient data derived from image data so that the number of bins does not exceed the upper limit value; and encoding the syntax element value derived and generating coded data.

(8) An image processing apparatus including:

a decode unit that decodes coded data and generates a syntax element value; and a coefficient data derivation unit that sets an upper limit value of the number of bins allocated to a processing target subblock by distributing the number of bins among nonzero subblocks and derives coefficient data corresponding to image data regarding the processing target subblock by using the syntax element value generated so that the number of bins does not exceed the upper limit value.

(9) An image processing method including:

decoding coded data and generating a syntax element value; and setting an upper limit value of the number of bins allocated to a processing target subblock by distributing the number of bins among nonzero subblocks and deriving coefficient data corresponding to image data regarding the processing target subblock by using the syntax element value generated so that the number of bins does not exceed the upper limit value.

(10) An image processing apparatus including:

a syntax element value derivation unit that sets an upper limit value of the number of bins allocated to a processing target subblock by distributing the number of bins allocated to a zero subblock to a nonzero subblock and derives a syntax element value regarding the processing target subblock by using coefficient data derived from image data so that the number of bins does not exceed the upper limit value; and an encode unit that encodes the syntax element value derived and generates coded data.

(11) The image processing apparatus according to (10), in which the syntax element value derivation unit sets the upper limit value of the number of bins allocated to the processing target subblock on the basis of the number of average extra bins of a zero subblock and a temporary upper limit value of the number of bins allocated to the processing target subblock.

(12) The image processing apparatus according to (11), in which the syntax element value derivation unit further sets the upper limit value of the number of bins allocated to the processing target subblock on the basis of priority according to a position of the processing target subblock.

(13) An image processing method including:

setting an upper limit value of the number of bins allocated to a processing target subblock by distributing the number of bins allocated to a zero subblock to a nonzero subblock and deriving a syntax element value regarding the processing target subblock by using coefficient data derived from image data so that the number of bins does not exceed the upper limit value; and encoding the syntax element value derived and generating coded data.

(14) An image processing apparatus including:

a decode unit that decodes coded data and generates a syntax element value; and a coefficient data derivation unit that sets an upper limit value of the number of bins allocated to a processing target subblock by distributing the number of bins allocated to a zero subblock to a nonzero subblock and derives coefficient data corresponding to image data regarding the processing target subblock by using the syntax element value generated so that the number of bins does not exceed the upper limit value.

(15) An image processing method including:

decoding coded data and generating a syntax element value; and setting an upper limit value of the number of bins allocated to a processing target subblock by distributing the number of bins allocated to a zero subblock to a nonzero subblock and deriving coefficient data corresponding to image data regarding the processing target subblock by using the syntax element value generated so that the number of bins does not exceed the upper limit value.

REFERENCE SIGNS LIST

100 Encode apparatus
101 Sequencer
102 CABAC
121 Binarization unit
122 Selection unit
123 Context model
124 Arithmetic encode unit
125 Arithmetic encode unit
126 Selection unit
200 Decode apparatus
201 CABAC
202 Parser
221 Selection unit
222 Context model
223 Arithmetic decode unit
224 Arithmetic decode unit
225 Selection unit
226 Multivalue conversion unit
600 Image encode apparatus
615 Encode unit
700 Image decode apparatus
712 Decode unit

The invention claimed is:

1. A non-transitory computer-readable storage medium storing instructions which when executed by circuitry perform a method, the method comprising:

setting an upper limit value of a number of context-coded bins that can be allocated to a processing target block, comprising a plurality of sub-blocks, on a basis of a size of the processing target block and a number of context-coded bins per sub-block;

processing a sub-block of the processing target block;

in a case that a current number of the context-coded bins is less than or equal to the upper limit value, deriving syntax element values for some levels of transform coefficients by context decoding and derive remaining syntax elements by bypass decoding; and in a case that the current number of the context-coded bins is greater than the upper limit value, deriving the syntax elements for the levels of the transform coefficients by bypass decoding.

2. The non-transitory computer-readable storage medium of claim 1, the method comprising:

deriving a syntax element value for the processed sub-block so as not to exceed the upper limit value of the number of context-coded bins that can be allocated in an entire upper block.

3. The non-transitory computer-readable storage medium of claim 2, the method comprising:

determining whether all sub-blocks of the processing target block have been processed.

4. The non-transitory computer-readable storage medium of claim 2, the method comprising:

decoding the syntax element value derived and generate coded data.

5. The non-transitory computer-readable storage medium of claim 1, wherein the processing target block is a Coding Unit.

6. The non-transitory computer-readable storage medium of claim 1, wherein the processing target block is a Transform Unit.

7. An image processing apparatus comprising:

circuitry configured to decode coded data and generate a syntax element value;

set an upper limit value of a number of context-coded bins that can be allocated to a processing target block, comprising a plurality of sub-blocks, on a basis of a size of the processing target block and a number of context-coded bins per sub-block;

derive coefficient data corresponding to image data regarding the processing target block by using the syntax element value that is generated;

in a case that a current number of the context-coded bins is less than or equal to the upper limit value, derive syntax element values for some levels of transform coefficients by context decoding and derive remaining syntax elements by bypass decoding; and in a case that the current number of the context-coded bins is greater than the upper limit value, derive the syntax elements for the levels of the transform coefficients by bypass decoding.

8. The image processing apparatus of claim 7, wherein the circuitry is configured to derive a syntax element value for the processed sub-block so as not to exceed the upper limit value of the number of context-coded bins that can be allocated in an entire upper block.

9. The image processing apparatus of claim 8, wherein the circuitry is configured to determine whether all sub-blocks of the processing target block have been processed.

10. The image processing apparatus of claim 8, wherein the circuitry is configured to decode the syntax element value derived and generate coded data.

11. The image processing apparatus of claim 7, wherein the processing target block is a Coding Unit.

12. The image processing apparatus of claim 7, wherein the processing target block is a Transform Unit.

13. An image processing method comprising:

decoding coded data and generate a syntax element value;

setting an upper limit value of a number of context-coded bins that can be allocated to a processing target block, comprising a plurality of sub-blocks, on a basis of a size of the processing target block and a number of context-coded bins per sub-block;

deriving coefficient data corresponding to image data regarding the processing target block by using the syntax element value that is generated;

in a case that a current number of the context-coded bins is less than or equal to the upper limit value, deriving syntax element values for some levels of transform coefficients by context decoding and derive remaining syntax elements by bypass decoding; and in a case that the current number of the context-coded bins is greater than the upper limit value, deriving the syntax elements for the levels of the transform coefficients by bypass decoding.

14. The image processing method of claim 13, wherein the processing target block is a Coding Unit.

15. A non-transitory computer-readable storage medium storing instructions which when executed by circuitry perform a method, the method comprising:

setting an upper limit value of a number of context-coded bins that can be allocated to a processing target block, comprising a plurality of sub-blocks, on a basis of a size of the processing target block and a number of context-coded bins per sub-block;

processing a sub-block of the processing target block;

in a case that a current number of the context-coded bins is less than or equal to the upper limit value, deriving syntax element values for some levels of transform coefficients from context-coded bins and derive remaining syntax elements from bypass-coded bins; and in a case that the current number of the context-coded bins is greater than the upper limit value, deriving the syntax elements for the levels of the transform coefficients from bypass-coded bins.

16. The non-transitory computer-readable storage medium of claim 15, wherein the processing target block is a Coding Unit.

17. An image processing apparatus comprising:

circuitry configured to decode coded data and generate a syntax element value;

set an upper limit value of a number of context-coded bins that can be allocated to a processing target block, comprising a plurality of sub-blocks, on a basis of a size of the processing target block and a number of context-coded bins per sub-block;

derive coefficient data corresponding to image data regarding the processing target block by using the syntax element value that is generated;

in a case that a current number of the context-coded bins is less than or equal to the upper limit value, derive syntax element values for some levels of transform coefficients from context-coded bins and derive remaining syntax elements from bypass-coded bins; and in a case that the current number of the context-coded bins is greater than the upper limit value, derive the syntax elements for the levels of the transform coefficients from bypass-coded bins.

18. The image processing apparatus of claim 17, wherein the processing target block is a Coding Unit.

19. An image processing method comprising:

decoding coded data and generate a syntax element value;

setting an upper limit value of a number of context-coded bins that can be allocated to a processing target block, comprising a plurality of sub-blocks, on a basis of a size of the processing target block and a number of context-coded bins per sub-block;

deriving coefficient data corresponding to image data regarding the processing target block by using the syntax element value that is generated;

in a case that a current number of the context-coded bins is less than or equal to the upper limit value, deriving syntax element values for some levels of transform coefficients from context-coded bins and derive remaining syntax elements from bypass-coded bins; and in a case that the current number of the context-coded bins is greater than the upper limit value, deriving the syntax elements for the levels of the transform coefficients from bypass-coded bins.

20. The image processing method of claim 19, wherein the processing target block is a Coding Unit.

* * * * *